US007324942B1

(12) United States Patent
Mahowald et al.

(10) Patent No.: US 7,324,942 B1
(45) Date of Patent: Jan. 29, 2008

(54) SYSTEM AND METHOD FOR INTERACTIVE VOICE SERVICES USING MARKUP LANGUAGE WITH N-BEST FILTER ELEMENT

(75) Inventors: Joshua Gee-yuen Mahowald, Washington, DC (US); Bodo Maass, Bochum (DE)

(73) Assignee: Microstrategy, Incorporated, McLean, VA (US)

( * ) Notice: Subject to any disclaimer, the term of this patent is extended or adjusted under 35 U.S.C. 154(b) by 974 days.

(21) Appl. No.: 10/058,175

(22) Filed: Jan. 29, 2002

(51) Int. Cl.
G10L 21/00 (2006.01)
G10L 15/00 (2006.01)

(52) U.S. Cl. .................. 704/270; 704/251; 704/270.1

(58) Field of Classification Search ............ 704/270.1, 704/270; 379/88.18, 88.01, 88.16; 715/513
See application file for complete search history.

(56) References Cited

U.S. PATENT DOCUMENTS

| | | | |
|---|---|---|---|
| 4,059,732 A | 11/1977 | Hayden et al. | |
| 4,355,207 A | 10/1982 | Curtin | |
| 4,453,217 A | 6/1984 | Boivie | |
| 4,509,133 A | 4/1985 | Monbaron et al. | |
| 4,742,516 A | 5/1988 | Yamaguchi | |
| 4,761,807 A | 8/1988 | Matthews et al. | |
| 4,839,919 A | 6/1989 | Borges et al. | |
| 4,932,021 A | 6/1990 | Moody | |
| 5,134,647 A | 7/1992 | Pugh et al. | |
| 5,146,503 A * | 9/1992 | Cameron et al. | 704/255 |
| 5,216,603 A | 6/1993 | Flores et al. | |
| 5,218,633 A | 6/1993 | Clagett et al. | |
| 5,243,643 A | 9/1993 | Sattar et al. | |
| 5,251,251 A | 10/1993 | Barber et al. | |
| 5,283,731 A | 2/1994 | Lalonde et al. | |
| 5,408,582 A | 4/1995 | Colier | |
| 5,457,738 A | 10/1995 | Sylvan | |
| 5,687,220 A | 11/1997 | Finnigan | |
| 5,717,738 A | 2/1998 | Gammel | |
| 5,721,908 A | 2/1998 | Lagarde et al. | |
| 5,761,641 A | 6/1998 | Rozak et al. | |
| 5,799,273 A | 8/1998 | Mitchell et al. | |
| 5,825,856 A | 10/1998 | Porter et al. | |
| 5,828,732 A | 10/1998 | Gow | |
| 5,838,906 A | 11/1998 | Doyle et al. | |
| 5,848,404 A | 12/1998 | Hafner et al. | |

(Continued)

FOREIGN PATENT DOCUMENTS

GB 2192746 * 1/1988

OTHER PUBLICATIONS

VoiceXML Forum, "Voice eXtensible Markup Language", Mar. 7, 2000, Available: http://www.voicexml.org/specs/VoiceXML-100.pdf.*

(Continued)

*Primary Examiner*—David Hudspeth
*Assistant Examiner*—Brian L. Albertalli
(74) *Attorney, Agent, or Firm*—Hunton & Williams, LLP

(57) ABSTRACT

A voice-enabled markup language system an N-best filter element that generates unverified possible matches to the utterance for verification to the user during an interactive voice dialog. Such an element is used when a large number of possible utterances may be made in response to an input request or similarly-sounding utterances are possible. The element in the markup language provides the structure used by a call server to dialog with the user.

15 Claims, 18 Drawing Sheets

U.S. PATENT DOCUMENTS

| | | | |
|---|---|---|---|
| 5,852,801 | A | 12/1998 | Hon et al. |
| 5,852,804 | A | 12/1998 | Sako |
| 5,884,262 | A | 3/1999 | Wise et al. |
| 5,893,902 | A | 4/1999 | Transue et al. |
| 5,901,214 | A | 5/1999 | Shaffer et al. |
| 5,915,001 | A | 6/1999 | Uppaluru |
| 5,923,736 | A | 7/1999 | Shachar |
| 5,924,070 | A | 7/1999 | Ittycheriah et al. |
| 5,926,526 | A | 7/1999 | Rapaport et al. |
| 5,937,390 | A | 8/1999 | Hyodo |
| 5,945,989 | A | 8/1999 | Freishtat et al. |
| 5,950,165 | A | 9/1999 | Shaffer et al. |
| 5,960,395 | A | 9/1999 | Tzirkel-Hancock |
| 5,963,626 | A | 10/1999 | Nabkel |
| 5,987,414 | A | 11/1999 | Sabourin et al. |
| 5,991,720 | A | 11/1999 | Galler et al. |
| 5,995,918 | A | 11/1999 | Kendall et al. |
| 5,995,928 | A | 11/1999 | Nguyen et al. |
| 6,018,736 | A | 1/2000 | Gilai et al. |
| 6,035,190 | A | 3/2000 | Cox et al. |
| 6,078,885 | A | 6/2000 | Beutnagel |
| 6,081,782 | A | 6/2000 | Rabin |
| 6,108,533 | A | 8/2000 | Brohoff |
| 6,157,841 | A | 12/2000 | Bolduc et al. |
| 6,269,336 | B1 * | 7/2001 | Ladd et al. .................. 704/270 |
| 6,449,496 | B1 * | 9/2002 | Beith et al. .................. 455/563 |
| 6,574,596 | B2 * | 6/2003 | Bi et al. ...................... 704/249 |
| 6,839,667 | B2 * | 1/2005 | Reich .......................... 704/240 |
| 2003/0139924 | A1 * | 7/2003 | Balasuriya .................. 704/231 |
| 2004/0078201 | A1 * | 4/2004 | Porter et al. ................. 704/275 |

OTHER PUBLICATIONS

Motorola, "VoxML 1.1 Language Reference", Apr. 1999, Available: http://www.w3.org/Voice/1999/VoxML.pdf.*

VXML, "An Introduction to Nbest Post-processing", Available at: http://www.vxml.org/mot_nbest_intro.htm.*

Voxeo, "<nuance:nbest> element", Available at: http://docs.voxeo.com/voicexml/n2.0/nuance-nbest.htm.*

Nuance, "Nuance Expands Global Leadership in VoiceXML; New VoiceXML Products Power Applications for Carriers and Corporations Around the World", Available at: http://investor.nuance.com/ireye/ir_site.zhtml?ticker=nuan&script=460&layout=6&item_id=219543.*

Balentine et al., "How to Build a Speech Recognition Application", 2nd ed, San Ramon: EIG Press, 2001.*

Lisa Ammerman, Voice Portals Promise a Hands-Free Internet Future, Feb. 2001.

Wireless Week, Brad Smith, "Need An Answer? Just Ask", Jun. 26, 2000, pp. 1-2, <http://www.wirelessweek.com/news/june00/sev626.htm>.

* cited by examiner

```xml
<?xml version="1.0"?>
<TML>
    <DIALOG name="Person">
        <SPEECH>Hello Mr. Richards, this is a message from MicroStrategy
                Telecaster. Your store inventory of ice cream is very low. It is
                recommended that you order more to avoid running out of
                stock. Good-bye.</SPEECH>
    </DIALOG>
</TML>
```

FIGURE 9

```xml
<?xml version="1.0"?>
<TML>
    <DIALOG name="Person">
        <SPEECH>Hello Mr. Richards, this is a message from MicroStrategy
                Telecaster. Your store inventory of ice cream is very low. It is
                recommended that you order more to avoid running out of
                stock.</SPEECH>
        <INPUT>
            <OPTION next="inventory">To hear your inventory, press
                    1.</OPTION>
            <OPTION next="demand">To hear the expected demand of ice cream,
                    press 2.</OPTION>
        </INPUT>
    </DIALOG>
    <DIALOG name="inventory">
        <SPEECH>Your inventory contains 5 gallons of strawberry and 7
                gallons of vanilla ice cream.</SPEECH>
    </DIALOG>
    <DIALOG name="demand">
        <SPEECH>Due to the upcoming hot weather, it is expected that you
                will need 20 gallons of strawberry and 25 gallons of vanilla
                ice cream next week.</SPEECH>
    </DIALOG>
</TML>
```

FIGURE 10

```xml
<?xml version="1.0"?>
<TML>
  <DIALOG name="Person">
    <SPEECH>Hello Mr. Richards, this is a message from MicroStrategy Telecaster. Your
        store inventory of ice cream is very low. It is recommended that you order
        more to avoid running out of stock.</SPEECH>
    <INPUT>
      <SPEECH>Please choose one of the following options.</SPEECH>
      <OPTION next="inventory">To hear your inventory, press \f.</OPTION>
      <OPTION next="demand">To hear the expected demand of ice cream, press
              \f.</OPTION>
      <OPTION next="current" repeat="input">To hear these options again, press
              \f.</OPTION>
    </INPUT>
  </DIALOG>
  <DIALOG name="inventory">
    <SPEECH>Your inventory contains 5 gallons of strawberry and 7 gallons of vanilla ice
        cream.</SPEECH>
    <INPUT>
      <OPTION next="demand">To hear the expected demand of ice cream, press
              \f.</OPTION>
      <OPTION next="back" repeat="input">To go back to the previous menu, press
              \f.</OPTION>
    </INPUT>
  </DIALOG>
  <DIALOG name="demand">
    <SPEECH>Due to the upcoming hot weather, it is expected that you will need 20
        gallons of strawberry and 25 gallons of vanilla ice cream next
        week.</SPEECH>
      <INPUT>
        <OPTION next="inventory">To hear your inventory, press \f.</OPTION>
        <OPTION next="back" repeat="input">To go back to the previous menu, press
              \f.</OPTION>
      </INPUT>
  </DIALOG>
  <DIALOG name="end">
    <SPEECH>Thank you for using this service. Good-bye.</SPEECH>
  </DIALOG>
  <DIALOG name="default">
    <INPUT>
      <OPTION filter="*" next="end">To end this call, press star.</OPTION>
      <ERROR repeat="input">Sorry, I did not understand.</ERROR>
    </INPUT>
  </DIALOG>
</TML>
```

FIGURE 11

SYSTEM AND METHOD FOR INTERACTIVE VOICE SERVICES USING MARKUP LANGUAGE WITH N-BEST FILTER ELEMENT

RELATED APPLICATIONS

This application is related to U.S. application Ser. No. 09/661,471 entitled "System and Method for the Creation and Automatic Deployment of Personalized, Dynamic and Interactive Voice Services Including a Markup Language for Creating Voice Services," U.S. application Ser. No. 09/480,994 entitled "Voice Network Access Provider System and Method," U.S. application Ser. No. 09/480,894 entitled "Revenue Generation Method For Use With Voice Network Access Provider System and Method," U.S. application Ser. No. 09/480,995 entitled "Voice Code Registration System and Method for Registering Voice Codes For Voice Pages in a Voice Network Access Provider System," and U.S. application Ser. No. 09/480,665 entitled "Multiple Voice Network Access Provider System and Method."

FIELD OF THE INVENTION

This invention relates to a system and method for creation and output of dynamically generated active voice pages that incorporate an N-best filter element in an extensible markup language for speech recognition to confirm an utterance that was not immediately understood.

BACKGROUND OF THE INVENTION

Markup languages including eXtensible Markup Language (XML) are known. XML is referred to as extensible because it does not have a fixed form like some other markup languages, e.g., HTML. XML comprises a set of rules that determine how to compose other markup languages.

A document that conforms to XML rules is an XML document. XML documents follow a tree structure that comprises of a set of hierarchically arranged nodes including a single top level node that contains all other nodes. Each node is marked by tags of the form <node>node body</node>. If a node does not have a body, it may also be written as <node/>. A node may have one or more attributes: <node attr1="first attribute" attr2="second attribute"/>. Attributes are enclosed in quotes and preferably do not contain certain characters such as quotes, "<", ">" and "&".

The Extensible Stylesheet Language (XSL) is a language used to write stylesheets that can transform XML documents into other XML documents or into plain text. An XSL processor provides a mechanism for navigating through the nodes of an XML document and for applying certain transformations to them. These transformations are specified in a markup language that adheres to the XML syntax. XSL can be applied to any kind of XML-based markup, even to XSL itself. XSL also enables the use of scripts. Scripts are programs that can provide additional functionality that may not be possible with the standard XSL elements.

Recently markup languages have been adapted to enable systems to communicate using voice enabled devices. In such systems, the markup language may provide a call structure to a dialog between a user and the automated voice information delivery system. The elements of the markup language provide the structure and content for a meaningful dialog. In many such systems, however, the responses by the user are only enabled through manually activated inputs on a user's terminal device, such as a keypad of a telephone. Many users prefer to interact with a telephone device via voice commands, particularly in view of the trend in the law towards "hands-free" mobile telephony devices.

Interpreting voice responses is a challenge for voice-based technology due to different inflections, tones, accents, speech patterns, volumes and many other speech variables. Most voice-based systems limit responses to select choices (e.g., say "one" for one, "two" for two, etc.). These systems do not provide for free-flowing logic. Moreover, in such systems, the manner of interpreting voice commands is often coded into the system without much flexibility.

SUMMARY OF THE INVENTION

Accordingly a need has arisen for a voice-enabled markup language system with the ability to enable a programmer to include an N-best filter element that generates unverified possible matches to the utterance for verification to the user. Specifically, this element may be used as part of a markup language for use in interactive voice broadcasting to enable verification of difficult-to-interpret utterances. Such an element is particularly useful in situations in which a large number of possible utterances may be made in response to an input request or similarly-sounding utterances are possible. For example, a user may be creating a voice page that enables a user to request a current stock quote. Given the audible similarity of some stock quotes (e.g., BMT and VMT) and the large number of such quotes, a speech recognition system may have difficulty understanding the quote desired. Similarly, when asking for a person's name, many similarly-sounding names may be returned such as Don, John, Ron, Lon, Fawn, and Dawn, for example.

Accordingly, through the n-best filter element, the creator of such a page may specify the use of the n-best filter a list of designated variables to confirm the utterance (e.g., "Did you want 'BMT'?"). From a grammar file used to interpret voice commands, the speech recognition system may generate a list of possible corresponding matches to the utterance. That list may then be output to the user until a verification has been received. If the list returned BMT and VMT, the system would ask, "Did you want BMT? and if not, then "Did you want VMT?". If none of the possible matches is verified, an error may be generated by the N-best filter element (e.g., We are unable to understand your request) to enable the user to try to recite the choice more clearly.

The N-best filter element may be incorporated as an element in an XML based language. For purposes of explanation, it will be described in the context of a markup language referenced throughout this application as TML, but it should be appreciated that this n-best filter element may be provided in an XML-based language and in particular, for use in one for voice-based applications.

According to one embodiment, TML is based on XML and comprises a set of elements that are used to define functions for various portions of a document and a set of tags that correspond to the elements. The tags are used to delimit portions of a document that belong to a particular element.

According to one embodiment, TML comprises a HEADER Element, a CONTAINER Element, a DIALOG Element, a SPEECH Element, a SOUND Element, a FOR-EACH Element, an INPUT Element, an OPTION Element, a GET-NUMBER Element, a GET-SPEECH Element, an ERROR Element, a SYS-ERROR Element, a RECORD Element, a COMMIT Element, a WAIT Element, and a N-BEST-FILTER Element.

A HEADER Element is used to identify the markup language on which a document is based. A CONTAINER Element is used to identify a document as a TML document. A DIALOG Element is the basic unit of interaction between a system and a user. According to one embodiment, a DIALOG Element may contain text that is to be spoken to a user. A DIALOG Element may contain SPEECH Elements, SOUND Elements, INPUT Elements, FOR-EACH Elements and SYS-ERROR Elements.

A SPEECH Element defines text portions of a document. According to one embodiment, text portions of a document are used to specify information that is to be spoken to a user. A SOUND Element is used to define an audio file to be played to a user. According to one embodiment, the SOUND Element compliments the SPEECH Element and is used to present content that is known in advance of an interactive voice broadcast. A FOR-EACH Element is used to cycle (loop) through a group of related variables to dynamically generate speech from data. An INPUT Element defines sections of DIALOG Elements that contain interactive portions of the TML document. According to one embodiment, an INPUT Element contains elements that pertain to a response expected from a user.

An OPTION Element identifies a predefined user selection that is associated with a particular input. According to one embodiment, OPTION Elements are used to associate one or more choices available to a user with telephone keys.

GET-NUMBER and GET-SPEECH Elements define a particular input that is expected from a user. According to one embodiment, a GET-NUMBER Element defines that a sequence or number of key presses from a telephone keypad is expected as input. The sequence may comprise a fixed-length, a variable length or a PIN code. Unlike an OPTION Element, a GET-NUMBER Element is not associated with predefined user selections. According to another embodiment, a GET-SPEECH Element defines that spoken response is expected from a user.

An ERROR Element defines a response to invalid input by a user. For example, an ERROR Element may be used to define the response to entry of an undefined option.

A SYS-ERROR Element defines a response to predetermined system events. For example, a SYS-ERROR Element may be used to define the response to expiration of the waiting time for a user input.

A RECORD Element enables a user to record speech or other sounds. According to one embodiment, the RECORD Element is used to record a message for another user, or to archive a speech exemplar for recognition purposes.

A COMMIT Element enables a temporary sound file, e.g., one recorded using the RECORD Element, to be stored to a permanent address. According to one embodiment, the COMMIT Element is used to archive a sound file, e.g., for later used for recognition purposes.

A WAIT Element is used to provide a period of time during which no interaction between user and system is expected, e.g., when a database query is being run. According to one embodiment, the WAIT Element enables audio such as music, to be played during the waiting period.

Again, the N-BEST-FILTER Element is used in conjunction with speech recognition and enables an utterance that was not understood initially to be confirmed. According to one embodiment, the N-BEST-FILTER Element is used to individually query a user with a list of designated variables in order to confirm the user's utterance.

A TRANSFER-CALL Element enables a call to be transferred to another telephone number for service. According to one embodiment, the TRANSFER-CALL Element is used to transfer a call to another number while keeping the original line open for further processing. Alternatively, the TRANSFER-CALL Element is used to transfer a call to another number and terminate the original connection.

Within any given document, TML uses a set of corresponding tags to delimit each of the above defined elements. These elements may be collected to generate a TML document according to another embodiment of the present invention. Within a document, the boundaries of an element are delimited by its corresponding tags. Moreover, according to one embodiment, elements are arranged as parent elements and child elements. Parent elements may contain text and other elements. If an element is contained by another element, it may be called a child of the containing element.

According to another embodiment of the present invention, a TML document is used to provide interactive, dynamic voice services to a user through a telephone or other voice-enabled terminal device. A TML document enables a user to receive dynamically generated information and provide various types of input in response. According to one embodiment, the TML elements and tags described above are used to specify text that is to be communicated to a user and to request input from a user. According to this embodiment, the specified text is passed through a text-to-speech converter and conveyed to a user over a telephone.

According to one embodiment, DIALOG elements identify the portions of the TML document that communicate with a user. Within a DIALOG element, SPEECH Elements and FOR-EACH Elements define text that is to be read to a user. SOUND Elements define prerecorded content that is played to a user. INPUT Elements identify the portion of a DIALOG Element that are interactive with a user. Within an INPUT Element, OPTION Elements, GET-NUMBER Elements and GET-SPEECH Elements may define text to be read to a user, but they also request input from a user. According to one embodiment, one or more OPTION Elements may include text that requests that a user choose one or more items from a list of choices defined by the OPTION Elements using the telephone keypad. According to another embodiment, GET-NUMBER and GET-SPEECH Elements may include text that requests free-form input from a user, e.g., by entering alpha-numeric characters using the telephone keypad or by speaking input.

The TML document may comprise ERROR elements and SYS-ERROR Elements. According to one embodiment, an ERROR element includes text that notifies a user of an invalid input. The SYS-ERROR element may also include text that notifies a user that the system has experienced an undefined event, e.g., a non-response to an INPUT Element.

These TML documents incorporating the n-best filter element may be used for many applications. One such application is a system and method for creation and automatic deployment of personalized, dynamic and interactive voice services, including information derived from on-line analytical processing (OLAP) systems and other data repositories. The system and method enables the ability to capture user selections to facilitate closed-loop transaction processing and processing of other requests. One aspect of the invention relates to an interactive voice broadcasting (IVB) system and method that enables analytical reporting and advanced transactional services via the telephone or other voice-enabled terminal device. One advantage of the invention is that a voice service may leverage the power of OLAP or other data repository systems and provide critical information to the user, in a timely fashion, by phone. Another advantage of this method and system is that it provides a user with the opportunity to immediately act upon information received during a interactive voice broadcast.

A voice service is created and can have many users subscribed to the voice service. Each user can specify personal preferences for the content and presentation of the contents for a voice service. The specification of the elements of a voice service may be done using a set of interfaces (such as GUIs) that take the form of a voice service wizard.

A voice service comprises a collection of the elements discussed above. The collection of elements may present information to a user and may enable a user to request a transaction, a service or other service during an IVB. The term transactions, services and requests are to be interpreted broadly.

According to one embodiment, the user's responses to INPUT elements are stored during an IVB and, during or after the IVB, the stored information is processed by the system or is passed to another system or application for processing. The transaction (or other request) processing can be accomplished either in real-time, during the IVB, or after the IVB is completed. The results or confirmation of a transaction or other request can be provided to the user during the call or subsequently.

Once a voice service is created, the system monitors predetermined conditions to determine when the voice service should be executed. Each voice service is executed when one or more predetermined conditions are met as specified during creation of the voice service. For example, a voice service may be executed according to a predetermined schedule (time-based) or based on a triggering event (e.g., one or more conditions are met based on the output of an OLAP or other report).

When the predetermined condition is satisfied, the voice service is executed. Executing a voice service, includes the steps of generating the content specified by the voice service and the user preferences. Some users may have identical personalization options and, thus, a single call structure may be generated for a group of users with identical personalization options. The content of the voice service includes the information that is to be delivered to users of that voice service, and the input to be requested from the user, among other things. The content may include, for example, static text messages, dynamic content (e.g., text based on information output from an OLAP report (or other data source), blended text (e.g., static text combined with dynamic content) and prerecorded sound files.

This and other content along with a user's personalization preferences are formatted in an Active Voice Page (AVP). An AVP contains the call structure and data, voice style parameters for the user and personal identification information designated for the user. The AVP contains data at various hierarchical levels that are defined by the DIALOG elements defined for each voice service. The active voice pages are used to help govern the interaction between the call server and the user during an IVB. According to one embodiment, the content is formatted, into an AVP using XSL stylesheets so the AVP is in an XML-based language. According to one embodiment, the XML-based language used is a novel language referred to as TML (discussed below). Other XML-based markups could be used, such as VoiceXML™ The AVP is sent to a call server along with style properties for each user. The style properties of a user help determine the behavior of the call server during an IVB. A unique AVP is generated for each user scheduled to receive a voice service.

When a user is called by the call server, information is passed through a text-to-speech (T-T-S) engine and delivered to the user through a voice-enabled terminal device. Preferably, the structure of each call is dynamic, driven by current data values and is personalized based on a user profile established during subscription to a voice service. During a typical IVB, a synthesized, natural sounding voice or a prerecorded voice greets the recipient by name, and identifies itself, then the synthesized voice provides dynamic information relevant to the user and enables a user to provide input back to the system.

An IVB is a voice-enabled interaction with a user having a dynamic structure controlled by the AVP for the particular user. The IVB may be delivered using real-time, on-the-fly speech generation. During an IVB, information is exchanged between the call server and a user according to the AVP. The system executes dialogs by reading messages to the user and, eliciting input from the user. For example, the user may press buttons on a telephone touch pad dial to select an option or to provide numeric or alphanumeric input or the user may speak a response which the system resolves using speech recognition technology. Each response provided by a user may transfer control of the IVB to a different part of the AVP or to a different AVP.

During or after the IVB, the user's responses may be processed by the system or other applications. The AVP may contain pointers to other applications and embedded statements such that when a user exercises an option or otherwise supplies input, the system performs a requested operation and returns the results to the user during the IVB. For example, using various input functionality, a user may request that a real-time database query be performed. When the user provides such input, control is shifted to a portion of the AVP that contains an embedded SQL statement that is made against a database.

When a user has worked through selected dialogs of the AVP, the IVB is terminated. That is, a user likely will not work through all of the available dialogs during an IVB. Rather, the user's inputs determine which available dialogs are encountered during any given IVB.

While the use of a TML document incorporating the n-best filter element has been described in the context of an automatic output OLAP system, it should be appreciated that this is one example of the many applications for which it may be used. It may also be used in a voice page delivery system as described in application Ser. No. 09/480,994 entitled "Voice Network Access Provider System and Method," U.S. application Ser. No. 09/480,894 entitled "Revenue Generation Method For Use With Voice Network Access Provider System and Method," U.S. application Ser. No. 09/480,995 entitled "Voice Code Registration System and Method for Registering Voice Codes For Voice Pages in a Voice Network Access Provider System," and U.S. application Ser. No. 09/480,665 entitled "Multiple Voice Network Access Provider System and Method," the subject matter of which is hereby incorporated by reference.

Other objects and advantages of the present invention will be apparent to one of ordinary skill in the art upon reviewing the detailed description of the present invention.

BRIEF DESCRIPTION OF THE DRAWINGS

FIG. 9 is a markup language document in accordance with one embodiment of the invention.

FIG. 10 is a markup language document in accordance with another embodiment of the invention.

FIG. 11 is a markup language document in accordance with another embodiment of the invention.

DETAILED DESCRIPTION OF THE PREFERRED EMBODIMENTS

Figure 1A:
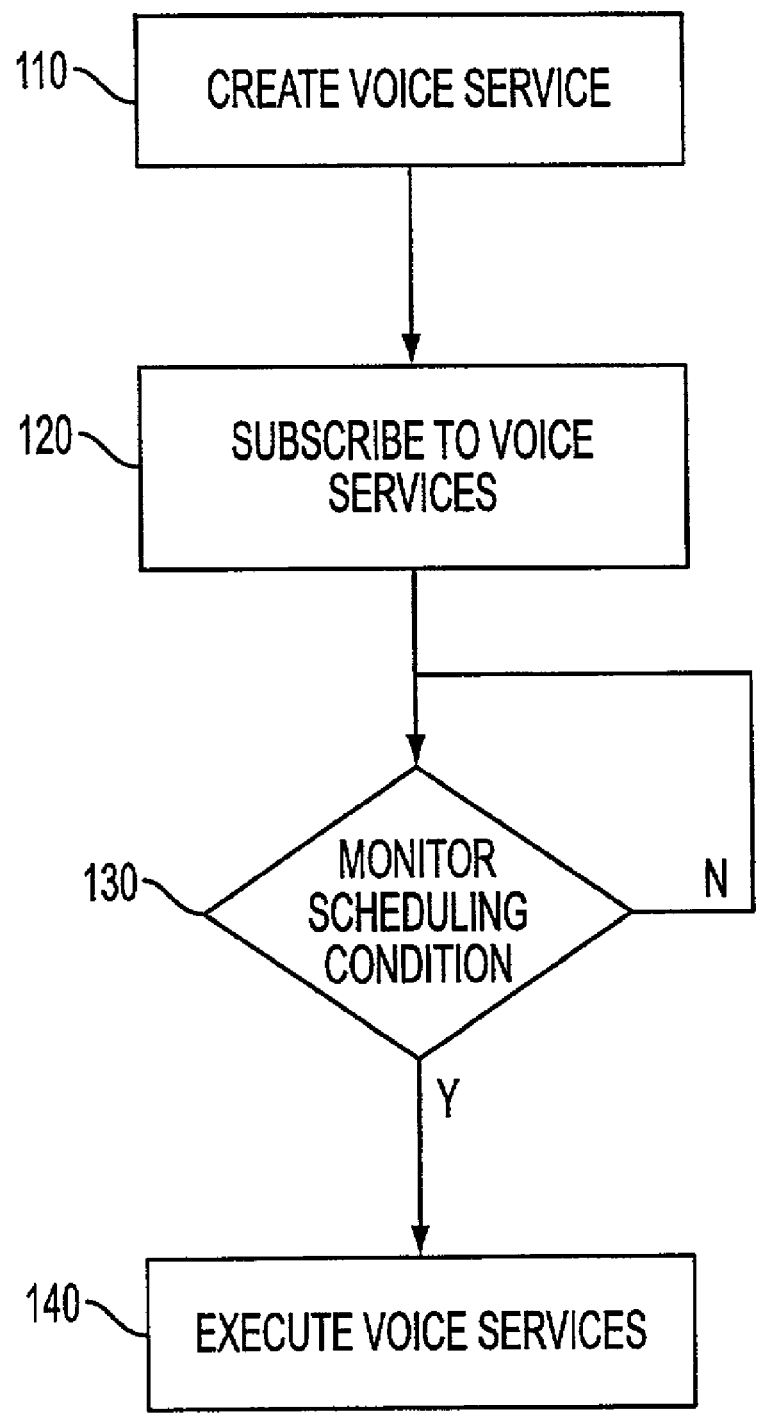
FIG. 1a is a flow chart of a method in accordance with an embodiment of the present invention.

The present invention relates to an improved markup language for use in interactive voice output systems, the improvement relating to provision of an n-best filter element. The n-best filter element provides the ability to query a user to verify an utterance that was not understood by a voice recognition system. This element and its advantages will be explained below in the context of the TML markup language. For context, the use of a TML document is described with context provided in the output of an OLAP report. Again, it should be appreciated that the present invention may be used for many different applications of which the described OLAP report output system is one.

TML is a markup language that comprises a relatively small number of elements that use similar syntax. The use of this type of structure facilitates dynamic generation of TML documents that contain real-time information to be presented to a user. This structure also facilitates editing of TML documents and combining TML documents.

According to one embodiment, TML comprises a number of components. The components of a markup language define the functional capabilities of a markup language. According to one embodiment, TML comprises at least Elements, Tags, Attributes and a Response Collection. According to one embodiment, Elements, Tags and Attributes are combined to define a TML document. According to one embodiment, a TML document is referred to as an active voice page. The Response Collection is used during an IVB to collect user responses.

An Element is a component of a markup language (in this case TML) that defines a particular function. Thus, the collection of elements of a markup language define the functional capabilities of the markup language. According to one embodiment, the functional capabilities of TML are defined by a collection of elements. According to one specific embodiment, TML comprises a HEADER Element, a CONTAINER Element, a DIALOG Element, a SPEECH Element, a SOUND Element, a FOR-EACH Element, an INPUT Element, an OPTION Element, a GET-NUMBER Element, a GET-SPEECH Element, an ERROR Element, a SYS-ERROR Element, a RECORD Element, a COMMIT Element, a WAIT Element, an N-BEST-FILTER Element and a TRANSFER-CALL Element. Each of these elements is described in detail below.

A markup language operates using tags or elements (often used interchangeably) for different actions. According to one specific embodiment, TML comprises a HEADER Tag, a CONTAINER Tag, a DIALOG Tag, a SPEECH Tag, a SOUND Tag, a FOR-EACH Tag, an INPUT Tag, an OPTION Tag, a GET-NUMBER Tag, a GET-SPEECH Tag, an ERROR Tag, a SYS-ERROR Tag, a RECORD Tag, a COMMIT Tag, a WAIT Tag, an N-BEST-FILTER Tag and a TRANSFER-CALL Tag.

An Attribute of a markup language is a structural unit that defines a characteristic of an Element. An Attribute can also provide additional functionality to a markup language. According to one embodiment, an Attribute may apply to several different Elements of a markup language. Attributes may be specific to a particular element or they may be general to all of the elements (or to a subset of the elements) of a markup language. According to one embodiment, TML Attributes are used to direct the flow of control during an interactive voice broadcast. According to another embodiment, TML Attributes are also used to retain the Response Collection (explained below) during an interactive voice broadcast. According to one specific embodiment, TML comprises the general attributes "name," "next," "repeat," "store," "remove," "case," "pos," "language," "barge-in," and "wait." According to another embodiment, TML comprises a number of specific attributes as well. The Attributes used in TML will be explained in greater detail below.

The markup language of the present invention uses a Response Collection to keep track of incoming data. According to one embodiment, the Response Collection comprises a number of variables that store user responses during an IVB. The variables comprise a key and a value. The key enables identification of particular variables. The value of a variable stores a fixed or variable length alphanumeric value for each key.

At various points during an IVB, variables may be modified, added to or removed from the Response Collection, e.g., by user responses and the "store" and "remove" attributes, which are explained below. According to one embodiment, if an existing variable is stored without a value (e.g., store="MSTR"), the previous value of that variable may be increased by one. According to another embodiment, if the variable did not yet exist in the Response Collection, "storing" the variable will add it to the Response Collection with a value of 1. This is useful for counting how many times a particular menu option was chosen, (e.g., during PIN verification). It is thus possible to program a loop that terminates if the user has entered an incorrect PIN a predetermined number of times. According to another embodiment, if a response variable is stored with a value (e.g., store="buy:MSTR=100"), that value may overwrite any previous values.

According to one embodiment, when execution of a TML document is terminated, the Response Collection is converted to a string and written back to the call system. This string may have the form:

Key1=Value;Key2=Value;Key3s=Value; . . .

The Response Collection facilitates retrieving information from the user and writing it back to, e.g., a database or passing it to another active voice page for processing. According to one embodiment, TML provides namespaces. Each variable belongs to a namespace. According to one embodiment, variable keys have the format "namespace: name." As an example of the use of namespaces, the script, "Store='buy:MSTR=100'" stores the variable "MSTR" in the namespace "buy." After execution is complete, the namespace "buy" is written back to the system "buy:MSTR=100" as a response string and can be used for further processing.

It may also be desired to store variables with temporary information that should not be written back to the call system. According to one embodiment, if the namespace is omitted, variable keys may default to the namespace "tmp" for the collection of temporary variables. Variables in the "tmp" namespace are not written back to the response string. As an example, the script store="calc" is equivalent to store="tmp:calc" and creates a variable in the namespace "tmp." To create new temporary namespaces, the '#' character may be used. For example, store="#calc:MSTR" creates the variable MSTR in the temporary namespace #calc. This namespace is not written back to the response string. Thus, namespaces provide a mechanism to determine which variables are temporary, and which are written back to the call system.

A namespace also enables variables to be grouped into logical categories. For example, the namespace "buy" may contain all items that the user has chosen to buy during a session (e.g., a shopping basket on a web site). The FOREACH Element (explained below) enables all variables in a particular namespace to be iterated through.

A TML document may comprise a collection of TML Elements. According to one embodiment, a TML document typically begins with a HEADER and, thereafter, consists of a combination of TML elements designed to deliver desired information to a user and to request certain information from the user. According to one embodiment, as discussed above, a TML document that has been created for a particular user is referred to as an Active Voice Page or AVP for short.

According to one embodiment, TML may be automatically generated using output from database reports and it can be manually generated. According to one particular embodiment, a framework TML document serves as a document template, and one or more dynamically generated TML documents are blended into the template. The framework TML document may define DIALOG elements for PIN verification, navigation, and for basic operations such as buying or selling. The dynamically generated TML document may comprise output from a database or OLAP system or other AVPs to be delivered to a user. The generation of TML documents is explained in detail in conjunction with FIGS. 12 and 13.

TML Elements

As is mentioned above, the elements are the main functional components of TML A more detailed explanation of the various TML elements available according to one embodiment of the present invention is now provided.

HEADER

A HEADER Element is used to identify the markup language and the version of the markup language on which a document is based. According to one embodiment, a HEADER Element is the first element in a TML document. According to one particular embodiment, a HEADER Element identifies the document as a TML document and appears at the top of a TML document.

CONTAINER

A CONTAINER or TML Element is used to define the boundaries of a markup language document. According to one embodiment, a CONTAINER Element is provided after the HEADER Element in a TML document and may reside at the top of a DIALOG element tree. According to one embodiment, the CONTAINER element preferably includes all of the DIALOG elements that comprise a voice service.

According to one particular embodiment, the CONTAINER Element comprises the following syntax:

```
<TML>
<DIALOG . . . >
. . .
</DIALOG . . . >
</TML>
```

According to one embodiment, the CONTAINER Element may have one or more DIALOG Elements as children. According to another embodiment the CONTAINER Element may have one or more attributes. According to one specific embodiment, the CONTAINER Element may include the attributes "background," "autodefault," "calltimeout," "maxtimeouts," "language," "barge-in," "remove," and "store."

The background attribute and the autodefault attribute work together to provide a consistent user interface experience for an interactive voice system. The background attribute specifies a TML document to be loaded in the background. According to one embodiment, the elements on the background page can be referenced using the "next" attribute. For example, "next=background:Person" references a DIALOG, "Person" on the background page. According to one embodiment, the background attribute is used to provide a user with a number of options that should generally be available across multiple active voice pages, rather than one specific voice page. For example, the background attribute may reference a page that provides the user with an option to "Press * to go back to the previous voice page in the voice page history" or "Press # to go forward to the next voice page in the voice page history."

According to one embodiment, the "autodefault" attribute specifies a DIALOG element that acts as the default element for all DIALOGs on the current page that do not specify their own default. According to one embodiment, the autodefault attribute is used in conjunction with the background attribute to provide a user with a consistent interface. According to a particular embodiment, the autodefault attribute is used to refer to a particular DIALOG contained on a background page specified using the background attribute. The DIALOG referenced by the autodefault attribute, may, for example, contain certain OPTION Elements that a user should always have access to in order to provide a consistent user interface experience.

The following example will help illustrate the use of the background and autodefault attributes to provide a consistent user interface experience. In the example, the "foreground" page could be any active voice page a user may want to reference and the "background" page is a page created to provide the user with a consistent set of functionality.

Foreground.xml
<?xml version="1.0" ?>
<TML background="file:C:/tml/background.xml" autodefault="footer">
<DIALOG name="person">
<SPEECH>Hello from the foreground page. </SPEECH>
<INPUT>
<OPTION next="hello">Press f to say hello.</OPTION>

<INPUT>

</DIALOG>

</TML>
Background.xml
<?xml version="1.0" ?>
<TML>
<DIALOG name="Person">
<SPEECH>This is the background page. </SPEECH>
</DIALOG>
<DIALOG name="footer">
<INPUT>
<OPTION repeat="current">Press \f for an OPTION from the background.</OPTION>
<ERROR repeat="input">Sorry, I did not understand. Please try again. </ERROR>
<INPUT>
</DIALOG>
<DIALOG name="hello">
<SPEECH>Hello. This dialog will terminate, because the INPUT element disables the default, and there are no active input elements left. </SPEECH>
</DIALOG>
</TML>

The example provides the following output:
Hello from the foreground page. Press I to say hello. Press 2 for an OPTION from the background.
press 1
Hello. This dialog will terminate, because the INPUT element disables the default, and there are no active input elements left.

The calltimeout attribute and the maxtimeouts attribute work together to help ensure that a user's interaction with the system is accomplished in an expeditious manner. The calltimeout attribute is used to provide a maximum amount of time before a call is terminated. According to one embodiment, the calltimeout attribute specifies the maximum length of time in seconds that a user may stay on a particular call.

The maxtimeouts attribute is used to specify a maximum number of user timeout events that can occur before the call is terminated. A user timeout event is explained below in conjunction with the INPUT Element.

Other child elements and or attributes are possible. The "language," "barge-in," "remove," and "store" attributes apply to a number of different elements and are explained in more detail below.

DIALOG Element

A DIALOG Element is the basic unit of interaction for a markup language. According to one embodiment, a DIA-LOG Element is the TML Element that contains all communication between a voice service system and a user.

According to one embodiment, DIALOG Elements preferably have a name so that DIALOG elements can refer to each other. This enables DIALOG elements to "jump" to other DIALOG elements contained within a TML document and thus, to present users with additional information during an IVB. According to another embodiment, DIALOG Elements "jump" to other DIALOG Elements in other TML documents by referring to them by name.

According to one embodiment, a DIALOG Element comprises a message section and/or an input section. According to one embodiment, the message section comprises text that is to be spoken to a user. According to another embodiment, the message section of a DIALOG Element comprises a SPEECH Element containing text to be spoken to a user and/or a SOUND Element containing a sound file to be played to a user. According to one embodiment, the input section of a DIALOG Element collects input from the user and determines call flow by determining the next DIALOG Element that is to be delivered to a user. According to one embodiment, the input section of a DIALOG Element comprises an INPUT Element and one or more OPTION, GET-NUMBER and GET-SPEECH Elements.

A DIALOG element may have one or more attributes and child elements. According to one embodiment, a DIALOG Element may include "name," "language," "remove," "store," or "barge-in" attributes. These attributes apply to a number of different elements and are explained in more detail below. According to another embodiment, a DIALOG Element has SPEECH Elements, SOUND Elements, FOR-EACH Elements, INPUT Elements and/or SYS-ERROR Elements as children.

According to one embodiment, a DIALOG Element comprises the following syntax:
<DIALOG name="name" [language="language"] [barge-in="barge-in"] [remove="variables"] [store="expressions"]>
[<SPEECH>]
[<SOUND>]
[<FOR-EACH>]
[<INPUTh]
</DIALOG>

SPEECH Element

A SPEECH Element specifies text that is to be delivered. According to one embodiment, a SPEECH Element comprises an element of a TML document and is used to specify text that is converted to speech and delivered to a user during an IVB.

According to one embodiment, a SPEECH Element is a child of a number of different elements and is used to specify text to be delivered to a user within those elements. According to one embodiment, when a SPEECH Element is a child of a DIALOG Element, the SPEECH Element defines text that is read when the DIALOG Element is initiated, e.g., when flow is directed to the DIALOG Element by a jump from another DIALOG Element. According to another embodiment, when a SPEECH Element is a child of an INPUT Element, the SPEECH Element defines text that is read when the particular input is requested using one or more OPTION, GET-NUMBER or GET-SPEECH Elements.

A SPEECH Element may have one or more attributes and child elements. According to one embodiment, a SPEECH Element may comprise all text presented between a beginning and end tag and one or more of the following attributes: "pos," "case," "language," "barge-in," "remove," "store," "next," "wait," and "repeat." These attributes are explained in further detail below. According to another embodiment, a SPEECH Element need not comprise any attributes.

According to one embodiment, a SPEECH Element has the following syntax:

<SPEECH [case="expression"]>some text </SPEECH>

SOUND Element

A SOUND Element defines an audio file to be played to a user. According to one embodiment, the markup language according to the present invention includes a SOUND Element that is used to play sound files to the user for content that is static. In one embodiment, the SOUND Element is used to record content such as greetings for a particular user that remains static. According to one embodiment, the SOUND Element references sound files that are stored on call server 18 as shown and explained in conjunction with FIGS. 1-8. According to one embodiment, the SOUND Element may be a child of a number of different elements and is used to specify an audio file to be played from its parent element.

A SOUND Element may have one or more attributes and child elements. According to one embodiment, a SOUND Element may comprise "pos," "case," "barge-in," "remove," "store," "next," "wait," "repeat," "source," "loop," and "alt" attributes.

The "source" attribute is used to specify the audio file that is to be played for the user. According to one embodiment, the source attribute specifies the name of the audio file that is to be played from a drive on the call server. According to one particular embodiment, sound files used by a voice service system may be organized on call server 18 (or other server) in folders indexed by particular users or by call senders. According to another embodiment, the source attribute specifies the file name and the file location of the audio file.

The "loop" attribute is used to indicate that the audio file specified by the source attribute is played for a predetermined number of times or until a certain event occurs, e.g., a user input. According to one embodiment, the syntax for the loop attribute comprises "loop=10." This loop attribute causes the audio file specified by the source attribute to be repeated ten times. This functionality may be used to repeat a sound, e.g., a telephone ringing might be repeated two or three times.

The "alt" attribute is used to provide an alternative for the SOUND element if the audio file cannot be retrieved and played properly. The text specified by the "alt" attribute is converted to speech as if it were contained within a SPEECH element.

According to one embodiment, the SOUND Element has the following syntax,

<SOUND source="filename of audio file to be played" [alt="alt text to be spoken"] I>

The remainder of the attributes apply to a number of different elements and are explained in further detail below. According to another embodiment, a SOUND Element need not comprise any attributes aside from "source."

FOR-EACH Element

A FOR-EACH Element is used to cycle (loop) through a group of related variables. According to one embodiment, a FOR-EACH Element in TML is used to read the current value of each variable in a namespace. As explained above, a TML namespace is a group of variables that are related either by origin or by user designation. According to one embodiment, a FOR-EACH Element is used for giving summary statements of dynamic variables, such as a shopping basket, or a list of transactions. According to another embodiment, a FOR-EACH Element is used to dynamically generate speech from data from a report.

A FOR-EACH Element may have one or more attributes and child elements. According to one embodiment, a FOR-EACH Element may comprise "pos," "case," "namespace," "join," "pre-final," "post-final," "language," and "barge-in" attributes. The attributes "namespace," "join," "pre-final," and "post-final" are particular to the FOR-EACH Element. According to another embodiment, a FOR-EACH Element has a SPEECH Element, a SOUND Element, and/or an OPTION Element as child elements. According to another embodiment, a FOR-EACH Element also defines text to be converted to speech and spoken to a user.

As explained above, the "namespace" attribute is used to designate a group of variables. According to one embodiment, the "namespace" attribute designates a group of variables whose values are to be iterated through using a FOR-EACH element.

The "join" attribute is used to designate a word or character to be used to separate elements of a list. According to one particular embodiment, the "join" attribute is used to designate a word or character to be used to separate the elements of a namespace in implementing a FOR-EACH element. According to one embodiment, the default value for the "join" attribute is "," (a comma). The syntax for the "join" attribute is shown in the above example.

The "pre-final" attribute is used to designate a word or character to be used to separate the last element in a list from the second to the last element in the list. According to one embodiment, the "pre-final" attribute is used to separate the last element of a namespace from the second to the last element of the namespace in implementing a FOR-EACH element. According to one embodiment, the default value for the "pre-final" attribute is "and." The syntax for the "pre-final" attribute is shown in the above example.

The "post-final" attribute is used to designate a word or character to be used to end a list of variables. According to one embodiment, the "post-final" attribute is used to indicate the end of the variables in a namespace in implementing a FOR-EACH element. According to one embodiment, the default value for the "post-final" attribute is "." (a period). The syntax for the "post-final" is as follows.

<POST-FINAL>text after last iterative step </POST-FINAL>

According to one embodiment, a FOR-EACH Element comprises the following syntax:

```
<FOR-EACH namespace= "namespace" [cases= "expression"]
[pos= "number']>
<SPEECH> text </SPEECH>
...
<JOIN> text between interactive steps </JOIN>
<PRE-FINAL> text before last iterative step </PRE-FINAL>
</FOR-EACH>
```

As an example, the following example of a FOR-EACH Element creates a voice service that tells a user: "You have the following items in your fruit basket: 150 apples, 200 bananas and 100 oranges."

<DIALOG name="overview" store="own.Apples=150; own. Bananas=200; own.Oranges=100">

<SPEECH>You have the following items in your fruit basket: </SPEECH>

<FOR-EACH namespace="own">e[IteratorValueo] e[IteratorKey( )]</FOR-EACH>

Another, more complex example is set forth below.

```
<TML>
<DIALOG name="Person" store="basket.Apples=150;
    basket.Bananas=200; basket.Oranges=100">
<SPEECH next="main">Welcome.</SPEECH>
</DIALOG>
<DIALOG name="main">
<INPUT default="none">
<SPEECH>To hear more about the items in your fruit
    basket: Press </SPEECH>
<FOR-EACH namespace="basket" join="." pre-final=".
    Or" post-final".">
<OPTION store="item=IteratorKey( )" next="\e['de-
    tail'+IteratorKey( )]">\f for \e[IteratorKey( )].</OP-
    TION>
</FOR-EACH>
</INPUT>
</DIALOG>
<DIALOG name="detailApples">
<SPEECH>Apples are on sale for $1.99 a pound.
    </SPEECH>
<INPUT default="transact"/>
</DIALOG>
<DIALOG name="detailBananas">
<SPEECH>Bananas are 42 cent a pound. </SPEECH>
<INPUT default="transact"/>
</DIALOG>
<DIALOG name="detailoranges">
<SPEECH>Oranges are $1.49 for a bag of ten.
    </SPEECH>
<INPUT default="transact"/>
</DIALOG>
<DIALOG name="transact">
<INPUT>
<SPEECH store="var='basket.'+item"/>
<SPEECH>You have \e[@var] \e[item] in your basket.
    </SPEECH>
<OPTION store="\e[var]+=10">Press \f to add more.
    </OPTION>
<OPTION case="@var gt 0" store="e[var]-=10">Press \f
    to take some out.</OPTION>
<OPTION filter="3" next="main">Press \f for the main
    menu.</OPTION>
</INPUT>
</DIALOG>
</TML>
```

This example expands to:
  "To hear more about the items in your fruit basket: Press
    1 for Apples. 2 for Bananas. Or 3 for Oranges."
    press 1
  "Apples are on sale for $1.99 a pound. You have 150
    Apples in your basket . . . "

Other attributes of the FOR-EACH Element are possible. The other attributes "pos," "case," and "namespace," apply to a number of different elements and are explained in more detail below.

INPUT Element

An INPUT Element is used to define interactive sections of a markup language document. According to one embodiment, INPUT Elements are contained within DIALOG Elements in a TML document and define the portions of the TML document that request input from a user. According to one particular embodiment, INPUT Elements are used to request input from a user through one or more OPTION Elements, GET-NUMBER Elements, or GET-SPEECH Elements (e.g., by requesting selection of a single phone key, or a sequence of keys, voice input, or other input mechanism). OPTION Elements, GET-NUMBER Elements and GET-SPEECH Elements are explained in detail below.

According to another embodiment, an INPUT Element controls the flow of an IVB. According to this embodiment, a user's inputs, e.g., in response to OPTION Elements, GET-NUMBER Elements, or GET-SPEECH Elements, is used to direct call flow to the next DIALOG Element. As such, an INPUT Element provides an UVB with a dynamic structure that depends on responses from a user.

According to another embodiment, an INPUT Element is also used to deliver text to a user. According to this embodiment, an INPUT Element comprises a message section that is used to specify text to be delivered to a user. According to another embodiment, an INPUT Element contains a SPEECH Element that is used to specify text to be delivered to a user.

An INPUT Element is also used to notify a user an error has occurred. According to one embodiment, an INPUT Element contains an ERROR Element that informs a user that an error has occurred. For example, an INPUT Element may contain an ERROR Element that notifies a user that a user response, entered in response to an OPTION, a GET-NUMBER, or GET-SPEECH Element, is undefined.

An INPUT Element may have one or more attributes and child elements. According to one embodiment, an INPUT Element may include "default," "maxtimeouts," "timeout," "grammar," "dyngrammar," "case," "pos," and/or "language" attributes. According to another embodiment, an INPUT Element has SPEECH Elements, SOUND Elements, FOR-EACH Elements, GET-NUMBER Elements, GET-SPEECH Elements, OPTION Elements, N-BEST-FILTER Elements, ERROR Elements and/or SYS-ERROR Elements as child elements. According to one embodiment, the order of resolution for these child elements is SPEECH, GET-NUMBER, GET-SPEECH, OPTION, and ERROR.

According to one embodiment, INPUT Elements use the following syntax:
```
<INPUT [default="DIALOG.name"]>
[<SPEECH> . . . </SPEECH>]
[<GET-NUMBER . . . />]
[<OPTION value="1" next="menu2" . . . >]
[<OPTION value="2" next="end" . . . />]
[<ERROR . . . >]
</INPUT>
```
The default attribute is used in conjunction with an INPUT Element to specify the name of another DIALOG Element in order to designate the INPUT Element of the DIALOG as a default. This enables, for example, a single error handler to be used by many DIALOG Elements. This also enables a common structure to be added to a set of DIALOG Elements. The following example illustrates the use of the default attribute in conjunction with the INPUT Element. The TML script below provides a user with the value of four stocks, MSTR, MSFT, IACO and ORCL. After the value of each stock is presented, the user is given the option "To purchase or sell shares of this stock" or "To select another symbol" or "To return to the main menu" or "To repeat these options." This is accomplished by defaulting to the "StockDefault" DIALOG.

```
<DIALOG name="MSTR" store="symbol='MSTR'">
<SPEECH>MSTR was up 2 1/16 today, closing at $24
    3/16.</SPEECH>
<INPUT default="stockDefault">
<OPTION next="MSFT">To hear about the next symbol,
    press \f.<OPTION>
</INPUT>
</DIALOG>
```

```
<DIALOG name="MSFT" store="symbol='MSFT'">
<SPEECH>MSFT did not change today, closing at $171
    and ¼.</SPEECH>
<INPUT default="stockdefault">
<OPTION next="IACO">To hear about the next symbol,
    press \f.<OPTION>
</INPUT>
</DIALOG>
<DIALOG name="IACO" store="symbol='IACO'">
<SPEECH>IACO was down 1 today, closing at $26
    11/16.</SPEECH>
<INPUT default="stockDefault">
<OPTION next="ORCL">To hear about the next symbol,
    press \f.</OPTION>
</INPUT>
</DIALOG>
<DIALOG name="ORCL" store="symbol='ORCL'">
<SPEECH>ORCL was up ¾ today, closing at $7 ½</
    SPEECH>
<INPUT default="stockDefault"/>
</DIALOG>
<DIALOG name="stockDefault">
<INPUT>
<OPTION next="BuySell">To purchase or sell shares of
    this stock, press \f.</OPTION>
<OPTION next="stocks">To select another symbol, press
    \f.</OPTION>
<OPTION next="main" repeat="menu">To return to the
    main menu, press \f.</OPTION>
<OPTION repeat="input">To repeat these options, press
    \f.</OPTION>
<OPTION filter "*" next="end"/>
<ERROR repeat="input">Please make a valid entry to
    continue.</ERROR>
</INPUT>
</DIALOG>
```

According to one particular embodiment, the default attribute is used in conjunction with the background attribute and the autodefault attribute explained above, to provide a consistent user interface experience. The autodefault attribute and the concept of background TML pages are explained above in conjunction with the discussion of the HEADER or TML Element. The default attribute differs from the autodefault attribute in that it applies only to the IPUT from which it is referenced. The autodefault attribute, explained above, applies to all DIALOGs in the TML document that do not specify a default.

The grammar and dyngrammar attributes work together to help enable spoken input to be used in conjunction with a speech recognition engine. According to one embodiment, a speech recognition engine may be provided as part of user response system 1815, shown in FIG. 3c is used in conjunction with the grammar and dyngrammar attributes to enable spoken input. Speech recognition technologies and systems provided by Nuance and SpeechWorks may be employed, for example.

The grammar attribute facilitates recognition by defining a context for the speech recognition. According to one embodiment, the grammar attribute specifies the name of a file that contains a list of words that are understood by the system in that particular dialog context. For example, if the name of a stock is being requested from a user, a grammar called "NASDAQ" that holds the names of all companies whose stock trades on the NASDAQ exchange is called. According to one embodiment, the files referenced by the grammar attribute are stored within the speech recognition engine. The files can contain as many or as few words for recognition as is desired. According to another embodiment, the grammar attribute can be used to specify more than one grammar.

The dyngrammar attribute supplements the recognition capability of the speech recognition engine by adding a dynamic component to a specified grammar. According to one embodiment, the dyngrammar attribute is used to insert one or more additional words into a specified grammar at run time of the TML document. For example, in the following TML, the dyngrammar attribute is used to insert four names into the grammar.

```
<DIALOG name="Person">
<INPUT grammar="nulitemList" dyngrammar=[JameslStevelJoelMike]
<GETSPEECH store="name=response( )">Who do you
    want to call?</GETSPEECH>
</INPUT>
<DIALOG>
```

According to another embodiment, the dyngrammar attribute is used to insert a dynamically generated list of words into a grammar at run time of a TML.

The effect of an OPTION Element can be enabled or disabled (filtered) based upon the evaluation of the "case" attribute of the element. If the "case" attribute evaluates to a boolean TRUE value, then the OPTION Element is in effect. If the "case" attribute evaluates to a boolean FALSE value, then the OPTION Element is not in effect. This can be used to dynamically control which options are available to a user during a given dialog context. When the dialog is providing speech recognition, this filtering can be used to control the effective grammar. Any words within the dyngrammar attribute of an OPTION Element that is disabled are not added to the effective speech recognition grammar. Alternatively, any words within the dyngrammar attribute of an OPTION Element that is enabled are added to the speech recognition grammar.

The timeout attribute, along with the calltimeout attribute and the maxtimeouts attribute, works to help ensure that a user's interaction with the system is accomplished in an expeditious manner. The calltimeout and maxtimeouts attribute were explained above in conjunction with the TML attribute. The timeout attribute is used to specify a time period during which a user can respond to a request for input before an error message is generated. According to one embodiment, the timeout attribute is used to specify a time in seconds that a user has to respond to an OPTION Element, a GET-NUMBER Element and/or a GET-SPEECH Element.

Other attributes of the INPUT Element are possible. The other attributes "pos," "case," "language," and "barge-in" apply to a number of different elements and are explained in more detail below.

OPTION Element

An OPTION Element is used to identify a predefined user input with a particular input mechanism. According to one embodiment, OPTION Elements comprise a child of an INPUT Element and are used to associate one or more choices available to a user (e.g., "yes," no, "buy" or "sell") with telephone keys. Alternatively, OPTION Elements comprise a child of an INPUT Element and are used to associate one or more choices available to a user (e.g., "yes," "no," "buy" or "sell") with a spoken user response. According to another embodiment, OPTION Elements facilitate call flow by directing control to another DIALOG Element in a TML document based on a user response.

An OPTION Element may also deliver content to a user. According to one embodiment, an OPTION Element comprises text that is to be spoken to a user. This text might have originated from dynamic data sources such as database engines and other software programs, and then been processed so as to form natural language sentences An OPTION Element may have one or more attributes and child elements. According to one embodiment, an OPTION Element may have a SPEECH Element and/or a SOUND Element as a child element. According to one embodiment, an OPTION Element may include "pos," "case," "language," "barge-in," "next," "repeat," "remove," "store," "wait," or "filter" attributes.

The filter attribute is used to define the phone key associated with an OPTION. According to one embodiment, if the filter attribute is not defined, the OPTION Element will assign the first unused key on the telephone to be used.

According to one embodiment, an OPTION Element uses the following syntax:
<OPTION [filter="1"] [next="DIALOG"]
 [remove="variable"] [store="variable"]
 [repeat="no | menu | all"] [case="expression"]>option text
 </OPTION>

In the above syntax, the "option text" may comprise a phrase such as "Press /f to hear about your portfolio" if the OPTION stands alone as a child of an INPUT Element. The "/f" is a reference command that refers to the filter for the OPTION Element and is explained below. Reference commands are explained in more detail below. According to another embodiment, the "option text" may comprise a phrase such as "Press /f for /e[IteratorKey( )]" when the OPTION is being used as a child of a FOR-EACH Element. The "/e[ ]" is a reference command that retrieves the result of the bracketed expression. The "IteratorKey( )" expression refers to the current item from a namespace being iterated through using a FOREACH Element. In this way, an OPTION can dynamically assign telephone keys to a number of variables.

Other attributes of the OPTION Element are possible. The "pos," "case," "language," "barge-in," "remove," "store," "next," "wait," and "repeat" attributes apply to a number of different elements and are explained in more detail below.

GET-NUMBER Element

The GET-NUMBER Element defines a particular numeric input that is expected from a user. According to one embodiment, a GET-NUMBER Element defines that a sequence or number of key presses from a telephone keypad is expected as input. The sequence may comprise a fixed-length, a variable length or a PIN code. Unlike an OPTION Element, a GET-NUMBER Element is not associated with predefined user selections. According to another embodiment, a GET-SPEECH Element defines that spoken response is expected from a user.

A GET-NUMBER Element may also deliver content to a user. According to one embodiment, an GET-NUMBER Element comprises text that is to be spoken to a user. According to other embodiments, the content may comprise grid reports, alert reports, or text from a separate file.

The GET-NUMBER Element may have one or more attributes or child elements. According to one embodiment, the GET-NUMBER Element comprises SPEECH and SOUND Elements as child elements. According to one embodiment, the GET-NUMBER Element comprises the "pos," "case," "language," "barge-in," "remove," "store," "next," "wait," "repeat," "type," "length," and "filter" attributes.

The type attribute is used to indicate that the GET-NUMBER Element is directed to a particular type of numeric input. According to one embodiment, the type attribute is used to indicate that a GET-NUMBER Element accepts a fixed length input, a variable length input or a PIN input. According to one embodiment, if a GET-NUMBER Element is used to request a fixed length input, the GET-NUMBER Element defines the exact number of digits that must be input. For example, "Enter your 10-digit telephone number, beginning with the area code." If a GET-NUMBER Element is used to request a variable length input, according to one embodiment, the GET-NUMBER Element allows the user to input up to a maximum number of digits, terminated by the # (pound key). If the user exceeds the maximum length, an ERROR Element may be executed. For example, the GET-NUMBER Element might be used to request a variable length input in response to the question: "How many shares of XYZZ stock would you like to buy today?" If a GET-NUMBER Element is used to request a PIN, the GET-NUMBER Element allows the user to enter a valid PIN. According to one embodiment, if a GET-NUMBER Element is used to request entry of a PIN, a maximum length for the PIN is specified by the length attribute.

The length attribute is used to specify an expected length for the input solicited by a GET-NUMBER Element. According to one embodiment, the length attribute is used to specify an exact length of the expected input when it is used in conjunction with a fixed type of GET-NUMBER Element. According to another embodiment, the length attribute is used to specify a maximum length for the expected input when it is used in conjunction with a variable type or PIN type of GET-NUMBER Element.

The filter attribute is used to define an additional condition that is used to determine the validity of the user input. According to one embodiment, the filter attribute is used in conjunction with the PIN type of GET-NUMBER Element in order to specify a PIN against which the user entered PIN is matched. According to one particular embodiment, if the user input does not satisfy the additional condition, execution will jump to an ERROR Element.

According to one embodiment, a GET-NUMBER Element comprises the following syntax:
<GETNUMBER next="name" type="fixed/pin/variable"
 length="number" filter="expression">some text</
 GETNUMBER>

The following example illustrates the various uses of the GET-NUMBER Element:
<TML>
<DIALOG name="Person" store="count.main">
<SPEECH>Hello. This demo shows you how to use the
 GETNUMBER statement.</SPEECH>
<INPUT default="none">
<OPTION next="fixed">Press \f to enter a fixed width
 number.</OPTION>
<OPTION next="variable">Press \f to enter a variable
 width number.</OPTION>
<OPTION next="PIN">Press \f to enter a PIN code.</
 OPTION>
<OPTION filter="*"*"" next="end">Press \f for end.</
 OPTION>
<ERROR repeat="menu">Please choose one of the following options.</ERROR>
</INPUT>
</DIALOG>
<DIALOG name="fixed" remove="number">
<INPUT default="footer">
<GETNUMBER next="gotit" type="fixed" length="4"
 store="number=response( )">Please enter 4 digits or
 press star to cancel.</GETNUMBER>
</INPUT>
</DIALOG>

```
<DIALOG name="variable" remove="number">
<INPUT default="footer">
<GETNUMBER next="gotif" type="variable"
   length="5" store="number=response( )">Please enter
   some digits. Press pound or just wait when you are
   done. A maximum of 5 digits will be accepted.</
   GETNUMBER>
</INPUT>
</DIALOG>
<DIALOG name="gotit">
<SPEECH>You entered the number e[number].</
   SPEECH>
<INPUT default="footer"/>
</DIALOG>
<DIALOG name="PIN">
<INPUT default="default">
<GETNUMBER next="gotPIN" type="PIN"
   filter="C1C61CD3777D" length="3"
   remove="NumTry" store="PIN=response( )">Please
   enter your PIN code.<GETNUMBER>
<ERROR case="Response( ) eq −1" next="Person">You
   pressed star.</ERROR>
<ERROR case="NumTry eq 2" store="NumTry">e[re-
   sponse( )] was not the correct PIN code.
This is your final attempt.</ERROR>
<ERROR case="3 gt NumTry" store="NumTry">e[re-
   sponse( )] was not the correct PIN code.
Please try again. You have \e [3-NuinTry] attempts left.</
ERROR>
   <ERROR case="NumTry ge 3" next="end"
      repeat="all"/>
</INPUT>
</DIALOG>
<DIALOG name="gotPIN">
<SPEECH>Thank you for entering the correct PIN code.
   Your response collection should now contain the value
   PIN=\e[PIN].</SPEECH>
<INPUT defaul="default"/>
</DIALOG>
<DIALOG name="footer">
<INPUT default="default">
<OPTION next="back">Press \f to do it again.</OP-
   TION>
<OPTION next="Person">Press \f to go back to the main
   menu.<\OPTION>
<OPTION filter="*" next="wrong"/>
<ERROR case="response( ) 1t 0" next="Person">Action
   cancelled.</ERROR>
<ERROR repeat="input">Your entry '\e[response( )]'
   was invalid. Please make a valid entry.</ERROR>
</INPUT>
<DIALOG>
<DIALOG name="end">
<SPEECH>Thank you for using this demo. Good bye.</
   SPEECH>
</DIALOG>
<DIALOG name="wrong">
<SPEECH>Sony, you did not enter the correct PIN. This
   call will terminate now. Good bye.</SPEECH>
</DIALOG>
</TML>
```

Other attributes of the GET-NUMBER Element are possible. The "pos," "case," "language," "barge-in," "remove," "store," "next," "wait," and "repeat" attributes are used in conjunction with a number of different elements and are explained in more detail below.

GET-SPEECH Element

The GET-SPEECH Element defines a spoken input that is expected from a user.

According to one embodiment, a GET-SPEECH Element defines that a particular spoken input is expected from a user in response to a request for input. Unlike an OPTION Element, a GET-SPEECH Element is not associated with predefined user selections.

A GET-SPEECH Element may also deliver content to a user. According to one embodiment, a GET-SPEECH Element comprises text that is to be spoken to a user. According to other embodiments, the content may comprise grid reports, alert reports, or text from a separate file.

The GET-SPEECH Element may have one or more attributes or child elements. According to one embodiment, the GET-SPEECH Element comprises SPEECH and SOUND Elements as child elements. According to one embodiment, the GET-SPEECH Element comprises the "pos," "case," "language," "barge-in," "remove," "store," "next," "wait," "repeat" "type," "length," and "filter" attributes.

The filter attribute defines a condition that is used to determine the validity of spoken user input. According to one embodiment, when the filter attribute is used in conjunction with GETSPEECH, the spoken user input is processed through a speech recognition engine and the output of the speech recognition engine is compared with the specified filter criteria. the speech recognition processes the vocal utterances from the call participant, and returns the resulting text words to the TML parser. According to one particular embodiment, if the user input does not satisfy the filter condition, execution will jump to an ERROR Element. According to one embodiment, the filter attribute is used to specify a PIN against which the user input is matched.

According to one embodiment, the GET-SPEECH Element has the following syntax:

```
<GETSPEECH    filter="expression"<"some    text"</
   GETSPEECH>
```

Other attributes of the GET-SPEECH Element are possible. The "pos," "case," "language," "barge-in," "remove," "store," "next," "wait," and "repeat" attributes are used in conjunction with a number of different elements and are explained in more detail below.

ERROR Element

An ERROR Element is used to define a response to invalid input by a user. For example, an ERROR Element may be used to define the response by the voice service system to entry of an undefined input by a user in response to a series of OPTION Elements. In another example, an ERROR Element may be used to define the response by the voice service system to entry of an input that does not meet specified criteria in response to a GET-NUMBER or GET-SPEECH Element. According to one embodiment, an ERROR Element includes text that is delivered to a user in response to an invalid input. According to one embodiment, an ERROR Element is the child of an INPUT Element.

An ERROR Element may also defer execution to a different DIALOG Element or repeat parts or all of the current DIALOG Element. This enables the same type of error occurrence to be handled without repeating the TML elements.

ERROR Elements also may have one or more attributes and child elements. According to one embodiment, an ERROR Element may have a SPEECH Element and/or a SOUND Element as child elements. According to one embodiment, an ERROR Element comprises "pos," "case," "language," "barge-in," "next," "repeat," "remove," "store"

and "wait" attributes. These attributes are used in conjunction with a number of different elements and are explained in more detail below. Other attributes and child elements are possible.

According to one embodiment, an ERROR Element follows the following syntax:
<ERROR [next="DIALOG"] [store="variable"] [remove="variable"]
[repeat="no | menu | all"] [case="expression"]>option text </ERROR>

As an example, the ERROR Element may be used to present an error message and then repeat a previous request for information, e.g., a request for a number.
</TML>
<DIALOG name="Person">
<SPEECH>This is a demonstration of the ERROR element. Please enter a number between 3 and 12, followed by the pound key.</SPEECH>
<INPUT>
<GETNUMBER type="variable" length="2" filter="response( ) gt 3 and response( ) 1t 12" store-"number=response( )" next="accept"/>
<ERROR case="response( ) 1t 3" repeat="input">
It must be greater than 3. Please try again.</ERROR>
<ERROR case="response( ) gt 12" repeat="input">
It must be less than 12. Do it once more.</ERROR>
<ERROR repeat="input">You entered 3 or 12, but that was wrong. Try again.</ERROR>
</INPUT>
</DIALOG>
<DIALOG name="accept">
<SPEECH>Thank you. You entered \e[number].</SPEECH>
<INPUT>
<OPTION next="Person">Press \f to do it again.</OPTION>
</INPUT>
</DIALOG>
</TML>

SYS-ERROR Element

A SYS-ERROR Element defines a response to a predetermined system event. For example, a SYS-ERROR Element may be used to define the response to expiration of the waiting time for a user input. According to one embodiment, a SYS-ERROR Element includes text that is delivered to a user in response to an event such as the lack of a response from a user. According to one embodiment, a SYS-ERROR Element is the child of an INPUT Element.

A SYS-ERROR Element may also defer execution to a different DIALOG Element or repeat parts or all of the current DIALOG Element. This enables the same type of error occurrence to be handled without repeating the TML elements.

SYS-ERROR Elements also may have one or more attributes and child elements. According to one embodiment, a SYS-ERROR Element may have a SPEECH Element and/or a SOUND Element as a child element. According to one embodiment, a SYS-ERROR Element comprises "pos," "case," "language," "barge-in," "next," "repeat," "remove," "store," "wait" and "type" attributes.

The type attribute is used to designate a type of error that is handled by a particular instance of a SYS-ERROR Element. According to one embodiment, the SYS-ERROR Element may indicate a user time out ('type="UserTimeOut"'). This SYS-ERROR Element is used to indicate that a user has not responded within an allocated response time. According to another embodiment, the type attribute is used to indicate that an invalid "next" attribute ('type="next"') is present. Invalid "next" attribute may comprise, for example, a link to another active voice page that is not functioning or HTTP errors.

According to one embodiment, a SYS-ERROR element has the following syntax:
<SYS-ERROR type "event" [next="dialog"] [store —"variable"]
[remove="variable"] [repeat="none| input| options| getnumber|getspeech| all"]
[case="expression"]>option text </SYS-ERROR>

The following example illustrates the use of a SYS-ERROR Element:
<TML>
<DIALOG name="Person">
<SPEECH>This example demonstrates the SYS-ERROR.</SPEECH>
<INPUT>
<OPTION next="unknown">Press \f for a broken link.</OPTION>
<ERROR repeat="input">That key was not defined.</ERROR>
<SYS-ERROR type="next" repeat="input">That link was not valid.</SYS-ERROR>
<SYS-ERROR type="UserTimeOut" repeat="input">Don't wait too long with your response.</SYS-ERROR>
<INPUT>
</DIALOG>
</TML>

The "pos," "case," "language," "barge-in," "next," "repeat," "remove," "store," and "wait" attributes are used with a number of different elements and are explained in more detail below. Other attributes are possible.

RECORD Element

A RECORD Element enables a user to record speech or other sounds. According to one embodiment, the RECORD Element is used to record a message for another user, or to archive a speech exemplar for recognition purposes. According to one embodiment, a recording is saved to a temporary file on a call server until it is committed. The COMMIT Element is explained below.

According to one embodiment, when a RECORD Element is processed, a call server records audio input from a user for a maximum number of seconds, or until a particular key is pressed. According to this embodiment, there are three ways that execution of a RECORD Element is terminated:

1. reaching a specified maximum time;
2. being silent for a specified maximum time; and,
3. pressing a key during recording.

After a RECORD Element is processed, TML control can pass in a number of ways. According to one embodiment, if the audio recorded from a user is invalid, i.e., it contains silence, then execution of the TML proceeds to an ERROR Element. Alternatively, if an invalid input is received, the current DIALOG may be repeated. If a user's input has used up the available recording time, a SYS-ERROR element may be activated. According to another embodiment, if a valid audio recording is received, i.e., not silence, then control proceeds in the normal fashion to the next DIALOG Element as specified by the TML. Other control progressions are possible.

The RECORD Element has one or more attributes. According to one embodiment, the RECORD Element has "pos," "case," remove "store" "next," "wait," "repeat" and "maxlength" attributes. According to one embodiment, the RECORD Element has no child elements.

The maxlength attribute is used to specify the maximum length for a user recording. According to one embodiment, the maxlength is used to specify a maximum length in seconds for a user recording.

According to one embodiment, the following syntax applies to the RECORD Element:

<RECORD maxlength "time in seconds"</RECORD>

The "pos," "case," "remove," "store," "next," "wait," and "repeat" attributes are used in conjunction with a number of elements and are explained below. Other attributes are possible. One example of the use of the RECORD Element is message relaying. One user of the system can record a message, and that message can then be played back and heard by other users (through the use of the SOUND Element).

COMMIT Element

A COMMIT Element enables a temporary sound file, e.g., one recorded using the RECORD Element, to be stored to a permanent address. According to one embodiment, the COMMIT Element is used to archive a sound file, e.g., for later use for recognition purposes. According to one particular embodiment, a COMMIT Element follows an occurrence of a RECORD Element when it is desirable to permanently store the recorded audio.

The COMMIT Element may comprise a number of different attributes. According to one embodiment, the COMMIT Element comprises "pos," "case," and "destination" attributes. According to another embodiment, the COMMIT Element does not have any child elements.

The destination attribute is used to specify a file name and location in which the temporary sound file is to be stored. According to another embodiment, the destination attribute specifies a filename to be assigned to the audio file that is to be stored in a default location.

According to one embodiment, the following syntax is used for the COMMIT Element:

<COMMIT destination="filename and location"</COMMIT>

Other attributes are possible for the COMMIT Element. The "pos" and "case" attributes are used in conjunction with a number of different Elements and are explained in detail below. In a simple message relay system, the combination of the RECORD and COMMIT Elements allows the invention to record sound from a user (using the RECORD Element), play the sound back for the user for confirmation or another try (using the SOUND Element), and then finally commit the recording to permanent storage (using the COMMIT Element) so that it can be played for other users.

WAIT Element

A WAIT Element is used to provide a period of time during which no interaction between user and system is expected, e.g., when a database query is being run. According to one embodiment, the WAIT Element enables audio such as music, to be played during the waiting period. According to one embodiment, the WAIT Element comprises a particular type of DIALOG Element.

The WAIT Element may comprise a number of different attributes and child elements. According to one embodiment, the WAIT Element may include SPEECH Elements, SOUND Elements, FOR-EACH Elements, INPUT Elements and/or SYS-ERROR Elements as child elements. According to another embodiment, the WAIT Element may include "pos," "case," "language," "barge-in," "remove," "store" and "name" attributes.

According to one embodiment, a WAIT Element comprises the following syntax:

<WAIT name="name" remove="variables" store="expressions">
[<SPEECH>]
[<SOUND>]
[<FOR-EACH>]
[<INPUT>]
</WAIT>

Other attributes are possible. The "pos," "case," "language," "barge-in," "remove," and "store" attributes are used in conjunction with a number of different elements and are explained below. The "name" attribute is explained in conjunction with the DIALOG Element above.

N-BEST-FILTER Element

An N-BEST-FILTER Element is used in conjunction with speech recognition and enables confirmation of an utterance that was not initially understood. According to one embodiment, the N-BEST-FILTER Element is used to query a user with a list of designated variables in order to confirm the user's utterance. According to one embodiment, the N-BEST-FILTER Element prompts a user to confirm an utterance by speaking a sub-set of the elements in a particular grammar that most closely resemble the vocal utterance from the user, one by one. After an element of the grammar is spoken to the user, the user is asked to confirm whether or not the element spoken was the same as the user's utterance. If not, then that element is stored in the namespace nbest. When the user confirms an element of the grammar as her utterance, then TML execution continues.

The N-BEST-FILTER Element may have a number of different attributes. According to one embodiment, the N-BEST-FILTER Element may include the "pos," "case," "namespace," and "expression" attributes. Other attributes are possible. According to another embodiment, the N-BEST-FILTER Element has no child elements.

The namespace attribute is used to store the results that have already been checked. According to one embodiment, the namespace attribute specifies a namespace that is used to hold the elements of a grammar that have been confirmed as not being the user's utterance. In one particular embodiment, the namespace "nbest" is used to hold the confirmed results. It is possible to use other namespaces for an N-BEST-FILTER.

The expression attribute specifies the part of a speech input that is to be confirmed. According to one particular embodiment, the expression attribute is used to specify the value of a particular slot.

According to one embodiment, the N-BEST-FILTER Element has the following syntax:

<N-BEST-FILTER namespace="nbest" expression="value('element')"</N-BEST-FILTER>

The following example TML illustrates the use of the N-BEST-FILTER Element. The example enables a name to be returned from a user when it is expected that the grammar will return many similar results. The grammar is constructed so that it will return a single slot called "name." Hence, a list of three speech results could be something like this: john{<name john>}; ron {<name ron>}; don {<name don>}. In the person dialog below, the user is asked for a name. At this point, the "nbest" namespace is cleared because it will receive the names that have already been verified.

<TML>
<DIALOG name="Person" remove="ns:nbest">
<SPEECH>Please say the name.</SPEECH>
<INPUT grammar=".name">

```
<GETSPEECH store="name=value ('name'); 'nbest.'+
    name" next="conform"/>
</INPUT>
</DIALOG>
<DIALOG name="confirm">
<SPEECH>You said \e[name]. Is this correct?</
    SPEECH>
<INPUT>
<OPTION next="reprompt">Press \f for no.</OPTION>
<OPTION next="end">Press \f for yes.</OPTION>
<ERROR repeat="all">Wrong input.</ERROR>
</INPUT>
</DIALOG>
<DIALOG name="reprompt">
<SPEECH>Say the name again.</SPEECH>
<INPUT grammar=".name">
<N-BEST-FILTER             namespace="nbest"
    expression="value('name')"/>
<GETSPEECH store="name=value('name'); 'nbest.'+
    name" next="confirm"/>
<ERROR next="Person">I'm sorry, but I don't under-
    stand.</ERROR>
<INPUT>
</DIALOG>
<DIALOG name="end">
<SPEECH>Good bye, \e[name].</SPEECH>
</DIALOG>
</TML>
```

TRANSFER-CALL Element

A TRANSFER-CALL Element enables a call to be transferred to another telephone number for service. According to one embodiment, the TRANSFER-CALL Element is used to transfer a call to another telephone number while keeping the original line open for further processing. Alternatively, the TRANSFER-CALL Element is used to transfer a call to another telephone number and to terminate the original connection.

The TRANSFER-CALL Element has a number of different attributes. According to one embodiment, the TRANSFER-CALL Element has "pos," "case," "dial," "transfer-type," "detect-mode," "exitDTMF," and "exitWord" attributes. Other attributes are possible. According to another embodiment, the TRANSFER-CALL Element has no child elements.

The dial attribute specifies a telephone number to which the current call is to be transferred. According to one embodiment, the dial attribute specifies an area code and telephone number that is to be dialed. According to another embodiment, the dial attribute specifies a contact, and a contact list or directory is used to determine a number that is to be dialed.

The transfer-type attribute specifies the type of transfer that is to take place. According to one embodiment, when a connection is made with the number specified by the dial attribute, the original connection is terminated. According to another embodiment, when a connection is made with the number specified by the dial attribute, the original connection is kept open so that control may be transferred back. According to one particular embodiment, these two different types of call transfers are indicated using the numerals "0" and "1." Other types of transfers are possible.

The detect-mode attribute specifies whether to use receiver-type detection technology. Some call-handling computer hardware (e.g. Dialogic's call-processing boards) have the ability to detect whether the entity answering a phone call placed by the hardware is answered by a person or a machine (e.g. an answering machine or voice mail system). The detect-mode attribute controls whether this detection should be used or not.

The exitDTMF attribute specifies the manner in which a call transfer operation is to be terminated using the telephone keypad. According to one embodiment, the exitDTMF attribute specifies a sequence of telephone keys that can be pressed in order to return control to the original TML. The return of control occurs by terminating the transfer connection and returning to the original connection where the original connection was maintained. Other embodiments are possible.

The exitWord attribute functions analogously to the exitDTMF attribute. According to one embodiment, the exitWord attribute is used to specify a command word that can be spoken by a user in order to transfer call control back to the original TML. The return of control occurs by terminating the transfer connection and returning to the original connection where the original connection was maintained. Other embodiments are possible.

According to one embodiment, the syntax of the TRANSFER-CALL Element is as follows:

```
<TRANSFER-CALL dial="telephone number" transfer-
    type="1 or 0" detect-mode="1 or 0" exitDTMF="key
    sequence" exitWord="command word"</TRANFER-
    CALL>
```

The following example will help illustrate the use of the TRANSFER-CALL Element.

```
<TML>
<DIALOG name="Person">
<SPEECH>Call Transfer Demonstration.</SPEECH>
<INPUT>
<OPTION next="transfer">Press \f to transfer the call.</
    OPTION>
</INPUT>
<DIALOG>
<DIALOG name="transfer">
<TRANSFER-CALL     dial="7038989800"     tranfer-
    type="0"    detect-mode="1"    exitDTMF    "*99"
    exitWord="angel"</TRANSFER-CALL>
</DIALOG>
</TML>
```

According to this example, the transfer-type "0" indicates that the original line is kept open during the transfer. The user can return to the original line by pressing "*99" or by saying the word "angel."

The "pos" and "case" attributes are used in conjunction with a number of different Elements and are explained in more detail below.

Web Queries

According to one embodiment, the markup language of the present invention can be used in conjunction with existing web pages, e.g., to access and submit information. According to one embodiment, form variables are submitted to a web server and information from a web page is retrieved as text strings or as TML pages. According to one embodiment, web queries are made using the "retrieve (URL)" operator and the "next" attribute, both of which are explained below. According to one embodiment, there are two particular namespaces that are used for this purpose—GET and POST. According to this embodiment, when the retrieve function and next attribute are used in conjunction with GET and POST, if there are any variables in the POST namespace, they are submitted in the form of a POST query to a webserver. If the POST namespace is empty, then a GET query is made, submitting all variables inside the GET namespace. GET and POST are automatically cleared after a successful operation.

Attributes

As explained above, attributes are used to qualify elements. According to one embodiment, TML comprises a number of attributes that may apply to many different elements. These attributes are explained below.

Name Attribute

The name attribute is used to provide a means of identification for TML elements and, thus, enable them to be referenced by other TML elements. According to one embodiment, the name attribute applies to DIALOG elements. According to one embodiment, names consist of letters and numbers. Names may be case sensitive and are preferably unique.

Certain words or strings have a defined meaning in the system and, therefore, their use as names is limited. According to one embodiment, the words "person," "device," "back" and "default" have a defined meaning in TML. Other words may be predefined by a system administrator.

The name "person" is usually given to the first DIALOG Element in a TML document. A DIALOG Element with this name may be present in every TML document.

The name "device" defines the DIALOG Element that is invoked when the call from a voice service system has reached a voicemail system or an answering machine instead of a person. Accordingly, this DIALOG Element should not define any menus or inputs, because no feedback is expected from a device. If a "device" DIALOG Element is not defined, the text of the "person" DIALOG Element may be used for answering machines. Any menus defined by the "person" DIALOG Element are generally not delivered.

The word "back" is typically reserved as an alternative to the reference command "\dl" (explained below). Therefore, the word "back" is not a legal value of the name attribute.

The word "default" is used to define a DIALOG element that is added to all current DIALOG Elements in a TML by default. According to one embodiment, a DIALOG Element having the name "default" may be present in every TML document.

Next Attribute

The next attribute is used to determine the DIALOG Element where execution continues, i.e., the target DIALOG. The target DIALOG Element may be directly referenced by name, i.e., next=name. Alternatively, the target DIALOG Element may be indirectly referenced to the previously visited DIALOG Elements using the arguments "back" and "current." According to one embodiment, if the next attribute is not specified, execution may continue at the current DIALOG Element. This may be useful for dynamic OPTION, GETNUMBER and GETSPEECH Elements that use case expressions (explained below).

According to one embodiment, the next attribute uses the following syntax:
next="DIALOG element"
next="back"
next="current"

The following is an example using the next attribute. In this example, the first four options declare "jumps" to other DIALOG elements. The last option jumps back to the current DIALOG element.

<DIALOG name="stocks">
    <SPEECH>Please choose one of the following symbols.</SPEECH>
    <INPUT>
    <OPTION next="MSTR">For MSTR, press \f.</OPTION>
    <OPTION next="MSFT">For MSFT, press \f.</OPTION>
    <OPTION next="IACO">For IACO, press \f.</OPTION>
    <OPTION next="ORCL">For ORCL, press \f.</OPTION>
    <OPTION>To repeat these options, press \f.</OPTION>
    </INPUT>
    </DIALOG>

According to one embodiment, the next attribute refers to a DIALOG element in a TML document other than the current TML document. According to one embodiment, a URL is used to identify the TML document and, the pound sign (#) is used to identify the name of the DIALOG. For example, the following statement refers to the DIALOG "main."
next="http://myserver.com/myTML/doc123.xml#main"

According to one embodiment, this "next" statement causes the voice service system to download the document "doc123.xml" from the remote server and jump to the DIALOG element "main." According to one embodiment, the contents of the GET and POST namespaces are transmitted as form variables when an http request is made. Therefore, if these namespaces contain variables that should not be transmitted, they should be cleared using the "remove" attribute at the beginning of the calling DIALOG. The following is an example of the use of the "next" attribute to access http information.

<DIALOG name="link" remove="ns.GET; ns:POST">
    <INPUT>
    <OPTION next="http://myserver.com/myfile.xml">Press 1 to download a static file.<OPTION>
    <OPTION store "GET.symbol='MSTR'" next="http://myserver.com/quote.asp">Press 2 for a live stock quote.</OPTION>
    </INPUT>
    </DIALOG>

Repeat Attribute

The repeat attribute is used to designate a portion of a DIALOG element to be repeated. This may be useful when the flow of control returns to a DIALOG element that has already been read, for example, after invalid inputs or when going back to a main menu. According to one embodiment, when the repeat attribute is used in conjunction with a DIALOG Element containing INPUT and OPTION Elements, the repeat attribute is used to determine a portion of the DIALOG Element that is read if the DIALOG Element is revisited. In this way, OPTION Elements can be used by many different DIALOG Elements without repetition. According to another embodiment, when the repeat attribute is used in conjunction with an ERROR Element, all OPTION, GETNUMBER or GETSPEECH Elements are repeated.

The repeat attribute may have certain predefined arguments. According to one embodiment, the repeat attribute used in TML comprises the following predefined arguments: "all," "none," "input," "getnumber," "getspeech" and "number." The "all" argument is used to designate an entire DIALOG Element for repetition. According to one embodiment, the all argument is the default argument.

The "none" argument indicates that no part of an element is to be repeated. According to one embodiment, the "none" argument is used in conjunction with an ERROR Element so that the error message is read to a user instead of DIALOG content.

The "input" argument is used to indicate that the complete INPUT Element of a DIALOG Element is to be repeated. The complete INPUT Element includes all child OPTION, GETNUMBER, GETSPEECH, SPEECH and SOUND Elements.

The "getnumber" argument is used to indicate that only the GETNUMBER Element of a DIALOG Element is to be repeated.

The "getspeech" argument is used to indicate that only the GETSPEECH Element of a DIALOG Element is to be repeated.

The "options" argument is used to indicate that only the OPTION Elements of a DIALOG Element are to be repeated.

A numeric argument is used to determine certain portions of a DIALOG Element that are to be repeated. For example, the following numbers may be used to designate portions of a DIALOG Element:

1—DIALOG text

2—error text

4—input text

8—INPUT elements (options and getnumbers)

With these definitions in place, the attribute may be specified: repeat="10." This would cause the error message (2) and the INPUT elements (8) to be repeated because the numeric argument is the sum of the numeric codes for those two portions.

According to one embodiment, the following syntax is used for the repeat attribute:

repeat="all/none/input/getnumber/getspeech/options/number."

The following is an example of the repeat attribute. In this example, option 1 repeats the whole message, including the SPEECH child of the DIALOG element. Option 2 repeats the SPEECH child of the INPUT element, and the text of the OPTION Elements, but not the SPEECH child of the DIALOG element. Option 3 only repeats the options.

```
<DIALOG name="test Repeat">
<SPEECH>This DIALOG demonstrates the repeat attribute. </SPEECH>
<INPUT>
<SPEECH>Please choose one of the following options. </SPEECH>
<OPTION repeat="all">To hear everything again, press 1. </OPTION>
<OPTION repeat="input"> To hear menu again, press 2</OPTION>
<OPTION repeat="options"> To repeat the options, press 3. </OPTION>
<ERROR repeat="none"> Please enter 1, 2 or 3. </ERROR>
</INPUT>
<DIALOG>
```

Store Attribute

The store attribute is used to define and/or manipulate one or more variables in the Response Collection. Each variable operation may have the following format:

varname operator expression

Varname comprises the name of the variable. Operator comprises one of the operators explained below. Expression comprises any arithmetic or logical expression as explained below.

According to one embodiment, several store operations may be separated by a ";". The order of execution is the order in which operations appear and operations may act on the same variable.

According to one embodiment, the following syntax is used with the store attribute:

store="var1 [operator expression]; var 2 [operator expression] . . . "

Operators and expressions are explained below in the section titled "Expressions." According to one embodiment, an operator comprises any logical or arithmetic operator and an expression comprises and mathematical or logical expression.

According to another embodiment, the operator and expression may be omitted. According to one embodiment, the simplified syntax is as follows:

store "varname"

In this case, if a variable has an associated value, the stored value is set to the existing value +1. If a variable has no associated value in the Response Collection, its value is set to 1.

The following table provides examples of use of the store attribute.

| | |
|---|---|
| store = "MSTR" | adds variable "MSTR" with value +1. If MSTR already exists, its value is increased by one. If MSTR does not exist, its value is set to 1. |
| store = "buyMSTR= 100" | adds "buyMSTR" with value 100. |
| Store = "MSTR; buyMSTR= 100" | adds "MSTR" with value +1 and "buyMSTR" with value 100. |
| store = "buy.MSTR +=25" | adds 25 to the existing value of "buyMSTR." If "buyMSTR" doesn't exist yet, its value is set to 25. |
| Store = "buy.MSTR -=10" | subtracts 10 from the existing value of "buyMSTR" or sets "buyMSTR" to zero, whichever is larger. If this variable does not exist yet, its value is set to 0. |
| Store = "count = (count+1) %6" | increment variable 'count' and takes modulus of 6. This permits the variable cycle from 0 to 5. |

Remove Attribute

The remove attribute is used to remove one or more variables from the Response Collection. According to one embodiment, after the remove attribute is used on a variable, the item is no longer present in the Response Collection. This should be distinguished from setting the variables value to zero.

According to one embodiment, the following syntax is used for the remove attribute:

remove="key 1; namespace.key 2; ns:namespace; . . . "
    remove +"all"

In the above syntax, key1 has no specified namespace, so the temporary namespace is used, and the variable key1 is removed. Because a namespace is specified for key2, the variable key2 is removed from the specified namespace. The syntax ns:namespace indicates that all variables starting with the prefix "namespace" are removed.

According to one embodiment, if an element contains both a store and a remove attribute, the remove attribute is applied first. For example, assume the Response Collection contains the variable "buy:MSTR=50," and the following element is executed:

<ELEMENT store=*buy:MSTR+=10" remove=*buy:MSTR"

After execution, the Response Collection will contain "buy: MSTR=10."

Case Attribute

The case attribute is used to define a condition that must resolve to true for a parent element to be used. According to one embodiment, the case attribute is used in conjunction with all of the elements except the TML Element and the DIALOG Element. According to one embodiment, case statements can include DIALOG elements or variables in the Response Collection. The condition may compare the value of a variable with a number, or it may compare two or more variables with each other. According to one embodiment, if two variables are compared, and at least one of them is undefined, the whole expression may be resolved to be false. Several expressions may be combined in a single case statement using the arithmetic and logical operators listed in the table below. According to one embodiment, the AND operator takes precedence over the OR operator.

According to one embodiment, the following syntax is used with the case attribute:

case="expression"

The expression may include variables and arithmetic or logical operators. The "variable" in any of these statements may comprise the name of any variable in the variable collection.

According to one embodiment, the case statements are evaluated using certain logical rules. If "variable" is used in a case statement, the statement evaluates as true if the variable exists and has a non-zero, non-empty string, value. If "!variable" is used in a case statement, the statement evaluates as true if the variable does not exist, or has a value of zero or an empty string. If "expression" is used in a case statement, the statement evaluates as true if the expression evaluates to a non-zero value or to a non-empty string. If "!expression" is used in a case statement, the statement evaluates as true if the statement evaluates as zero or an empty string. The logical operators that may be used in case statements are explained below in the section titled "Expressions."

The following is a list of examples of usage of the case attribute.

| | |
|---|---|
| case = "MSTR" | true if "MSTR" exists in the variable collection |
| case = "!MSTR" | true if "MSTR" is not present in the variable collection |
| case= "abs(buy.MSTR) gt 100" | true if the absolute value of "buy:MSTR" is greater than 100 |
| case= "buy.MSTR ge buy.ABCD" | true if "buy:MSTR" is greater or equal to "buy:ABCD" |
| case="dialogname(1) eq 'person'" | true if calling DIALOG element has the name "person" |
| case= "MSTR or ABCD" | true if the symbol MSTR or the symbol ABCD (or both) are defined |
| case = "MSTR and val eq 3 or !ABCD and val = 4" | true if either or both of the following are true: MSTR is defined, and the variable "val" has the value 3; or ABCD is not defined, and the variable "val" has the value 4. |
| case = "symbol eq 'MSTR'" | true if the variable symbol has the value "MSTR" |
| case = "number eq MSTR" | true if the variable number has the same value as the variable MSTR. |

Pos Attribute

The pos attribute is used for "blending" several TML files into a single TML document. The pos attribute may be applied to all of the elements except DIALOG Elements and TML Elements. Blending combines the contents of two dialogs with the same name, for example if one dialog is from the current TML document (which is aka an Active Voice Page), and the other dialog is from the background TML document. When blending occurs, the Elements contained within two blended dialogs are combined. The "pos" attribute determines the ordering of the combinations, as defined below. The blending process is explained in more detail below in conjunction with generation of a TML document. According to one embodiment, the pos attribute is used to determine the positional preference of an element in the combined documents. Elements with lower numbers may be placed before elements with higher numbers. Elements with the same number may be placed in the order of their original documents.

According to one embodiment, the following syntax is used with the pos attribute:

pos="number"

Expressions and Operators

According to one embodiment, expressions are used to define various operations, such as, logical and arithmetic operations. For example, expressions are used in combination with many of the attributes discussed above. According to one embodiment, expressions consist of literal values, variables, and operators. Literal values comprise, for example, numbers and strings. According to one embodiment, numbers in exponential form and strings are enclosed in single quotes. According to another embodiment, any common operator may be used in expressions.

The following tables comprise a list of meanings that are associated with certain operators according to one embodiment of the present invention. According to one embodiment, the operators may comprise Assignment Operators that assign a value to a variable, Arithmetic operators that perform arithmetic operations on variables, or string operators. According to one embodiment, these operators are also used with the "case" and "filter" attributes explained above.

A first set of operators are assignment operators. According to one embodiment, assignment operators comprise a set of operators used in expressions in conjunction with the "store" attribute explained above. According to one embodiment, the assignment operators described in the table below are used in conjunction with the markup language of the present invention. Other operators are possible.

| Assignment Operator | Meaning |
|---|---|
| = | Assign new value to variable. |
| += | Store sum of old value and new value. |
| -= | Subtract new value from old value. |
| *= | Multiply new value with old value. |
| /= | Divide old value by new value. |
| %= | Store modulus of old value and new value. |

A second set of operators comprise arithmetic operators. According to one embodiment, arithmetic operators comprise operators used in expressions with the "store," "case," and "filter" attributes explained above. According to one embodiment, the arithmetic operators described in the table below are used in conjunction with the markup language of the present invention. Other operators are possible.

| Arithmetic Operator | Meaning |
|---|---|
| + | Addition. |
| - | Subtraction or negation. |

-continued

| Arithmetic Operator | Meaning |
| --- | --- |
| * | Multiplication. |
| / | Division. |
| % | Remainder. |
| int(n) | Smallest integer greater or equal to "n." |
| abs(n) | Absolute value of "n." |
| ^ | Power, for example, 23 is 8. |
| sqr(n) | Square root of "n" ("n" must be greater than 0). |
| round (n, m) | Round "n" to "m" decimal places, or to 0 places if "m" is not specified. |

A third set of operators comprise string operators. According to one embodiment, string operators comprise parts of expressions in the "store," "case," and "filter" attributes explained above. According to one embodiment, the string operators described in the table below are used in conjunction with the markup language of the present invention. Other operators are possible.

| String Operator | Meaning |
| --- | --- |
| + | Concatenate. |
| mid (string, start[, length]) | Get substring of "string," starting at position start, and ending at position "length," or up to end of string if "length" is not specified. According to one embodiment, strings start at position 1. |
| instr (string 1, string 2[, start]) | Return position of "string2" in "string 1," or 0 if "string 2" cannot be found in "string 1." Optionally, a start position "start" may be specified. |
| spell (string[, separator]) | Insert spaces between each character of "string" to force the (TTS) engine to spell out each character of "string." For example, spell ('MSTR') results in the string: M S T R. Optionally, a different "separator" can be specified as a second argument. For example, spell ('MSTR', ',') inserts commas instead of spaces to create the string: "M, S, T, R." |
| length (string) | Return length of "string." For example, length ('hello') is 5. |

Another set of operators comprise logic operators. According to one embodiment, logic operators comprise operators used in expressions in the "store," "case," and "filter" attributes explained above. According to one embodiment, the logical operators described in the table below are used in conjunction with the markup language of the present invention. Other operators are possible.

| Logic Operator | Alternative Syntax | Meaning |
| --- | --- | --- |
| ! | none | logical not |
| eq | = | equal |
| ne | != | not equal |
| lt | < | less than |
| gt | > | greater than |
| le | <= | less or equal |
| get | >= | greater or equal |
| and | & | Conjunction, i.e., logical and |
| or | | Disjunction, i.e., logical or |
| e1 ? e2:e3 | | Conditional operator. Evaluates expression "e1." If result is true, expression "e2" is returned. Otherwise, expression "e3" is returned. |

According to another embodiment, there are a number of operators that may be used to retrieve information, for example, in conjunction with an expression or otherwise. According to one embodiment, the following retrieval operators are used in conjunction with the markup language of the present invention.

| Retrieval Operator | Meaning |
| --- | --- |
| @(expression) | Retrieve the value of variable denoted by the result of expression. For example, when the variable var has the value 3, @('out.' + var) retrieves the value of the variable "out.3." |
| Retrieve(URL) | Retrieve the data referenced by the URL. According to one embodiment, this operator may transmit GET and POST variables. For example: store = "POST.symbol = 'MSTR'; answer = retrieve('http://strategy.com/getquote')" This sends the form variable "symbol=MSTR" to a web server and stores the answer of the server in the variable "answer." If the retrieve operation fails (for example, because the remote server is unavailable), the result of retrieve( ) is an empty string. |
| Retrieval Operator | Meaning According to one embodiment, all variables in the GET and POST namespace will be removed after using this function. |

According to another embodiment, certain functions maybe used to retrieve a history of pages (i.e., markup language documents, web pages, etc.) that have been used. According to one embodiment, a page is stored as a fully qualified URL, for example, "http://myserver/tmlfiles/mypage.xml#main." According to one embodiment, the operators described in the table below are used in conjunction with the markup language of the present invention. Other operators are possible.

| History Operator | Meaning |
| --- | --- |
| URL(n) | Retrieves the recently visited fully qualified URLs. URL(0) is the current URL, and URL(1) is the previous URL.. |
| DocumentURL(n) | Retrieves only the document address of recently visited pages. |
| DialogName(n) | Retrieves the recently visited dialog names. DialogName(0) retrieves the name of the current dialog. |
| DialogCount( ) | Retrieves the number of times the current dialog has been visited. According to one embodiment, the count begins with zero for the first visit. |

According to another embodiment, there are certain functions that are used with the iterator key (explained below). According to one embodiment, the functions described in the table below are used in conjunction with the markup language of the present invention. Other operators are possible.

| Iterator Operator | Meaning |
| --- | --- |
| IteratorKey( ) | Retrieves the current iterator key inside of a FOR-EACH Element. |
| IteratorValue( ) | Retrieves the current iterator value inside of a FOR-EACH Element. |
| count(namespace) | Returns the number of variables in the indicated namespace. For example, when the only stored variable is tmp.test, then count ('tmp') returns 1. |

According to another embodiment, there are a number of operators that are used to retrieve system information.

According to one embodiment, the following operators described in the table below are used to retrieve system information in conjunction with the markup language of the present invention. Other operators are possible.

| System Operator | Meaning |
|---|---|
| ani( ) | Retrieves the number of the caller. According to one embodiment, the operator is used in conjunction with a voice service system that supports inbound calling. |
| dnis( ) | Retrieves the last four digits of the number dialed by the caller. According to one embodiment, the operator is used in conjunction with a voice service system that supports inbound calling. |
| Property(name [default]) | Retrieves named property from a property object. Return default if that named property is not available. |
| device( ) | Retrieves the call server port on which the interactive voice broadcast has been established. |
| version( ) | Retrieves the version of the voice service system that is being used. |

According to another embodiment, there are a number of operators that are used to retrieve information about a user session. As explained above, user responses are stored in a response collection. According to one embodiment, the response collection is organized into a number of slots, each of which has a name and a value, i.e., slot-value pairs. According to one embodiment, the operators described in the table below are used to retrieve user response information in conjunction with the markup language of the present invention. Other operators are possible.

| Response Operator | Meaning |
|---|---|
| Response( ) | Retrieves the last user response. |
| Hyp([h]) | Retrieves the hypothesis about the current utterance of the user. According to one embodiment, this is used in conjunction with a voice service system that supports speech recognition for user responses. |
| Slot([h,] n) | Retrieves the slot name of the nth slot-value pair. |
| Value(n) | Retrieves the value of the nth slot-value pair. |
| Value(slotname) | Retrieves the value of the slot with the name slotname. |

The operators discussed above are used in conjunction with each other in the various elements described herein. Therefore, according to one embodiment, there is an order of precedence for executing the various DIALOG elements. The table listed below lists operators in order of precedence according to one embodiment of the present invention. Operators with a higher order of precedence are evaluated before those with a lower order of precedence unless the order of precedence is specified using parentheses. Other orders of precedence are possible.

| Operator Precedence - Highest to Lowest | Symbols |
|---|---|
| parentheses | ( ) |
| Function-style operators | int, abs, sqr, round, @, mid, instr, spell, count, retrieve |
| exponentiation | ^ |
| logical not | ! |
| negation | - |
| multiplication and division | *, / |
| remainder | % |
| addition and subtraction | +, - |

-continued

| Operator Precedence - Highest to Lowest | Symbols |
|---|---|
| comparison | eq, ne, gt, lt, ge, le |
| logical and | and |
| logical or | or |
| conditional operator | ? |
| assignment operators | =, +=, -=, *=, /=, %= |

The following example expressions illustrate the use of the various operators explained above. In these examples, the variable "index" is used and is assumed to have the value 5.

| Example | Explanation |
|---|---|
| 'amount' + index | The script adds the value of index to the string 'amount.' The result is: "amount5" |
| @('amount' + index) | Retrieves value of the variable amount5. |
| t = h + (m lt 10 ? '0': ':') + m | Converts time in hours (h) and minutes (m) into a single string of the form "hh:mm" and stores it in string (t). Inserts a leading "0" into minutes if necessary. |
| var eq 0 ? 'zero' : (var gt 0 ? 'above zero' : 'below zero') | Depending on the value of var, returns the string "zero," "above zero" or "below zero." |

Reference Commands

In addition to the variables in the Response Collection, a markup language may also define a set of system variables that refer to certain state variables of the system and to items in the Response Collection. According to one embodiment, TML uses a set of system variables called reference commands. According to one embodiment, these commands are used in normal text, and in any TML attribute. The commands consist of "\" followed by one or more characters. A number of reference commands used by TML are explained below. Other reference commands are possible.

According to one embodiment, the reference command "\\" is used to refer to the "\" character.

According to one embodiment, the reference commands "\d0"-"\d0" are used to retrieve the name of previous DIALOG Elements. That is, "\d0" retrieves the name of the current DIALOG Element, "\d1" retrieves the name of the previous DIALOG Element, etc.

According to one embodiment, the reference command "back" is used to retrieve the name of the previous DIALOG Element. It is equivalent to "\d1." According to one particular embodiment, "back" is used only in conjunction with the "next" attribute.

According to one embodiment, the reference command "current" is used to retrieve the name of the current DIALOG Element. It is equivalent to "\d0." According to one particular embodiment, "current" is used only in conjunction with the "next" attribute.

According to one embodiment, the reference command "\v(key[default])" retrieves the value of a response variable with the specified "key," provided that the variable exists. If the specified variable does not exist, then the default argument is used.

According to one embodiment, the reference command "\e[expression]" is used to produce the result of the expression. For example, the script "\e[NumItems eq 1 ? 'one item' 'many items' ]" produces as a result either 'one item' or 'many items' as the case may be. According to one embodiment, this reference command can be used to generate dynamic text that depends on the result of the expression.

According to one embodiment, the reference command "key" is used to refer to the value of a variable with the specified key. This command is equivalent to "\v(key)" but is only used in conjunction with the case attribute.

According to one embodiment, the reference command "\f" is used to refer to the filter key of an OPTION element. This reference command can have a value from "0" to "9" or the "#" or "*" keys when used in conjunction with a system that accepts input from a telephone keypad. For example, the statement "Press \f to continue" in an OPTION Element translates to "Press 1 to continue" if the filter of the OPTION Element is "1."

According to one embodiment, the reference command "\n" may be used in conjunction with a GETNUMBER Element to designate the number that the user entered as response to a GETNUMBER Element for storage. For example, the script, <GETNUMBER store "NumUnits=\n"> stores the users entry as the value for the variable "NumUnits."

The reference commands "\i" "\iv" and "\ik" are used in conjunction with FOR-EACH Elements. According to one embodiment, a FOR-EACH Element uses the reference command "\i" or "\iv" to designate an iterator value, e.g., to designate an amount. According to another embodiment, a FOR-EACH Element uses the reference command "\ik" to designate an iterator key, e.g., to designate a name. The following example facilitates understanding of the use of special reference commands.

<DIALOG name="overview" store="own:MSTR=150; own: MSFT=200; own: IACO=100">
    <SPEECH> You have the following items in your stock portfolio:</SPEECH.
    <FOR-EACH namespace="own">
    SPEECH>\i shares of \ik </SPEECH>
    JOIN>, </JOIN>
    PRE-FINAL> and </PRE-FINAL>
    </FOR-EACH>
    <SPEECH>.</SPEECH>
    </DIALOG>

The above TML script reads through the values of the variables in the namespace "own" as follows:

"You have the following items in your stock portfolio: 150 shares of MSTR, 200 shares of MSFT and 100 shares of IACO."

According to one embodiment, reference commands are used to refer to previously stored keys and values. According to one embodiment, such reference commands consist of a backslash and one or more character, for example, "\k1" or "\k9." Assuming that such a command were used to refer to the last key, and assuming that the last DIALOG element contained the command store="buy:MSTR=100", then "\k1" would refer to "buy:MSTR." According to another embodiment, such a reference command could also be used to refer to the value of the last key—"100" in the previous example.

Each TML component discussed above may be provided using various forms of syntax. Although an exemplary syntax has been provided in many cases, it is apparent to one of ordinary skill in the art that other syntax may be used.

EXAMPLES

The following examples illustrate the use of TML

Example 1

FIG. 9 is an illustration of a TML document 900 in accordance with one embodiment of the invention. Document 900 comprises a HEADER tag 902, TML tags 904a-904b, DIALOG tags 906a-906b, and text 908. HEADER tag 902 is a processing instruction for an XML parser indicating that this document conforms to the XML specification version 1.0. TML tags 904a-904b define a parent element (i.e., the TML element) because the TML element comprises several child elements (i.e., the DIALOG and SPEECH Elements). Indentation is used to differentiate parent elements from child elements.

The next part of the document is the TML element indicated by TML tags 904a-904b. TML tags 904a, 904b may be used to identify the beginning and end of a TML element, respectively. The TML element has no attributes and simply acts as a container for the remainder of the elements.

The next line contains the start of a DIALOG element indicated by DIALOG tag 906a-906b. DIALOG tag 906a-906b may be used to identify the beginning and end of the DIALOG element, respectively. The DIALOG element is named "Person" identifying that it contains information that is to be presented to the user. A DIALOG element can contain SPEECH Element 910 contained within SPEECH tags 908a, 908b that is read to the user. DIALOG elements may also contain an INPUT element that allow the user to feed information back to a server. In the example of FIG. 9, the DIALOG element only contains a single SPEECH Element. When a TML document is processed, the server searches for the DIALOG element with the name "Person" and executes it. Because the DIALOG element in this example does not contain any INPUT elements, the system reads text 910 to the user and then hangs up. The communication of TML document 900 is the following:— pick up phone:

"Hello Mr. Richards, this is a message from MicroStrategy Telecaster. Your store inventory of ice cream is very low. It is recommended that you order more to avoid running out of stock. Good-bye."

end of call

While the basic functionality of delivering information through a telephone call is very useful, it may be desirable to give the user some control over how the call proceeds. TML document 900 does not involve the user in any way. TML document 900 simply reads text 910 and hangs up.

Example 2

FIG. 10 illustrates an example of a TML document 1000 that enables a user to provide input. This example reads the initial message and then presents a menu of various choices to the user, who may choose one of the defined options to hear more information.

Document 1000 comprises a HEADER tag 1002, TML tags 1004a-1004b, DIALOG tags 1006a-1006b, 1016a-1016b, 1020a-1020b, SPEECH tags 1008a-1008b, 1018a-1018b, INPUT tags 1010a-1010b, and OPTION tags 1012a-1012b, 1014a-1014b. In this example, the DIALOG element contained within DIALOG tags 1006a-1006b comprises an INPUT element contained within INPUT element tags

1010a-1010b. INPUT element tags 1010a-1010b identify the section of the DIALOG element that contains interactive elements enabling input from the user.

The input section of the DIALOG element contained within DIALOG tags 1006a-1006b ("Person") contains two <OPTION> elements contained within OPTION tags 1012a-1012b and 1014a-1014b. The OPTION elements define keys that the user can press on a touch-tone telephone to perform a function. The OPTION element is used to, inter alia, direct control to another DIALOG element. This may be achieved using the next attribute. This attribute defines the step where execution continues of the associated key is pressed.

In this example, telephone keys are assigned to OPTION elements in the order in which the elements appear in the TML document, starting from 1. Thus, the first option, leading to "inventory", receives the key "1", and the other option gets the key "2".

The two DIALOG elements named "inventory" and "demand" do not contain any input section. Therefore, the call will end after the text section of those DIALOG elements has been read to the user. If the user chooses to hear her inventory, the communication is as follows:
 pick up phone:

"Hello Mr. Richards, this is a message from MicroStrategy Telecaster. Your store inventory of ice cream is very low. It is recommended that you order more to avoid running out of stock. To hear your inventory, press 1. To hear the expected demand of ice cream, press 2."
 press 1

"Your inventory contains 5 gallons of strawberry and 7 gallons of vanilla ice cream."
 end of call If the user chooses to hear the expected demand for ice cream, the communication is as follows:
 pick up phone:

"Hello Mr. Richards, this is a message from MicroStrategy Telecaster. Your store inventory of ice cream is very low. It is recommended that you order more to avoid running out of stock. To hear your inventory, press 1. To hear the expected demand of ice cream, press 2."
 press 2

"Due to the upcoming hot weather, it is expected that you will need 20 gallons of strawberry and 25 gallons of vanilla ice cream next week."
 end of call The above examples do not include an option permitting the user to get back to the main menu after one of the menu options has been selected. It is preferable to provide a navigational structure that allows the user to go back to previous DIALOG elements, to listen to DIALOG elements again, and to explore other paths. INPUT elements may be used to inform a user where he/she is within the system, where the user came from, and how to get back.

Example 3

FIG. 11 illustrates an example of a TML document 1100 that enables a user to navigate throughout the voice service. Document 1100 comprises a HEADER tag 1102, TML tags 1104a-1104b, DIALOG tags 1106a-1106b, 1120a-1120b, 1130a-1130b, 1140a-1140b, 1144a-1144b, SPEECH tags 1108a-1108b, 1112a-1112b, 1124a-1124b, 1134a-1134b, 1142a-1142b, INPUT tags 1110a-1110b, 1124a-1124b, 1134a-1134b, 1146a-1146b, OPTION tags 1114a-1114b, 1116a-1116b, 1118a-1118b, 1126a-1126b, 1128a-1128b, 1136a-1136b, 1138a-1138b, 1148a-1148b, and ERROR tags 1150a-1150b. The first DIALOG element ("Person") has three OPTION elements in its input section delimited by OPTION tags 1114a-1114b, 1116a-1116b, 1118a-1118b. The first two OPTION elements direct control to other DIALOG elements. The third OPTION element has the attribute next="current". Thus, this option directs control to the current DIALOG element. This option also utilizes the attribute filter="*". This associates a particular key with this option instead of using the dynamic assignment of keys.

The repeat attribute specifies which sections of the next DIALOG element are to be read to the user. The text of this option is "To hear these options again, press 3". Therefore, after selecting this option, the user hears the current options again, but not the whole text of the message. If the repeat attribute is not specified, the whole text of a DIALOG element is read.

The "inventory" DIALOG element has two OPTION elements. The first OPTION element refers to the "demand" element, and the second OPTION element refers back to the previous DIALOG element. This is done by the attribute next="back". Note that instead of "back" and "current", it is also possible to use the actual names of the target DIALOG elements in the example above.

The last DIALOG element has the name "default". Note that it is not explicitly referenced by any of the other elements. Instead, the elements of the input section of the default DIALOG element are appended to the input section of every other DIALOG element. This can be compared to a footer that is automatically appended to the bottom of a document (e.g., a web page) to provide standard links for navigating a web site. The user will get the elements of the default DIALOG element every time one of the other DIALOG elements is executed.

The default DIALOG element also defines an <ERROR> element. This is executed whenever the user supplies an input that is not defined. Otherwise, it has the same rules that the OPTION elements have.

Finally, note that the DIALOG element with the name "end" does not define an input section. Execution is terminated at this DIALOG element, because there is nothing further to get from the user. The communication may be as follows:
 pick up phone:

"Hello Mr. Richards, this is a message from MicroStrategy Telecaster. Your store inventory of ice cream is very low. It is recommended that you order more to avoid running out of stock. Please choose one of the following options. To hear your inventory, press 1.

To hear the expected demand of ice cream, press 2.

To hear these options again, press 3.

To end this call, press star."
 press 1

"Your inventory contains 5 gallons of strawberry and 7 gallons of vanilla ice cream. To hear the expected demand of ice cream, press 1."

To go back to the previous menu, press 2.

To end this call, press star."
 press *

"Thank you for using this service. Good-bye."
 end of call

Example 4

A call may be confidential and should only be delivered to a particular person. To ensure that the person who answered the phone is the intended recipient of the call, it is possible to ask for a personal identification number (PIN), and compare it to the correct value. Only if the correct PIN is entered is the user directed to the main body of the call.

The GETNUMBER element is used for PIN verificaton. OPTION elements may define a single key that is filtered. When the user presses that key, the associated OPTION element is executed. Several OPTION elements can be associated with several different phone keys. If the user presses a phone key that has not been associated with any OPTION element, the active ERROR element is executed. The GETNUMBER Element, however, waits, for example, for a sequence of key presses from the user. The GETNUMBER element uses the "type" "length" and "filter" attributes (explained above) to define exactly what kind of input is required from the user. The following examples facilitate understanding the GETNUMBER Element. The following GETNUMBER Element asks the user for his zip code and then waits until 5 keys have been pressed on the phone.

<GETNUMBER type="fixed" length="5">Please enter your zip code.</GETNUMBER>

In contrast, the next GETNUMBER Element asks for a sequence of numbers with up to 15 digits. Hence, the call system will store key presses until the user presses the pound key, or until the maximum amount of 15 digits has been entered:

<GETNUMBER type="variable" length="15">Please enter your phone number. Press pound when you are done.</GETNUMBER>

The filter attribute of the GETNUMBER Element defines a condition that the user input must meet. Thus, GETNUMBER element and filter attribute are useful for PIN verification. The GETNUMBER element with a filter attribute defines a condition for the special value \n, which is the last number that the user has entered. For example, filter="\n eq 123" defines the condition that \n must equal the number 123. This allows a simple PIN verification to be defined:

```
<DIALOG name="Person">
<SPEECH>Hello Mr. Richards. This is a message from MicroStrategy
Telecaster.</SPEECH>
<INPUT default="none">
<GETNUMBER type="fixed" length="3" filter="\n eq 123"
next="main">Please enter your 3 digit PINcode.</GETNUMBER>
<ERROR next="current" repeat="none">You did not enter the correct
PIN. Please try again.</ERROR>
</INPUT>
</DIALOG>
<DIALOG name="main">
<SPEECH>Thank you, Mr. Richards. Now you will hear about your
store directory . . . </SPEECH>
. . .
</DIALOG>
```

This example asks the user to enter a number that has 3 digits. The supplied number is compared with the value "123," and if it is identical with that value, execution of the TML document continues at the "main" DIALOG element. If the comparison fails, execution continues at the ERROR element, which refers execution back to the current DIALOG element. The ERROR element also defines the attribute repeat="none". This means that no part of the upcoming DIALOG element is read to the user. Therefore, the user hears only the text of the ERROR element.

pick up phone:

"Hello Mr. Richards. This is a message from MicroStrategy Telecaster. Please enter your PIN code."

press 456

"You did not enter the correct PIN. Please try again.".

press 789

"You did not enter the correct PIN. Please try again."

press 890

"You did not enter the correct PIN. Please try again."

press 123

"Thank you, Mr. Richards. Now you will hear about your store directory . . .

call continues as usual . . .

Example 5

In the last example, the user was asked for the correct PIN repeatedly until execution of the TML document times out. This may not be desirable. Instead, it may be desirable to terminate the call after a small number of incorrect attempts. The third type of GETNUMBER element is the type="PIN" attribute. If a GETNUMBER element is a PIN type, the parser (explained below) assumes that the filter attribute contains the encrypted PIN to be expected. Hence, the supplied number has to match the encrypted string to be accepted:

<GETNUMBER type="PIN" filter="C1C61CD3777D"next="main">Please enter your PIN code.</GETNUMBER>

Assume that the encrypted string C1C61CD3777D contains the encrypted number 123. In that case, this GETNUMBER Element is functionally equivalent to the example in step 4. Also note that the length attribute is not mandatory if the GETNUMBER Element has the type PIN. The call system waits for as many digits as the encrypted PIN contains. If this is not desired, the length attribute can be set to a value that should be larger than the PIN. In that case, the call system waits for a number that is terminated by the pound key and then compares it to the PIN. Thus, use of the PIN type GETNUMBER Element increases the security of a PIN.

To ensure that the user only is given a limited number of attempts to enter the correct PIN variables and conditionality may be used. More specifically, a variable is used to count the number of times the user enters an incorrect PIN. If this variable reaches a certain number, the user is directed to a DIALOG element that ends the call. If the correct PIN is entered, the user is directed to the main body of the TML document. The following is an example of providing a variable number of attempts to enter a PIN.

```
<TML>
<DIALOG name="Person">
<SPEECH>Hello Mr. Richards. This is a message from MicroStrategy
Telecaster.</SPEECH>
<INPUT default="none">
<GETNUMBER type="PIN" filter="C1C61CD3777D"
next="main">Please enter your PIN code.</GETNUMBER>
<ERROR case="NumTrials It 3" next="current" repeat="none"
store="NumTrials; remain=4-NumTrials; suffix=(remain
ne 1 ? 's' : ' ')">You did not enter the correct PIN. Please try again.
You have \v(remain) attempt\v(suffix) left.</ERROR>
```

-continued

```
<ERROR case="NumTrials ge 3" next="wrongPIN"/>
</INPUT>
</DIALOG>
<DIALOG name="wrongPIN">
<SPEECH>You seem to have trouble remembering your PIN. Please call
our helpline for further assistance. Good-bye.</SPEECH>
</DIALOG>
<DIALOG name="main">
<SPEECH>Thank you, Mr. Richards. Now you will hear about your
store directory . . . </SPEECH>
 . . .
</DIALOG>
</TML>
```

The communication may proceed as follows:
pick up phone:

"Hello Mr. Richards. This is a message from MicroStrategy Telecaster. Please enter your PIN code."
press 456

"You did not enter the correct PIN. Please try again. You have 3 attempts left."
press 789

"You did not enter the correct PIN. Please try again. You have 2 attempts left."
press 890

"You did not enter the correct PIN. Please try again. You have 1 attempt left."
press 345

"You seem to have trouble remembering your PIN. Please call our helpline for further assistance.

Good-bye.
end of call

This TML document allows a total of three false attempts. After the user fails for the fourth time, the call is automatically terminated. This example illustrates the use of encrypted PINs, variable storage, and the use conditional elements. It is possible to retrieve variables with the \v reference command (the v stands for "variable").

TML Generation

Figure 12:
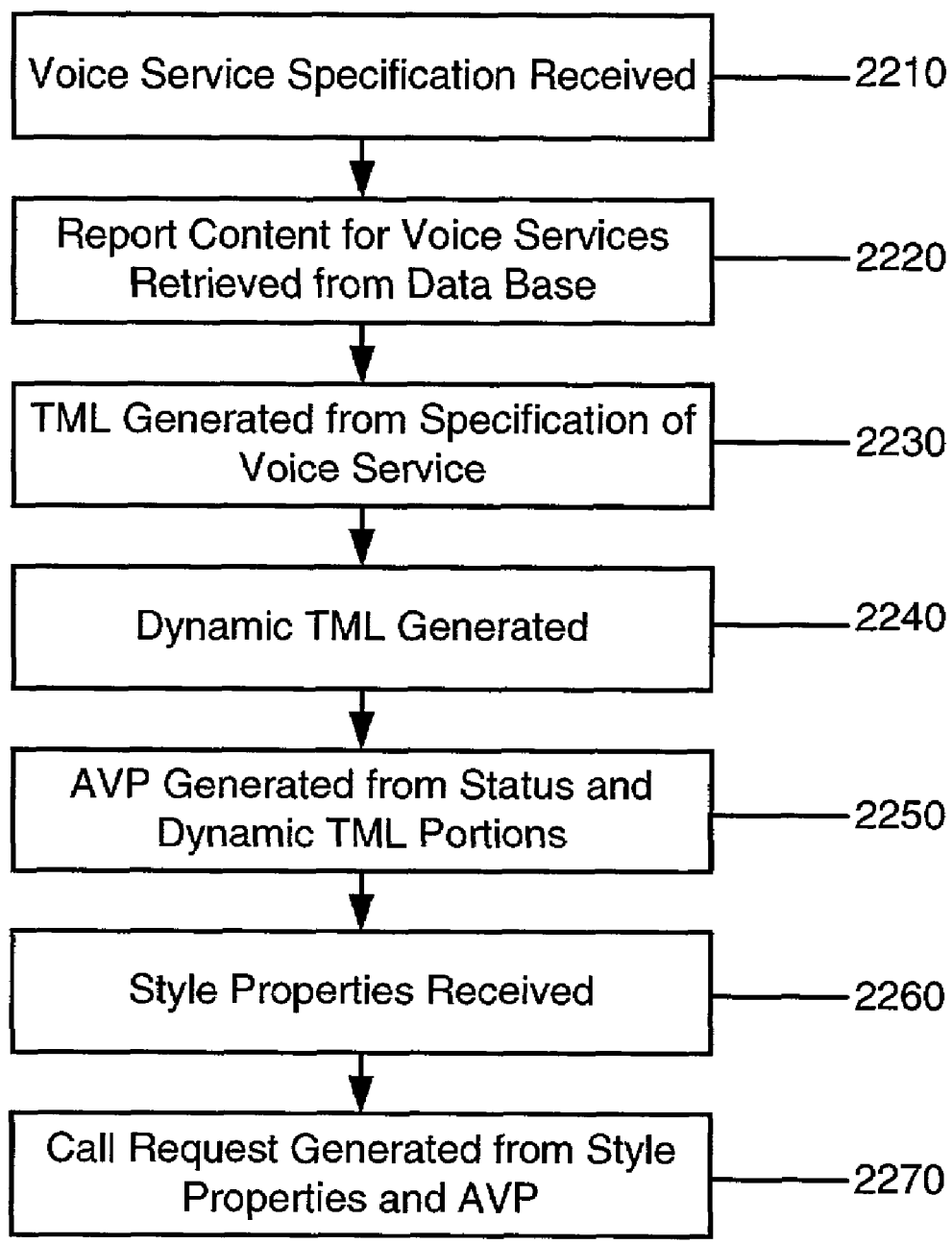
FIG. 12 is a flow chart of a method for generating an AVP according to one embodiment of the present invention.

According to another embodiment of the present invention, a method and system for generating TML are disclosed. A method for generating TML and formatting and active voice pages is shown in FIG. 12. Although the method is explained as a sequence of steps, the sequence is not limited to any particular order. The method begins with receipt of a voice service specification (step 2210). According to one embodiment, the specification is generated by an administrator and may include an ordered specification of TML elements that are to be included in the AVP, identifications of reports (or other data) that are to be included in the AVP, and transformations that are to be used to convert the reports to TML. According to one embodiment, the XSL stylesheets are used to transform report content to TML as is explained below. For a simple voice service, for example one that just delivers a static message to the user, the specification might comprise only the ordered specification. For more complex voice services, in addition to the ordered specification, a number of reports and style sheets may also be included.

Report content for the reports specified by the voice service specification is retrieved from a database or other data repository in step 2220. Reports are preferably received in a format that may be converted to TML through application of an XSL stylesheet or similar transformation method. According to one embodiment, reports are received in XML format. According to a specific embodiment, report content is received in DSS Grid format, a proprietary form of XML used by MicroStrategy, Inc.

Static TML is generated from the specification of the voice service in step 2230. The voice service specification contains a number of items that are resolved into TML without regard to any additional content. That is, the ordered specification of the voice service specifies a number of TML elements that are to be a part of the voice service. Each of these elements may include, for example, static text, plain text reports, certain macros (e.g. RecipientList), and text files that may be resolved into TML without the need for any transformation. According to one embodiment, a base TML document is generated in step 2230 by resolving these static items into TML. According to this embodiment, the base TML document comprises the call structure without any dynamic content.

Dynamic TML is generated in step 2240. A voice service will also contain a number of items the content of which change from execution to execution. For example, as stated above, a voice service may include one or more reports generated by a database or other data repository. For each such report, the voice service specification received in step 2210 also includes a transformation, such as an XSL stylesheet that is used to convert the report content into TML. According to one embodiment, in step 2240, an XSL stylesheet is applied to each report to generate a separate TML document from each report.

The static TML document is blended with the dynamic TML documents to generate a single call structure or AVP in step 2250. According to one embodiment, the documents are added in a cumulative fashion. For example, if two TML documents are to be blended, and each one contains a DIALOG element with the name "main", the blended TML document will have one DIALOG with the name "main", and will include the contents of the DIALOG elements from both documents. The following simple example may help illustrate this blending. Assume documents 1 and 2 contain the following DIALOGs:
from document 1:
```
<DIALOG name="main">
<OPTION>Press 1</OPTION>
</DIALOG>
```
from document 2:
```
<DIALOG name="main">
<OPTION>Press 2</OPTION>
</DIALOG>
```

The result of these two documents being blended will be the following:
```
<DIALOG name="main">
<OPTION>Press 1</OPTION>
<OPTION>Press 2</OPTION>
</DIALOG>
```

According to one embodiment, priority is assigned to elements that will be blended to determine ordering of the blended TML. Other methods of determining order in blended elements are possible.

Blending enables a report to affect many different DIALOGs in the base document. Thus a report does not have to be tied to a single location within an active voice page. Accordingly, dynamic content from a report or other database repository may be used multiple times within an active voice page, but need only be generated a single time.

Style properties are received in step 2260. The method and system of the present invention generate AVPs that deliver voice services to a plurality of users. In the AVPs, the TML elements discussed above determine the content and structure. According to one embodiment, delivery of the content and structure is determined by a set of style properties that control such variables as the type of voice (male or female) and language (English, German, Spanish, etc.) that will be used to deliver the content or the location (i.e., telephone number) to which the content of the voice service will be delivered. These types of variables are determined by a set of style properties that are unique to each recipient of a voice service. According to one embodiment, when the method and system of the present invention are used in conjunction with the voice service system of FIGS. 1-8, the style properties are generated in personalization engine based on user choices.

The blended TML document and the style properties are combined into a call request and sent to a call server for processing in step 2270. According to one embodiment, the blended TML document and the style properties are combined into a call string. According to one particular embodiment, when the method and system of the present invention are used in conjunction with the voice service system of FIGS. 1-8, the blended TML document and the style properties are combined into a call string and deposited in a call database 1811 of call server 18. Other methods of combining the blended TML document and style properties are possible.

Figure 13:
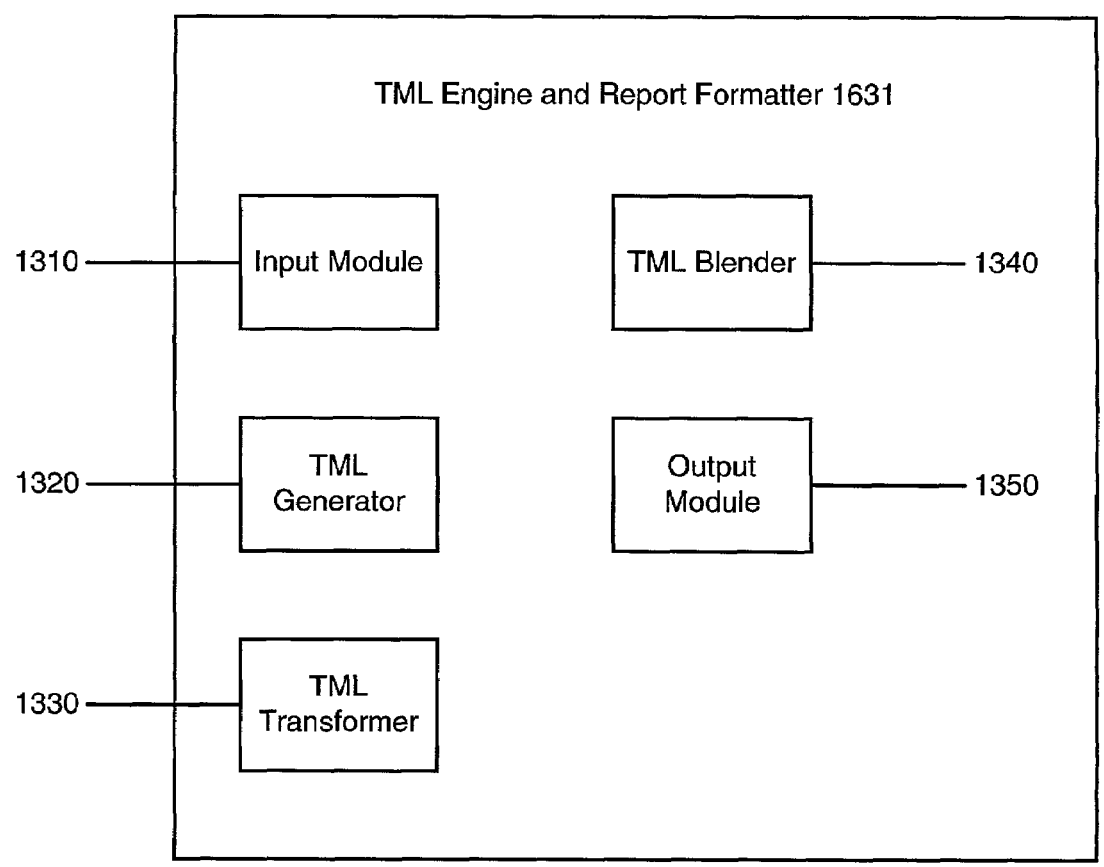
FIG. 13 is a block diagram of TML engine and report formatter according to one embodiment of the present invention.

FIG. 13 shows a TML engine and report formatter 1631 according to one embodiment of the present invention. TML engine and report formatter 1631 comprises a number of functional modules that operate together to generate an AVP. According to the embodiment shown in FIG. 13, TML engine and report formatter 1631 comprises an input module 1310, TML generator 1320, TML transformer 1330, TML blender 1340 and output module 1350. The functions of these modules could be combined or further divided as desired. According to one embodiment, each of the modules comprises a software module that is implemented by a microprocessor. According to another embodiment, the modules described below could be implemented in firmware or hardware.

Input module 1310 operates to receive and forward all data input to the report formatter. According to one embodiment, when operating in conjunction with the voice service system shown in FIGS. 1-8, input module 1310 receives a voice service specification from voice service wizard 1616, data reports from database system 12 and style properties from personalization engine 1632. Other embodiments are possible.

TML generator 1320 receives an ordered specification of elements from input module 1310 and generates static TML for the voice service. According to one embodiment, TML generator 1320 receives input from input module 1310 and generates the base TML document for the voice service as is discussed in FIG. 12, step 1230. According to one particular embodiment, when operating in conjunction with the voice service system of FIGS. 1-8, TML generator 1320 comprises a software module that generates TML from an ordered specification of elements such as the output of voice service wizard 1616.

TML transformer 1330 receives reports and transformations and generates TML from the reports. According to one embodiment, TML transformer 1330 comprises a software module that receives reports in XML and XSL stylesheets from input module 1310 and applies the stylesheets to the reports to generate TML documents. According to one particular embodiment, when the TML engine and report formatter 1631 is operating in conjunction with the voice service system of FIGS. 1-8, TML transformer receives database reports from database system 12 and transforms them into TML using XSL stylesheets.

TML blender 1340 receives TML documents from TML generator 1320 and TML transformer 1330 and generates a single blended TML document. According to one embodiment, TML blender 1340 comprises a software module that blends a number of TML documents together in accordance with a defined set of rules.

Output module 1350 receives a single TML document and a set of style properties and generates a combined call request. According to one embodiment, output module 1350 receives a single TML document from either TML generator 1320, TML transformer 1330, or TML blender 1340 depending on the content of the particular voice service for which TML is being generated. According to a particular embodiment, when the present invention is used in conjunction with the voice service system of FIGS. 1-8, output module 1350 combines the TML document and the style properties and generates a call string that is deposited in call database 1811 of call server 18.

A detailed example will now be provided to help explain the operation of XSL stylesheets and the system and method of the present invention. As mentioned above, the Extensible Stylesheet Language is a language used to write stylesheets that transform XML documents into other XML documents or plain text. XML documents comprise hierarchically organized nodes. The XSL processor provides a mechanism for navigating through these nodes and for applying certain transformations to them. These transformations are specified in a markup language that adheres to the XML format. XSL can be applied to any kind of XML-based markup, even to XSL itself.

XSL is extensible because in addition to built-in elements, XSL allows the use of scripts. Scripts are programs that can provide additional functionality that may not be possible with standard XSL elements. Some elements of XSL include:

| | |
|---|---|
| <xsl:stylesheet> | Root node of any XSL document |
| <xsl:template> | Template to be applied to a specific section of the source document |
| <xsl:apply-templates> | Directs the XSL processor to search templates for all nodes in a specific section and to execute them |
| <xsl:value-of> | Retrieves value of a specific node |
| <xsl:FOR-EACH> | Iterates through all nodes in a specific section |

At a high level, XSL navigates through source data of the XML document that is to be transformed. XSL documents should conform to all XML specifications. That means that the XSL documents are hierarchically organized and have a single top level node. In Listing 1, this is the node <xsl:stylesheet>. It contains templates that can be applied to the source document:

<xsl:stylesheet xmlns:xsl="http://www.w3.org/TR/WD-xsl">
<xsl:template match="/">
| matched the root.
</xsl:template>
</xsl:stylesheet>

Listing 1 (XSL): Simple XSL Stylesheet with a Single Template

An XSL processor applies a stylesheet to an XML document and selects a node as current context and goes through all templates in the XSL document to find one that matches the selected node. At the beginning, the context is the root of the XML document, which can be conceptualized as the whole document, or as some invisible node that completely contains all other nodes. The <family> node in Listing 1 is the first child of the root of that XML document. It is important to realize that the <family> node may not be the root node itself.

When the context has been set, the XSL processor goes through all templates in the XSL, for example, starting at the bottom and working up to the top, until it finds the first template that matches the currently selected node. In the present example, there is only one template, and it matches the expression "/", which stands for the root of the document. Since the current context is the root of the document, this template can be applied, and all text inside the template is written to the output document.

To illustrate this, consider the following XML.
<family>
<parent>A parent.</parent>
<parent>
Another parent.
<child>The first child.</child>
<child>The second child>/child>
</parent>
</family>
Listing 2 (XML): Simple XML Document If the XSL from Listing 1 is applied to the XML in Listing 2, the output is:
| matched the root.
Listing 3 (Plain Text): Result of XSL from Listing 1 Applied to XML from Listing 2.
  <xsl:stylesheet xmlns:xsl="http://www.w3.org/TR/WD-xsl">
  <xsl:template match="/">
  | found the root.
  </xsl:template>
  <xsl:template>
  | will always fire.
  </xsl:template>
  </xsl:stylesheet>

Listing 4 (XSL): Stylesheet with Universal Template that Overrides all Other Templates In Listing 4, the first template (counted from the bottom) has no "match" condition. This means that the first template may always be used. Hence, the other template, that matches the root of the document, may not be used. Preferably, these types of conditions are not used. In most XSL documents, general templates are at the top of the document, and more specific ones are at the bottom. The template without any "match" conditions at all should be the last (e.g., the topmost) template in the document, because it may always be used and therefore prevent any templates above it to not be executed.
| will always fire.

Listing 5 (Plain Text): Result of XSL from Listing 4 Applied to XML from Listing 1

Typically, an XSL template contains text that is directly written to the output document. But it can also contain instructions for the XSL processor to retrieve values of XML nodes, or to apply more templates to the other sections of the document.

| declare stylesheet | <xsl:stylesheet mlns:xsl="http://www.w3.org/TR/WD-xsl"> |
|---|---|

-continued

| match root node | <xsl:template match="/"> |
|---|---|
| \| found the root. | |
| apply templates to | <xsl:apply-templates /> |
| children of root | </xsl:template> |
| match "family" node | <xsl:template match="family"> |
| \| found the family. | |
| apply templates to | <xsl:apply-templates/> |
| children of "family" | </xsl:template> |
| match "parent" | <xsl:template match="parent"> |
| \| found a parent. | |
| apply templates to | <xsl:apply-templates/> |
| children of "parent" | </xsl:template> |
| match "child" | <xsl:template match="child"> |
| \| found a child. | |
| </xsl:template> | |
| end of stylesheet | </xsl:stylesheet> |

Listing 6 (XSL): Stylesheet that Navigates the Complete Document of XML 1 with explicit calls.

In Listing 6, the root template uses the command <xsl:apply-templates />. This tells the XSL processor to go through all nodes that can be found in the current context, set them as new context, and find a matching template for them.

Hence, it first finds the root. The root has one child, the <family>element. It finds the template for this element and applies it. <family> has two children, the <parent> elements, and one of the parents contains some <child> elements.

Here is the output of this transformation:
| found the root.
| found the family.
| found a parent.
| found a parent.
| found a child.
|found a child.

Listing 7 (Plain Text): Result of XSL (Listing 6) Applied to XML (Listing 2)

The XSL processor continues until there is no further node to search, and no further instruction to apply. This does not mean that it has used all the templates in the XSL stylesheet. For example, if the template of the root node did not contain the statement <xsl:apply-templates/>, execution would stop at this template, and the output would only contain "I found the root.".

Understanding how different templates call each other while letting the XSL processor navigate through the source XML document is an important concept behind XSL.
  <xsl:stylesheet xmlns:xsl="http://www.w3.org/TR/WD-xsl">
  <xsl:template><xsl:apply-templates /></xsl:template>
  <xsl:template match="child">
  A child node: <xsl:value-of />
  </xsl:template>
  </xsl:stylesheet>

Listing 8 (XSL): Stylesheet with Generic Rule at the top for Guaranteed Descent

Very often, users will see constructs as in Listing 8, where the topmost rule is something like "<xsl:template><xsl:apply-templates /></xsl:template>". This tells the XSL processor that whenever it arrives at the top because no matching templates for the current context were found, it should go through all children of the current context and try to find a match for them. Without the universal descent rule, the processor would stop here, even if there are templates that match nodes further down in the hierarchy. With this rule, execution continues.

In the child template of Listing 8, the instruction <xsl:value-of /> retrieves the text of the current context, which in this case is the text contained in the selected child node.

The output of Listing 2+Listing 8 is:
A child node: The first child.
A child node: The second child.

Listing 9 (Plain Text): Result of XSL (Listing 8) Applied to XML (Listing 2)

DSS Grids can be used to present a database or other report in an XML format. DSS Grids are structured in a way that closely reflect an underlying tabular format. The following table contains a brief overview of all the elements that may be used to encode database or other reports in DSS Grid format.

| Node | Description |
| --- | --- |
| <dssgrid> | The highest level node which corresponds to one grid report. |
| <attr> | Represents an agent attribute. |
| <column-header> | Represents one level of column header. |
| <upper-left> | Only appears inside the first <column-header>, represents an upper-left header cell in the grid. |
| <ae-id> | ID of an agent attribute node. |
| <ae-desc> | Attribute node description. |
| <mh> | Metric header. |
| <row> | One row in the report. |
| <row-header> | Contains the row-header section inside a row. |
| <mv> | Metric value. |
| <st-header> | Subtotal header. |
| <st> | Indicates that the metric value inside this node is a sub total value. |
| <gt-header> | Represents a grand total header. |
| <gt> | Indicates that the metric value inside this node is a grand total value. |

To see how these elements are used to represent a report, consider the following example:

| Product | Items in Stock | # below Reorder Level | Urgency |
| --- | --- | --- | --- |
| Hood Stash Jacket | 24 | 6 | 1 |
| Greenwich Check Shirt | 5 | 35 | 3 |

This report contains one attribute, the Product. It has two attribute elements, which are "Hood Stash Jacket" and "Greenwich Check Shirt". Three metrics are in the report, which are "Items in Stock", "# below Reorder Level", and "Urgency". Each row shows the metric values for one of the attribute elements.

The XML for a report is marked by the top level node <dssgrid> which contains three major sections. First, all attributes are listed. Second, the column headers of the table are listed. Finally, all individual rows of the report are listed. Each row contains a row header indicating a specific attribute node, and all metric values belonging to it. This section makes up the most part of the XML document:

```
top level node    <dssgrid ns="A">
attribute list    <attr n="1" url="Product">Product</attr>
column headers    <column-header>
                  <upper-left rows="1">Product</upper-left>
metric headers    <mh n="1" cols="1">Items in Stock</mh>
                  <mh n="2" cols="1"># below Reorder Level</mh>
                  <mh n="3" cols="1">Urgency</mh>
                  </column-header>
individual rows   <row>
                  <row-header>
attribute-node    <ae-desc n="1" rows="1" idval="1" idurl="1">Hood
                      Stash Jacket</ae-desc>
description
                  </row-header>
metric values     <mv n="1" uf="24">24</mv>
                  <mv n="2" uf="6">6</mv>
                  <mv n="3" uf="3">1</mv>
                  </row>
                  <row>
                  <row-header>
                  <ae-desc n="1" rows="1" idval="2" idurl="2">Greenwich Check
                      Shirt</ae-desc>
                  </row-header>
                  <mv n="1" uf="5">5</mv>
                  <mv n="2" uf="35">35</mv>
                  <mv n="3" uf="1">3</mv>
                  </row>
                  </dssgrid>
```

Listing 10 (XML): Report in XML Format

An XSL stylesheet may now be used to transform this report into a TML document that can deliver the information in the report to a user on the telephone. An appropriate XSL stylesheet is first developed.

The XSL processor may start by searching for a template that matches the root of the document. It may be desirable to first add a template that matches the root and instructs the processor to apply templates to the children of the root. The only child of the document root is the <dssgrid> node. Hence, the next template matches this node. This will add the opening and closing <TML> tags and a single DIALOG with some text:

```
<xsl:stylesheet xmlns:xsl="http://www.w3.org/TR/WD-xsl">
<xsl:template match="/"><xsl:apply-templates/></xsl:template>
<xsl:template match="dssgrid">
<TML>
<DIALOG name="Person">
<SPEECH>Hello. This is your inventory update.</SPEECH>
</DIALOG>
</TML>
</xsl:template>
</xsl:stylesheet>
```

Listing 11 (XSL): Stylesheet that Creates a TML DIALOG

If these two templates are put into a stylesheet and run against an XML report, the result is the following TML document that reads a short message to the user and then hangs up.

```
<TML>
<DIALOG name="Person">
<SPEECH>Hello. This is your inventory update.</SPEECH>
</DIALOG>
</TML>
```

Listing 12 (TML): Small but Complete TML Document Generated with XSL (Listing 11) Applied to XML (Listing 10)

Now an explanation will be provided on how to retrieve data from the report, allow the user to navigate through the retrieved data, present the user with a list of available products and let the user choose one to hear more information about the available products. The first line to add to the XSL stylesheet in Listing 11 retrieves the name of the first column header, which is "Product" in this case:

```
<SPEECH>Select a <xsl:value-of select-"column-header/
    upper-left[0]"/>.</SPEECH>
```

To generate a list of products to choose from, it is preferable to retrieve the row-headers from each row and present them as TML OPTION elements to the user as follows:

```
<INPUT>
<xsl:FOR-EACH select-"row/row-header/ae-desc">
    <OPTION><xsl:attribute name="next"><xsl:value-of
        select-"@idval"/></xsl:attribute>Press \f to hear more
        about <xsl:value-of />s.</OPTION>
</xsl:FOR-EACH>
</INPUT>
```

The <xsl:FOR-EACH select="pattern">element instructs the XSL processor to retrieve all elements that match the XSL pattern specified in the "select" attribute. The current context serves as the basis for this search. If no "select" pattern is specified, <xsl:FOR-EACH> simply goes through all children of the current element.

In this case, the "FOR-EACH" pattern goes through all row-headers that can be found and retrieves the attribute description of each row-header. The output of the previous XSL segment will be a TML document that presents the user with a list of available products and enables the user to choose one to hear more information about it.

```
<INPUT>
    <OPTION next="1">Press \f to hear more about Hood
        Stash Jackets.</OPTION>
    <OPTION next "2">Press \f to hear more about Green-
        wich Check Shirts.</OPTION>
</INPUT>
```

Next, it may be desirable to define the jump targets for these options. These may be a set of individual TML DIALOG elements, one for each row in the report. The decision to create one DIALOG for each row is completely arbitrary, and that there are many other ways of displaying the same data. The following is a template for individual rows that creates a DIALOG element for each row. The name attribute of the DIALOG node is constructed out of the ID value of the attribute element of that row. After the DIALOG node name has been created, a single SPEECH Element is inserted which contains

```
<xsl:template match="row">
<DIALOG>
<xsl:attributename="name"><xsl:value-ofselect="row-
    header/ae-desc/@idval"/></xsl:attribute>
<SPEECH><xsl:apply-templates select="mv"/></
    SPEECH>
</DIALOG>
</xsl:template>
```

Next, it may be desirable to add the actual information contained in the row. This section of the XSL is customized to the actual content of the report. It retrieves the name of the current product and converts the inventory information into a sentence. This is done by retrieving the individual metric values of the current row and inserting them into the text, or by selecting different sentences based on the actual numeric value. Note that the metric values are retrieved by their number. For example, the pattern "mv[@n=2]" tells the XSL processor to select the metric value where the "n" attribute has the value "2". When writing an XSL stylesheet for a report, it is helpful to know how the report is structured, and in which order the metrics are arranged.

```
<xsl:template match="mv[@/n=1]">You have <xsl:value-
    of /><xsl:value-of select=" . . . /row-header/ae-desc"/>s
    in
stock. </xsl:template>
<xsl:template match="mv[@/n=2]">This is <xsl:value-of
    />items below reorder level. </xsl:template>
<xsl:template match="mv[@/n=3]">
<xsl:choose>
<xsl:when test".[. $ge$3]">It is very urgent that you
    restock this item immediately.</xsl:when>
<xsl:otherwise>Please restock this item soon.</xsl:other-
    wise>
<Ixsl:choose>
</xsl:template>
```

According to one embodiment, the output of this XSL segment for a single row will be the following:

```
<SPEECH>You have 24 Hood Stash Jackets in stock.
    This is 6 items below reorder level. Please restock this
    item soon.</SPEECH>
```

The last template contains the conditional statement <xsl:choose>that selects different instructions depending on some conditions. The next statement <xsl:when test=".[. $ge$3]">means: If the current context matches the test pattern, use this instruction. Otherwise, use the instruction in the <xsl:otherwise>condition. The test pattern is matched if the current context meets the filter criterion that its value is greater or equal to "3". Effectively, this template produces one sentence if the urgency level is below 3, and another sentence when the urgency is 3 or higher.

The TML document generated is:

```
Start <TML>
First DIALOG <DIALOG name="Person">
<SPEECH>Hello. This is your inventory update.</SPEECH>
    <SPEECH>Select a Product</SPEECH>
Menu of products          <INPUT>
    <OPTION next="1">Press \f to hear more about Hood Stash Jackets.</OPTION>
<OPTION next="2">Press \f to hear more about Greenwich Check Shirts.</OPTION>
    </INPUT>
    </DIALOG>
Footer DIALOG w/    <DIALOG name="footer">
navigational options
    <INPUT>
<OPTION>Press \f to repeat this information.</OPTION>
    <OPTION next="back">Press \f to go back to the previous menu.</OPTION>
</INPUT>
```

-continued

```
                    </DIALOG>
First row:          <DIALOG name="1">
    <SPEECH> You have 24 Hood Stash Jackets in stock. This is 6 items below reorder
level. Please restock this item soon.</SPEECH>
append footer       <INPUT default="footer" />
    </DIALOG>
Second row:         <DIALOG name="2">
<SPEECH> You have 5 Greenwich Check Shirts in stock. This is 35 items below reor-der
level. It is very urgent that you restock this item immediately.</SPEECH>
append footer       <INPUT default="footer" />
</DIALOG>
Conclude    </TML>
```

Listing 13 (TML): Complete TML Document Generated for the Inventory Report and the Stylesheet in Stockmarket.xsl In some cases it may be desirable to convert a report into plain text that can be inserted into a TML elements in an AVP. The XSL stylesheet above can be easily modified to produce a plain text version of the report. Note that it no longer produces TML tags, and that the top part is just a universal template that redirects the XSL processor to search matching templates for the children of the current node:

```
<xsl:stylesheet xmlns:xsl="http://www.w3.org/TR/WD-xsl">
<xsl:template><xsl:apply-templates/></xsl:template>
<xsl:template match="mv[@n=1]"><xsl:value-of
    select-" . . . /row-header/ae-desc"/>s: <xsl:value-of />.
</xsl:template>
<xsl:template match="mv[@n=2]">This is <xsl:value-of
    /> items below reorder level.
</xsl:template>
<xsl:template match="mv[@n=3]">
<xsl:choose>
<xsl:when test".[. $ge$3]">It is very urgent that you
    restock this item immediately. </xsl:when>
<xsl:otherwise>Please restock this item soon. </xsl:otherwise>
</xsl:choose>
</xsl:template>
</xsl:stylesheet>
```

Listing 14 (XSL): Simplified Stylesheet that Converts Inventory Report into Plain Text Applying this XSL stylesheet against the inventory report results in the following presentation that may be embedded into existing text.

Hood Stash Jackets: 24. This is 6 items below reorder level. Please restock this item soon.

Greenwich Check Shirts: 5. This is 35 items below reorder level. It is very urgent that you restock this item immediately.

Listing 15 (Plain Text): Plain Text Version of Inventory Report

The foregoing describes a report with a single attribute and how to convert it into TML or into plain text. Since each row of the report differs from the outer rows only with respect to one thing, it is easy to write XSL for it. A more involved report may be used. For example, consider this report:

| Year | Store | Department | Total Market Sales ($) | Merchandise Sales ($) | Total Regional Sales ($) |
|---|---|---|---|---|---|
| | | TOTAL | $52,952,637.80 | $20,072,630.25 | $100,363,151.26 |
| | | SUBTOTAL | $24,289,371.51 | $9,205,052.67 | $46,025,263.35 |
| 1993 | Boston | SUBTOTAL | $3,310,959.09 | $1,661,067.49 | $4,949,324.61 |
| | | Womens Clothing | $843,780.49 | $483,040.63 | $1,164,980.41 |
| | | Mens Clothing | $1,255,097.46 | $563,722.98 | $1,956,264.79 |
| | | Sporting Goods | $1,212,081.13 | $614,303.88 | $1,828,079.41 |
| | | SUBTOTAL | $3,310,959.09 | $838,168.50 | $4,949,324.61 |
| | Greenwich | Womens Clothing | $843,780.49 | $189,295.25 | $1,164,980.41 |
| | | Mens Clothing | $1,255,097.46 | $350,739.87 | $1,956,264.79 |
| | | Sporting Goods | $1,212,081.13 | $298,133.38 | $1,828,079.41 |
| 1994 | | SUBTOTAL | $28,663,266.29 | $10,867,577.58 | $54,337,887.91 |
| | Boston | SUBTOTAL | $3,855,842.54 | $1,946,893.53 | $5,796,039.47 |
| | | Womens Clothing | $1,065,090.31 | $615,419.83 | $1,455,902.83 |
| | | Mens Clothing | $1,386,808.04 | $644,142.24 | $2,203,014.24 |
| | | Sporting Goods | $1,403,944.19 | $687,331.46 | $2,137,122.41 |
| | Greenwich | SUBTOTAL | $3,855,842.54 | $977,189.02 | $5,796,039.47 |
| | | Womens Clothing | $1,065,090.31 | $238,704.98 | $1,455,902.83 |
| | | Mens | $1,386,808.04 | $382,120.17 | $2,203,014.24 |

| Year | Store | Department | Total Market Sales ($) | Merchandise Sales ($) | Total Regional Sales ($) |
|---|---|---|---|---|---|
| | | Clothing Sporting Goods | $1,403,944.19 | $356,363.87 | $2,137,122.41 |

This report is much more complex than the previous one. It has three attributes, and it also shows totals and subtotals. To identify a specific row, a user should know the level of aggregation (e.g., if it is a total, or a terminal value) and to which intersection of attributes it applies.

According to one embodiment, this report would be transformed into plain text line by line and delivered verbally.

In the year 1993, in the store Boston, the Womens Clothing department had Total Market Sales of $843, 780 . . .

In the year 1993, in the store Boston, the Mens Clothing department had Total Market Sales of $1,255,097 . . .

In the year 1993, in the store Boston, the Sporting goods department had Total Market Sales of $1,212,081 . . .

A problem with this approach is the large amount of redundancy, since all three attributes are repeated at all times, even if only the leftmost attribute is changing for the next line. It may be easier to eliminate this redundancy and avoid repeating that the current year is 1993 and the store is Boston. This can be done by breaking the report down into a hierarchy of DIALOG nodes so that each contains a reasonably small piece of information. The user can then navigate through this structure and listen to the specific departments that he or she is interested in.

An example of the call flow of such a structure may be as follows:

1. Select a year—1993 or 1994—select 1993
2. Select a store—Boston or Greenwich—select Boston
3. Select a department—Womens Clothing, Mens Clothing, or Sporting Goods—select Mens Clothing
4. Mens Clothing had Total Market Sales of $1,255, 097.46, Merchandise Sales of $563,722.98, and Total Regional Sales of $1,956,264.79.

The XML of this report is:

```
top level element<dssgrid ns="A">
attribute list       <attr n="1" url="Year">Year</attr>
<attr n="2" url="Store">Store</attr>
<attr n="3" url="Department">Department</attr>
column headers <column-header>
<upper-left rows="1">Year</upper-left>
<upper-left rows="1">Store</upper-left>
<upper-left rows="1">Department</upper-left>
<mh n="1">Total Market Sales ($)</mh>
  <mh n="2" cols="1">Total Merchandise Sales ($)</mh>
<mh n="3" cols="1">Total Regional Sales ($)</mh>
</column-header>
individual rows <row>
<row-header>
grand total header    <gt-header cols="3">
</row-header>
grand total metric values <gt><mv n="1"
uf="52952637.7992">$52,952,637.80</mv></gt>
<gt><mv n="2" uf="20072630.2512">$20,072,630.25</mv></gt>
<gt><mv n="3" uf="100363151.256">$100,363,151.26</mv></gt>
</row>
<row>
<row-header>
"1993" <ae-desc n="1" rows="9"
idval= "1993"idurl="1993">1993 </ae-desc>
subtotal header <st-header cols="2"/>
</row-header>
subtotal of 'Year'    <st><mv n="1"
                uf="24289371.5505">$24,289,371.51 </mv></st>
<st<>mv n="2" yf="8295952,6696">$9,205,052.67</mv></st>
<st><mv n="3" uf="46025263.348">$46,025,263.35</mv></st>
</row>
<row>
<row-header>
<ae-desc n="1" "rows="0"idval="1993"idurl="1993">1993</ae-desc>
"Boston"        <ae-desc n="2" rows="4"idval="1"
                idurl="1">Boston</ae-desc>
<st-header cols="1"/>
</row-header>
subtotal of 'Store'    <st><mvn=
                "1"yf="3310959.0852">$3,310,959.09</mv></st>
<st><mv n="2" uf="1661067.4907">$1,661,067.49<mv></st>
<st><mv n="3" yf="4949324.6089">$4,949,324.61</mv></st>
</row>
<row>
bottom level row ('Department') <row-header>
<ae-desc n="1" rows="0" idval="1993"idurl="1993">1993 </ae-desc>
<ae-desc n="2" rows="0" idval="1"idurl="1">Boston</ae-desc>
"Womens Clothing"   <sr-desc n="3"
                rows="1" idval="1" idurl="1">Womens
Clothing</ae-desc>
</row-header>
atomic level metric values   <mv n="1"
                uf="843780.4886">$843,780.49</mv>
<mv n="2" uf="483040.6309">$483,040.63</mv>
<mv n="3" uf="1164980.4111">$1,164,980.41</mv>
</row>
rest of XML is omitted for       [ . . . ]
brevity
</dssgrid>
```

Listing 16 (XML):Department report in XML format

Note that the individual rows of the report are presented in a disconnected sequence that emphasizes the layout of the report, but not the semantic relationships of its cells. DSS Grid XML provides highly formatted data that is only one step away from the final presentation format. Reports in DSS Grid format are almost finished, and the XSLs that convert grids just determine the appearance of the report but are not meant to change its layout.

That means that it is easy to tell where each cell is located if this report was to be converted into a table, for example to be displayed on a web page. However, it may be difficult to determine that there are 3 departments that belong to Boston in 1993. According to one aspect of the invention, a solution to this can be provided. Note that the row headers span a number of rows. For example, "1993" applies to a total of 9 rows. This is implemented such that the first occurrence of the row header "1993" has the attribute rows="9":

<ae—desc    n="1"    rows="9"    idval="1993"
    idurl="1993">1993</ae-desc>

This node means "Attribute-element description with the value "1993", spanning the next 9 rows. For the remaining 8 rows of the nine rows that belong to "1993", the "rows" attribute is set to 0. Hence, the first occurrence of a row header indicates the number of rows to which this header applies, and the other occurrences always have rows="0". Finding those row headers where the "rows" attribute is not zero makes it possible to pick out the different values of each attribute without repetition. Together with the "n" attribute, which indicates the column to which this row header applies, an XSL can be written that extracts the hierarchical structure out of the source document.

A pseudo-code version of an algorithm for traversing the source XML hierarchically is:

```
for each child 1 of root where child 1.x>0
  for each child2 of root where child 1.a=childa2.a and
     child2.y>0
    for each child3 of root where child1.a=child3.a and
       child2.b=child3.b and child3.z>0
       . . . do something . . .
    next child3
  next child2
next child1
```

Listing 17: Pseudo-Code of Traversing Algorithm

This algorithm visits each row once, and the exact context of the row (i.e., the attributes to which it belongs) is known.

Hence, option lists can be generated for each attribute at each level of aggregation. Here are a few XSL segments. The first one is to list all distinct elements of the first attribute ("Year"):

<xsl:FOR-EACH select="row/row-header[ae-desc[0] [@rows>0]]">

This line of XSL selects all row-headers where the 'rows' attribute of the first attribute-element description is greater than zero. Within the context of any of those row-headers, the XSL to list all distinct elements of the second attribute as children of the first one (e.g., all stores in a particular year) is this:

<xsl:FOR-EACH select-"/dssgrid/row/row-header[ae-desc[0]/@idval=context( )/ae-desc[0]/@idval] [ae-deesc[1][@rows>0]] ">

This line finds all row-headers where the "idval" attribute of the first attribute-element description is equal to that of the current context row-header, and where the "rows" attribute of the second attribute-element description is greater than zero. Compare this to the second line of the pseudo-code version above.

In the same way, one can go one level deeper and select all distinct elements of the third attribute as children of the second attribute (e.g., all departments of a particular store):

<xsl:FOR-EACH select="/dssgrid/row/row-header[ae-desc[0]/@idval=context( )/ae-desc[0]/@idval][ae-desc[1]/@idval=context( )/ae-desc[1]/idval] [ae-desc[2] [@rows>0]]">

This line finds all row-headers that belong to the current context with the additional constraint that there must be a third attribute-element present, and that its "rows" attribute must be greater than zero. Effectively, that finds all lines under the subtotal.

By now it should be clear how to expand this scheme to reports with any number of attributes. With each additional attribute, a new join is added to the select pattern of the <xsl:FOR-EACH>element. This join matches the "idval" attribute of the attribute-element description of the column. So to select all elements in the fourth column within the current context, the select pattern is expanded by the constraints (replacing the last constraint in the previous example):

[ae-desc[2]/@idval context( )/ae-desc[2]/@idval]
[ae-desc[3][@rows>0]]

The foregoing describes how to select a particular row within its context. This allows for example a voice service to say something about the Womens Clothing Department while it is clear that it is the Womens Clothing Department of Boston in 1993.

To generate individual DIALOG nodes in TML out of a report, the names of these DIALOGs may be dynamically generated. The main requirement for DIALOG names is that they must also be unique. By concatenating the ID values of each attribute, names can be created that are unique within a particular report. For example, the name "1993-1-3" would uniquely identify the row whose row headers have the ids "1993", "1" and "3". This would be the Sporting Goods department of Boston in 1993.

One potential problem with this approach is that the uniqueness of these names cannot be guaranteed when several grids are combined into a single TML document, using several distinct XSLs. If two DIALOG names from different reports happen to be identical, unexpected merging of the corresponding DIALOG elements would occur. To prevent this, each report gets a different namespace, which is an attribute of the initial <dssgrid> tag. For example, <dssgrid ns="A"> means that this particular grid should prefix all of its private DIALOG names with "A". The system assigns single letters from A-Z and from a-z, and in the unlikely case that this is not enough, two-letter combinations may be used.

The command to retrieve the namespace string is:

<xsl:value-of select="/dssgrid/@ns"/>.

This can be inserted at most places in the XSL and will write the namespace string at the current insertion point in the output document. It can be easily integrated into a template that creates DIALOG names:

```
template for row-headers      <xsl:template match="row-header">
insert namespace              <xsl:value-of select="/dssgrid/@ns"/>
concatenate all attribute-elements   <xsl:FOR-EACH select="ae-desc">
insert ID value    <xsl:value-of select="@idval"/>
insert "-" except after last value   <xsl:if test="context( )
                                       [not(end( ))]">-</xsl:if>
</xsl:FOR-EACH>
</xsl:template>
```

Listing 18 (XSL): XSL Segment Containing a Single Template that Creates DIALOG Names This template generates names such as "A1993-1-3" or "B25-3". These names are used for the "name" attribute of DIALOG elements, and for the "next" attribute of OPTION, GETNUMBER, GETSPEECH, and ERROR elements.

To insert a name anywhere in the XSL, "apply-templates" is called and the "select" pattern should point to the correct row-header. If the current context is the row-header whose name is to be inserted, that will be:

<xsl:apply-templates select="."/>

The XSL that transforms the department report into a voice service is set forth below. Other solutions may be used.

```
<xsl:stylesheet xmlns:xsl="http://www.w3.org/TR/WD-xsl">
<!-- empty template for the root to pass down execution -->
root template   <xsl:template match="/"><xsl:apply-templates/>
       </xsl:template>
```

```
<!-- start of main template -->
start of main template        <xsl:template match="dssgrid">
start TML document            <TML>
<!-- insert initial DIALOG where processing begins. This could be a
different name when the result is embedded into an existing TML
document -->
start 'Person' DIALOG         <DIALOG name="Person" remove=
                              "parent">
<!-- give main overview by calling template for grand total -->
insert grand total            <SPEECH>You had <xsl:apply-
                              templates
select="/dssgrid/row/gt"/></SPEECH>
<!-- now define INPUT section of DIALOG and list all elements of the
first attribute to choose from -->
  <INPUT>
  <SPEECH>
  insert name of first attribute    Select a <xsl:value-of select="column-
header/upper-left[0]"/> for more information.
  </SPEECH>
<!-- create one OPTION for each 'year' -->
  insert OPTION for all       <xsl:FOR-EACH select="row/row-
                              header[ae-desc[0][@rows>0]]"
  elements of first attribute
  (Year)
  <OPTION>
  generate DIALOG name for    <xsl:attribute name="next"><xsl:
                              apply-templates
  'next'    select="."/></xsl:attribute>
  list attribute element      Press \f to hear more about <xsl:value-of
                              select="ae-desc[0]"/>.
  </OPTION>
  </xsl:FOR-EACH>
  </INPUT>
  <DIALOG>
  insert default DIALOG       <DIALOG name="footer">
  with some standard
  navigational OPTIONs
  <INPUT>
  <OPTION>Press \f to repeat this information.</OPTION>
  <OPTION next="back">Press \f to go back to the previous menu.
  </OPTION>
  <OPTION next="\v(parent)">Press \f to go one level up.</OPTION>
  <INPUT>
  </DIALOG>
  insert DIALOG for           <xsl:FOR-EACH select="row/row-
                              header[ae-desc[0][@rows>0]]">
  each Year
  <DIALOG store="parent='Person'">
  generate name  <xsl:attribute name="name"><xsl:apply-templates
  select="."/></xsl:attribute>
  <INPUT default="footer">
  insert OPTION for each      <SPEECH>Select a <xsl:value-of select=
                              "/dssgrid/column-header/
  element of second attribute          upper-left[1]"/></SPEECH>
  (Store)
   <xsl:FOR-EACH select="/dssgrid/row/row-header[ae-desc[0]/@idval =
  con-text( )/ae-desc[0]/@idval][ae-desc[1][@rows>0]]">
    <OPTION>
  generate name for 'next' <xsl:attribute name="next"><xsl:apply-
  templates
  attribute                   select="."/></xsl:attribute>
  For <xsl:value-of select="ae-desc[1]"/>, press \f.
  </OPTION>
  </xsl:FOR-EACH>
  </INPUT>
  </DIALOG>
  </xsl:FOR-EACH>
   insert DIALOG for each Store <xsl:FOR-EACH select="row/row-
  header[ae-desc[0][@rows>0]]">
    <xsl:FOR-EACH select="/dssgrid/row/row-header[ae-desc[0]=con-
  text( )/aedesc[0]][ae-desc[1][@rows>0]]">
    <DIALOG>
    generate name             <xsl:attribute name="name"><xsl:apply-
                              templates select="."/></xsl:attribute>
      insert parent for navigation   <xsl:attribute name="store">parent=
                              '<xsl:value-of
  select="ae-des[0]/@idval"/>'</xsl:attribute>
    <SPEECH><xsl:value-of select="ae-desc[1]"/> had <xsl:apply-
  templates
  select=" . . . /st"/></SPEECH>
  <INPUT default="footer">
  insert menu of all          <SPEECH>Select a <xsl:value-of select=
                              "/dssgrid/column-departments    header/upper-left[2]"/> for more
                                                              information. <SPEECH>
    <xsl:FOR-EACH
  select="/dssgrid/row/row-header[ae-desc[0]/@idval=context( )/ae-
  desc[0]/ @idval][ae-desc[1]/@idval=con-text( )/ae-desc[1]/@idval]
  [ae-desc[2][@rows>0]]">
    <OPTION>
    <xsl:attribute name="next"><xsl:apply-templates select="."/></xsl:
  attribute>
    For <xsl:value-of select="ae-desc[2]"/>, press \f.
    </OPTION>
    </xsl:FOR-EACH>
    </INPUT>
    </DIALOG>
    </xsl:FOR-EACH>
    </xsl:FOR-EACH>
    insert DIALOG for each <xsl:FOR-EACH select="row/row-header[ae-
  desc[0][@rows>0]]">
    department
    <xsl:FOR-EACH select="/dssgrid/row/row-header[ae-desc[0]/ @idval=
  context( )/ae-desc[0]/@idval][ae-desc[1][@rows>0]]">
    <xsl:FOR-EACH
  select="/dssgrid/row/row-header[ae-desc[0]/@idval=context( )/
  ae-desc[0]/@idval][ae-desc[1]/@idval=con-text( )/
  ae-desc[1]/@idval][ae-desc[2][@rows>0]]">
    <DIALOG>
    generate name    <xsl:attribute name="name"><xsl:apply-templates
  select="."/></xsl:attribute>
      <xsl:attribute name="store">parent='<xsl:value-of
  select="ae-desc[0]/@idval"/>-<xsl:value-of
  select="ae-desc[1]/@idval"/>'<xsl:attribute>
    insert summary of all metric    <SPEECH><xsl:value-of select=
                              "ae-desc[2]"/> had
    <xsl:apply-templates
    values by calling row template  select=" . . . "/></SPEECH>
    <INPUT default="footer"/>
    <DIALOG>
    </xsl:FOR-EACH>
    </xsl:FOR-EACH>
    </xsl:FOR-EACH>
  end of TML document         </TML>
  end of main template        </xsl:template>
  <!-- end of main template -->
  <!-- template for individual rows. matches grand totals, sub totals,
  and normal rows -->
  row template to list all    <xsl:template match="gt|st|row">
  metric values in a single row
  <xsl:FOR-EACH select="mv">
  <xsl:apply-templates select="."/>
  insert "and" before last value    <xsl:choose>
  <xsl:when test=".[@n=3">. </xsl:when>
  <xsl:otherwise>, <xsl:if test=".[@n=2]">and
  </xsl:if></xsl:otherwise>
  </xsl:choose>
  </xsl:FOR-EACH>
  </xsl:template>
  <!-- template for generating DIALOG names -->
  template for DIALOG names   <xsl:template match="row-header">
  <xsl:value-of select="dssgrid/@ns"/>
  <xsl:FOR-EACH select="ae-desc">
  <xsl:value-of select="@idval"/><xsl:if test="context( )[not
  (end( ))]"></xsl:if>
  </xsl:FOR-EACH>
  <xsl:template>
  <!--templates for individual metric values. Adjust units and wording to
  fit specific report.-->
  templates for individual    <xsl:template match="mv[@n=1]"><xsl:
  value-of select="/dssgrid/metric values    column-header/mh[@n=1]
  "/> of <xsl:value-of/>dollar</xsl:template>
  <xsl:template match="mv[@n=2] "?>xs;"va;ie=pf se;ect="/dssgrid/
  column-header/mh[@n=2] "/> of <xsl:value-of/> dollar</xsl:
  template>\<xsl:template match="mv[@n=3] "><xsl:value-of select=
  "/dssgrid/column-header/mh[@n=3] "/> of<xsl:value-of/> dollar
  </xsl:template>
  <xsl:stylesheet>
```

Listing 19 (XSL): Complete XSL Stylesheet to Transform the Report from Listing 16 into a TML=Document.

To design reports suitable for XSL transformations, it may be easier if they are tabular and not cross-tabbed. In connection with the foregoing, the assumption has been that all attribute elements have attribute node descriptions and no attribute element IDs. This may be different for some reports, but it would be very easy to adjust the XSL accordingly, as you would just have to replace <ae-desc> with <ae-id> in the appropriate places.

Voice Service System

The above described embodiments of a voice based markup language and a method and system for generating the voice based markup language may be used in conjunction with an overall voice service system and method as shown in FIGS. 1-8. According to one embodiment of the present invention, a system is provided for automatic, interactive, real-time, voice transmission of OLAP output and other content to one or more subscribers. For example, subscribers may be called by the system, and have content delivered audibly over the telephone or other voice-enabled terminal device during an interactive voice broadcast (IVB). During the IVB, information may be exchanged between the system and a subscriber. The system conveys content to the subscriber and, the subscriber may respond by pressing one or more buttons on a telephone touch pad dial (or other input mechanism) to hear more information, to exercise options, or to provide other responses. This interaction shapes the structure of a basic exchange between the system and the subscriber. During or after the call is terminated, the subscriber's responses may be stored and processed (e.g., by other applications).

According to one embodiment of the present invention, a method for automatic, interactive, real-time, voice transmission of OLAP output and other content to one or more subscribers is provided. FIG. 1*a* depicts a flow chart of a method for automatic, interactive, real-time, voice transmission of OLAP output according to one embodiment. The method begins in step 110 with the creation of a voice service (e.g., by a system administrator or user). A voice service is created using, for example, a voice service wizard which may comprise a series of interfaces. One embodiment of a method for creating a voice service is explained in more detail below in conjunction with FIG. 1*b*. One embodiment of a voice service wizard is explained below in conjunction with FIG. 3*b*.

After a voice service is created, users may subscribe or be subscribed to the voice service (step 120), for example, by using a subscription interface. According to one embodiment, users may subscribe to an existing voice service over the telephone or by web-based subscription. A user may also be subscribed programmatically. In other embodiments, a user may subscribe to a voice service via electronic mail. Not every voice service created in step 110 is available for subscription. More specifically, according to another embodiment, only a user with appropriate access, such as the creator of the service, is allowed to subscribe himself or others to a service. Such a security feature may be set when the voice service is created.

In step 130, a scheduling condition or other predetermined condition for the voice services is monitored to determine when they are to be executed. That is, when a voice service is created or subscribed to, the creator or user specifies when the voice service is to be executed. A user may schedule a voice service to execute according to the date, the time of day, the day of the week, etc. and thus, the scheduling condition will be a date, a time, or a day of the week, either one time or on a recurring basis. In the case of an alert service, discussed in more detail below, the scheduling condition will depend on satisfaction of one or more conditions. According to one embodiment, the condition(s) to be satisfied is an additional scheduling condition. According to another embodiment, a service may be executed "on command" either through an administrator or programmatically through an API. Scheduling of voice services is discussed in more detail below.

The method continues monitoring the scheduling condition for voice services until a scheduling condition is met. When a scheduling condition is met, that voice service is executed. The execution of a voice service involves, inter alia, generating the content for the voice service, and structuring the voice service to be interactively broadcast through a call server. The execution of a voice service is explained in detail in conjunction with FIG. 1*c*.

An example of an IVB is as follows.
PERSONALIZED GREETING
Hello Joe, this is your stock update.
PIN VERIFICATION
Please enter your six digit PIN number
(Joe enters his PIN using the keypad dial on his telephone or speaks his PIN.)
MENU OPTIONS
Your portfolio was up by $1000 today.
Please select:
1. To get a portfolio stock update
2. To conduct a transaction
(Joe Presses or Speaks 2)
SUB MENU
Thank you, Joe! Please select a ticker.
1. PQT
2. TQP
3. Listen to options again
4. Return to main menu
(Joe presses or speaks 1.)
SUB MENU
Would you like to buy or sell stock? Please press:
1. To sell stock
2. To buy stock
(Joe Presses or Speaks 1.)
SUB MENU
How many shares of PQT would you like to sell today? Please press:
1. To sell 50 shares
2. To sell 100 shares
3. To sell 200 shares
4. To sell another quantity
(Joe presses or speaks 2.)
SUB MENU
You selected 2. You want to sell 100 shares of PQT. Please press:
1. If this is correct
2. If this is incorrect
3. If you want to change the number of shares you want to buy.
(Joe presses or speaks 1.)
END VOICE SERVICE/TERMINATE IVB
Thank you for using our voice interactive broadcasting service, Joe. We will call you back when your transaction is completed. Good-bye.

As can be seen from the above sample during an IVB, the user is presented with information, e.g., the status of his portfolio, and is presented options related to that report, e.g., the option to buy or sell stock.

According to one embodiment, a voice service is constructed using service wizard. A voice service is constructed using several basic building blocks, or elements, to organize the content and structure of a call. According to one embodiment, the building blocks of a voice service comprise elements of a markup language. According to one particular embodiment, elements of the novel markup language based on XML (TML) (explained in detail above) are used to construct voice services. As described above, TML supports both spoken and keyed responses to requests for input. Other XML-based markups such as VoiceXML™ may be used.

In addition to the markup language elements described above, there are two features that maximize an administrator's ability to design voice services. Call Flow Reports enable an administrator to generate the structure of a call based on the content of an report e.g., from an OLAP system or other data repository. For example, the options presented to a user in through an OPTION element may be made to correspond to the row of a data report. According to one embodiment, report data is converted into options by application of an XSL (extensible style sheet language) style sheet as described in detail above. The result of this application is inserted into the static call structure when the voice service is executed.

The use of an XSL style sheet is a feature that maximizes an administrator's voice service building ability. As discussed above, they are used to create dynamic call structure that depends on data report output. They may also be used to generate a text string that comprises the message to be read to a user at any point in a call.

A method for creating a voice service according to one embodiment will now be explained in conjunction with FIG. 2. The method begins in step 210 by naming the voice service. Then, in step 220 various scheduling parameters of the voice service are defined. In step 250 the service content is defined. And, in step 260, the personalization modes, or style properties are selected for the voice service.

According to one embodiment, in step 210, a voice service is named and a description of the voice service provided. By providing a name and description, a voice service may be uniquely identified. An interface is provided for prompting input of the name of the service to be created or edited. An input may also be provided for a written description. An open typing field would be one option for providing the description input. According to another embodiment, if an existing call service has been selected to edit, the service name field may not be present or may not allow modification.

In step 220, conditions for initiating the service are selected. This may include selecting and defining a service type. At least two types of services may be provided based on how the services are triggered. A first type of service is run according to a predetermined schedule and output is generated each time the service is run. A second type of service, an alert service, is one that is run periodically as well, however, output is only generated when certain criteria is satisfied. Other service types may be possible as well. In one embodiment the administrator is prompted to choose between a scheduled service or an alert service. An interface may provide an appropriate prompt and some means for selecting between a scheduled service and an alert service. One option for providing the input might be an interface with a two element toggle list.

In one embodiment, a set of alert conditions is specified to allow the system to evaluate when the service should be initiated if an alert type service has been selected. In one embodiment, a report or a template/filter combination upon which the alert is based is specified. Reports and template/filter combinations may be predefined by other objects in the system including an agent module or object creation module. According to one embodiment, an agent module, such as DSS agent™ offered by MicroStrategy, may be used to create and define reports with filters and template combinations, and to establish the alert criteria for an alert service. According to another embodiment, an interface is be provided which includes a listing of any alert conditions presently selected for the voice service. According to this embodiment, the interface may comprise a display window. A browse feature may take the user to a special browsing interface configured to select a report or filter-template combination. One embodiment of an interface for selecting reports and filter-template combinations is described below. Once a report or filter and template combination is chosen, the alerts contained in the report or filter and template combination may be listed in the display window of the interface.

In step 220, the schedule for the service is also selected. According to one embodiment, predefined schedules for voice services may be provided or a customized schedule for the voice service may be created. If a new schedule is to be created, a module may be opened to enable the schedule name and parameters to be set. Schedules may be run on a several-minute, hourly, daily, monthly, semi-annual, annual or other bases, depending upon what frequency is desired. According to one embodiment, an interface is provided that allows the administrator to browse through existing schedules and select an appropriate one. The interface may provide a browsing window for finding existing schedule files and a "new schedule" feature which initiates the schedule generating module. In one embodiment, schedules may not be set for alert type services. However, in some embodiments, a schedule for evaluating whether alert conditions have been met may be established in a similar manner.

In step 220, the duration of the service is also set. Service duration indicates the starting and stopping dates for the service. Setting a service duration may be appropriate regardless of whether a scheduled service or alert type service has been selected. The start date is the base line for the scheduled calculation, while the end date indicates when the voice service will no longer be sent. The service may start immediately or at some later time. According to one embodiment, interface is provided to allow the administrator to input start and end dates. The interface may also allow the administrator to indicate that the service should start immediately or run indefinitely. Various calendar features may be provided to facilitate selection of start and stop dates. For example, a calendar that specifies a date with pull-down menus that allow selection of a day, month and year may be provided according to known methods of selecting dates in such programs as electronic calendar programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

In step 220, a voice service may also be designated as a mid-tier slicing service. In one embodiment, mid-tier slicing services generate content and a dynamic subscriber list in a single query to an OLAP system. According to one embodiment, in a mid-tier slicing service a single database query is performed for all subscribers to the service. The result set developed by that query is organized in a table that contains a column that indicates one or more users that each row of data is applicable to.

In step 250, the content of the voice service is defined. Defining the content of the voice service may include selecting the speech to be delivered during the voice service broadcast (content), the structure of dialogs, menus, inputs, and the background procedures which generate both content and structure. In one embodiment, defining voice service content establishes the procedures performed by the voice service server (explained below) to assemble one or more active voice pages in response to initiation of the voice service. According to one embodiment, defining service content involves establishing a hierarchical structure of TML elements which define the structure and content of a voice service. All of the elements in a given service may be contained within a container.

The personalization type is selected in step 260. Personalization type defines the options that the administrator will have in applying personalization filters to a voice service. According to one embodiment, a personalization filter is a set of style properties that can be used to determine what content generated by the service will be delivered to the individual user and in what format it will be delivered. In one embodiment, personalizing the delivery format may include selection of style properties that determine the sex of the voice, the speed of the voice, the number of call back attempts, etc. Personalization filters may exist for individual users, groups of users, or types of users. According to one embodiment, personalization filters may be created independent of the voice service. According to this embodiment, a voice service specifies what filters are used when generating IVBs. Some personalization type options may include: allowing no personalization filters; allowing personalization filters for some users, but not requiring them; and requiring personalization filters for all interactive voice broadcasts made using the service.

According to one embodiment, specifying personalization type is accomplished by administrator input through an interface. The interface may offer a toggle list with the three options: required personalization, optional personalization, and no personalization.

Figure 3A:
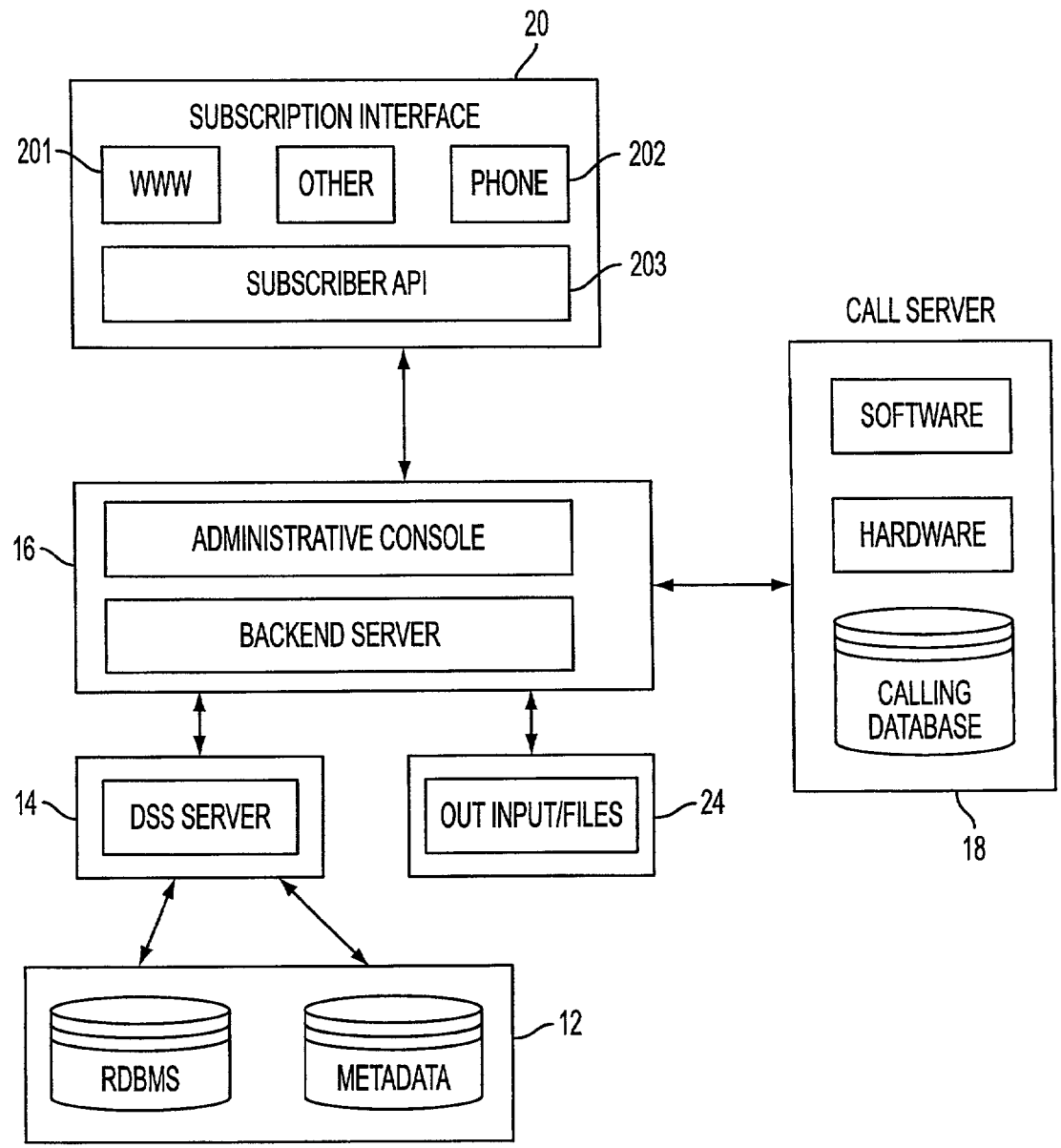
FIG. 3a is a schematic block diagram of a system in accordance with an embodiment of the present invention.
Figure 3B:
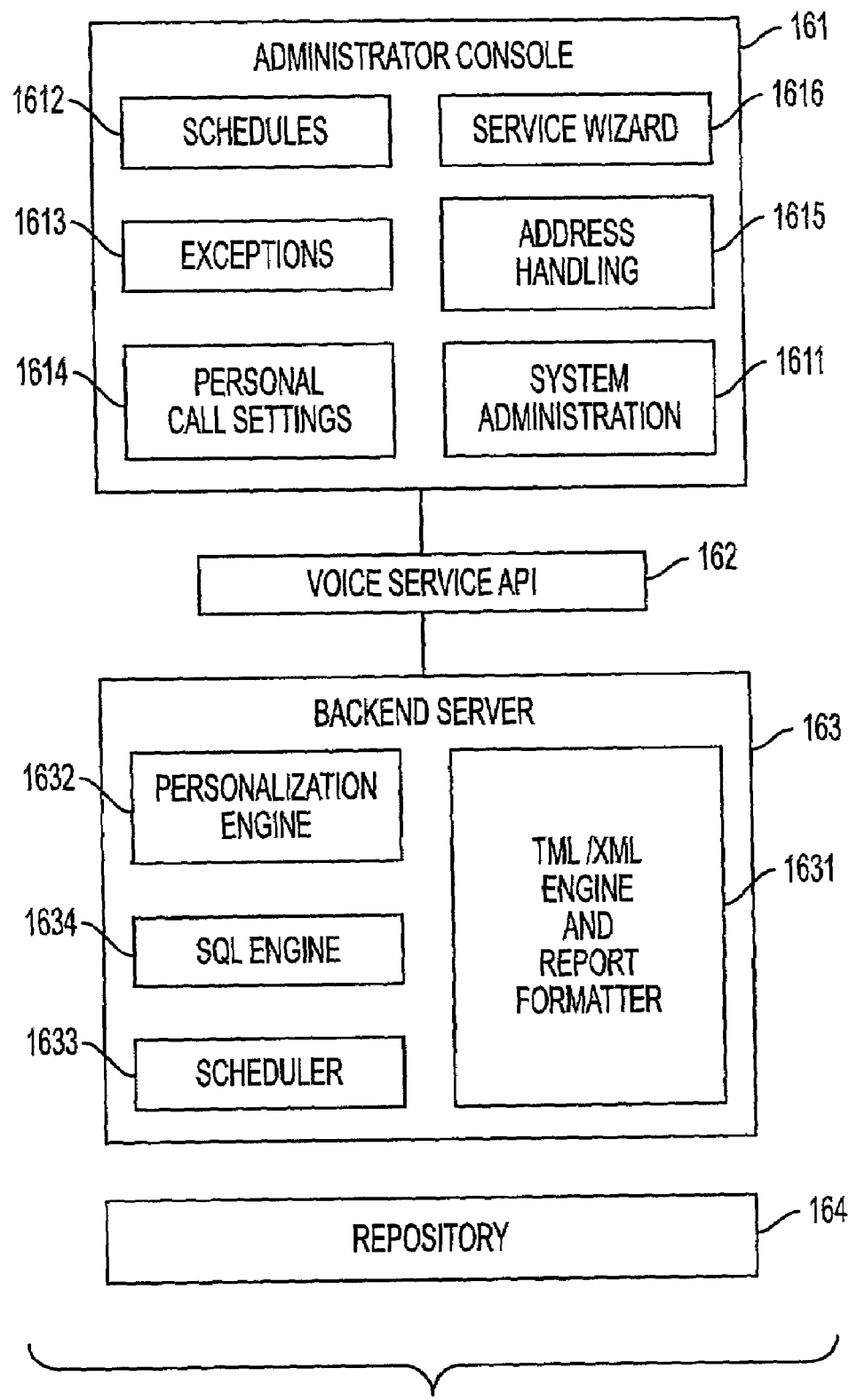
FIG. 3b is a schematic block diagram of an intelligence server according to an embodiment of the present invention.
Figure 3C:
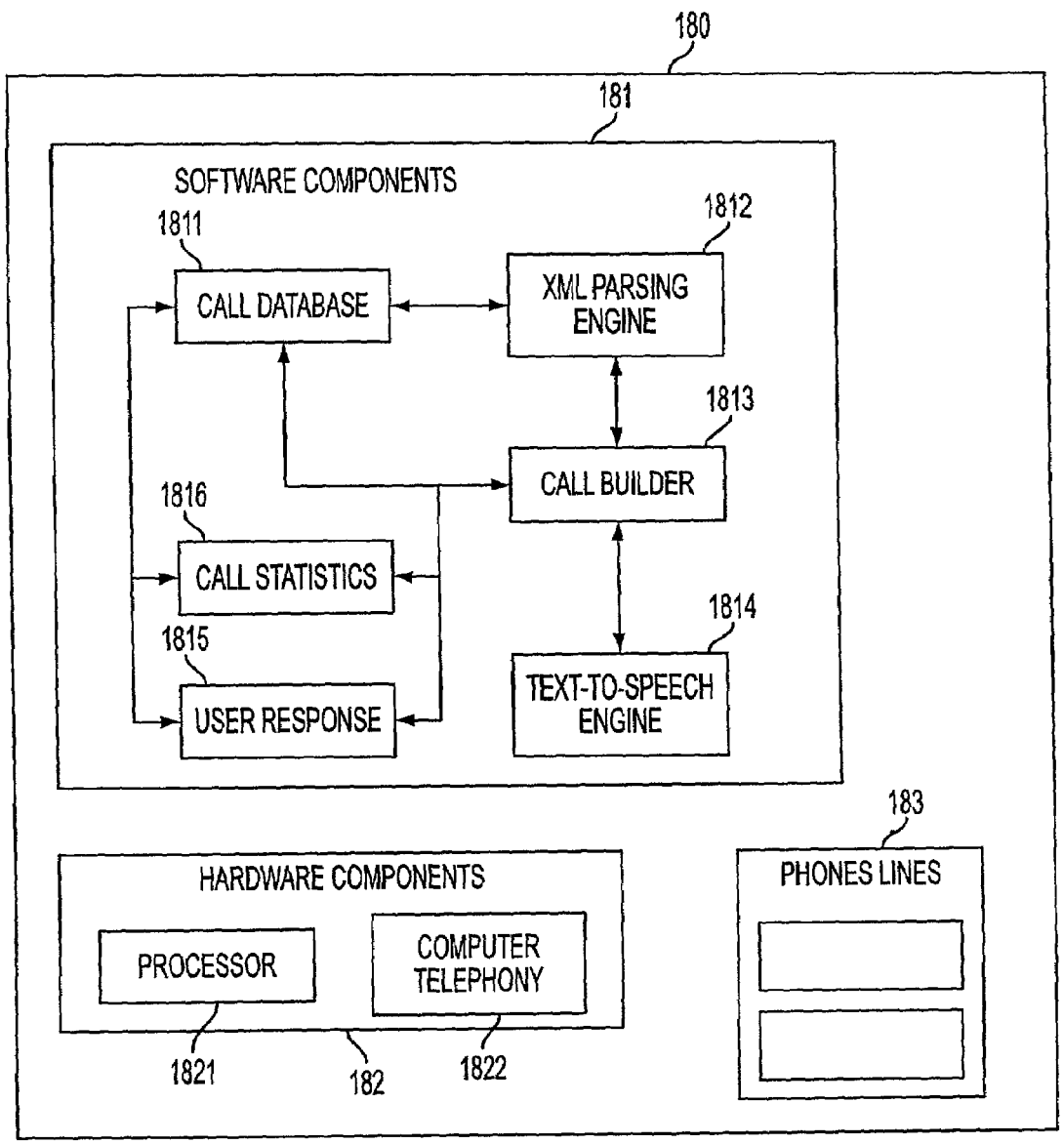
FIG. 3c is a schematic block diagram of call server according to an embodiment of the present invention.

The voice service may be stored in a database structure to enable users to retrieve predefined voice services and to subscribe to these services, for example, through subscription interfaces explained in conjunction FIGS. 3a-3c or otherwise. An interface informing the administrator that creation of the voice service is complete may also be provided.

Figure 1B:
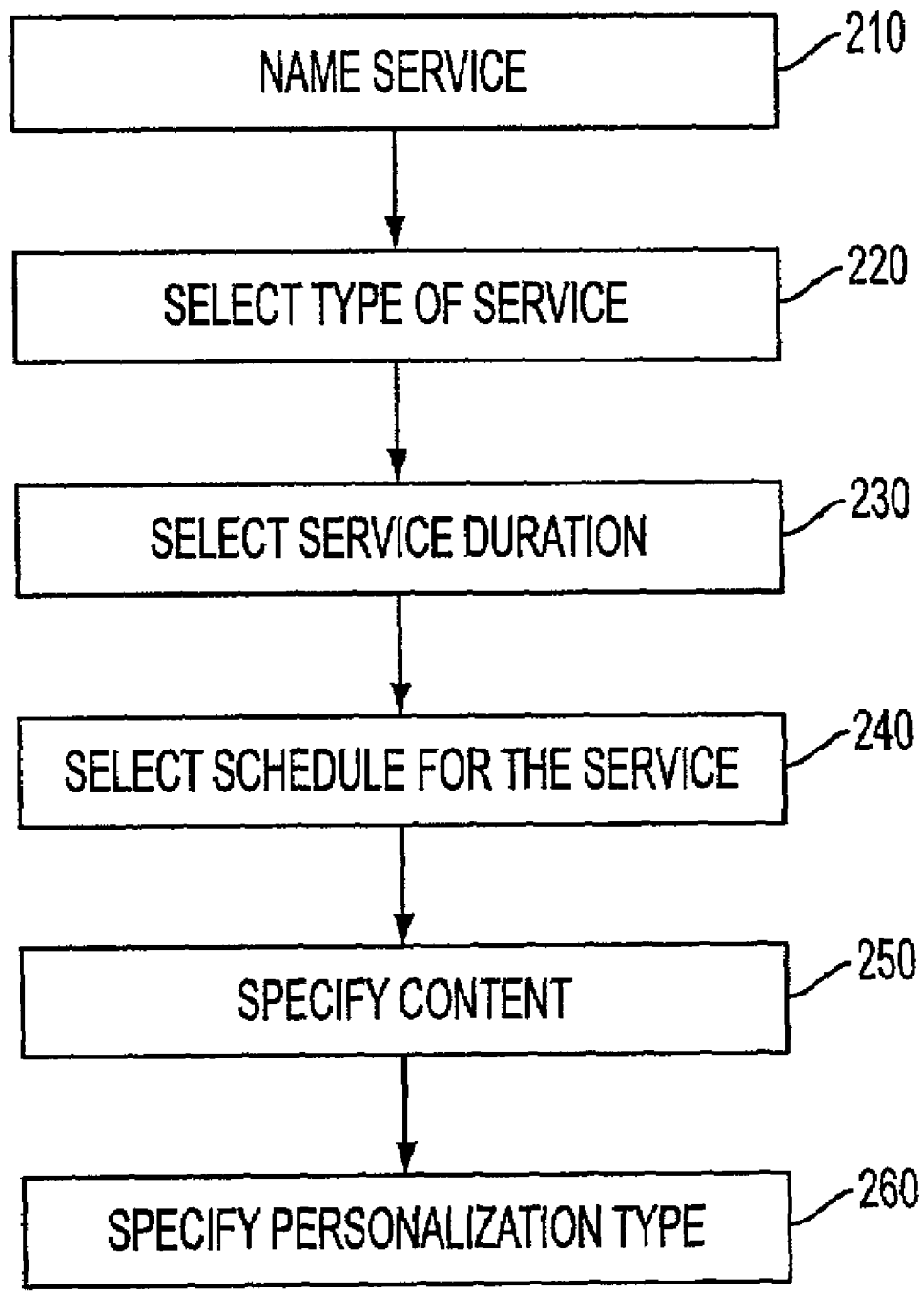
FIG. 1b is a flow chart indicating a method of generating a voice service according to one embodiment of the present invention.

According to one embodiment, the method of FIG. 1b also comprises an error condition step. An error condition step may be used to enable administrators to specify "error" conditions and the handling of those conditions. For example, an "error" condition may comprise a notification that a server is "down" or that there is no data to be returned. An administrator may specify particular actions to be performed by the system in response to one or more error conditions. For example, an administrator may specify an "addressing" error (e.g. disconnected number) and indicate a particular action to be performed in response to an "addressing" error (e.g., notify system administrator). Other error conditions might include: an alert report encountering an error and returning no data; a subscriber lacking the required personalization filter for the service; errors occurring in the generation of one or more reports; or reports returning no data. Various other conditions and actions may be specified. Certain error conditions may be predetermined for the system, but an administrator may have reasons for supplementing or diverging from the predetermined error conditions. According to one particular embodiment, error conditions are specified using the ERROR and SYS-ERROR elements.

In one embodiment, setting error conditions may be accomplished using an error handling interface. The interface may allow the administrator to select either default error handling, or to customize error handling using a module for defining error handling. If default handling is selected, the system uses established settings. If customized handling is chosen, the user may use a feature to access the appropriate interface for the error handling module.

Servers may have limited capacity to perform all of the actions required of them simultaneously, the method of FIG. 1b comprises a step for prioritizing the execution and delivery of voice services. Prioritization may establish the order in which the voice service system allocates resources for processing voice service and delivering the IVB. According to one embodiment, assigning priority to a voice service establishes priority for queries to the database system, formatting the voice service, or IVBs. Any criteria may be used for establishing priority. According to one embodiment, priority is established based on service content. According to another embodiment, priority is based on service destination. According to another embodiment, priority may be established based on the type of voice service, i.e., alert vs. scheduled. Any number of procedures or criteria for denoting relative importance of service delivery may be established.

In one embodiment, an interface is provided for defining the priority of the voice service being created or edited. According to one embodiment, the interface comprises a screen including option boxes with pull down menus listing the number of different prioritization options.

Figure 1C:
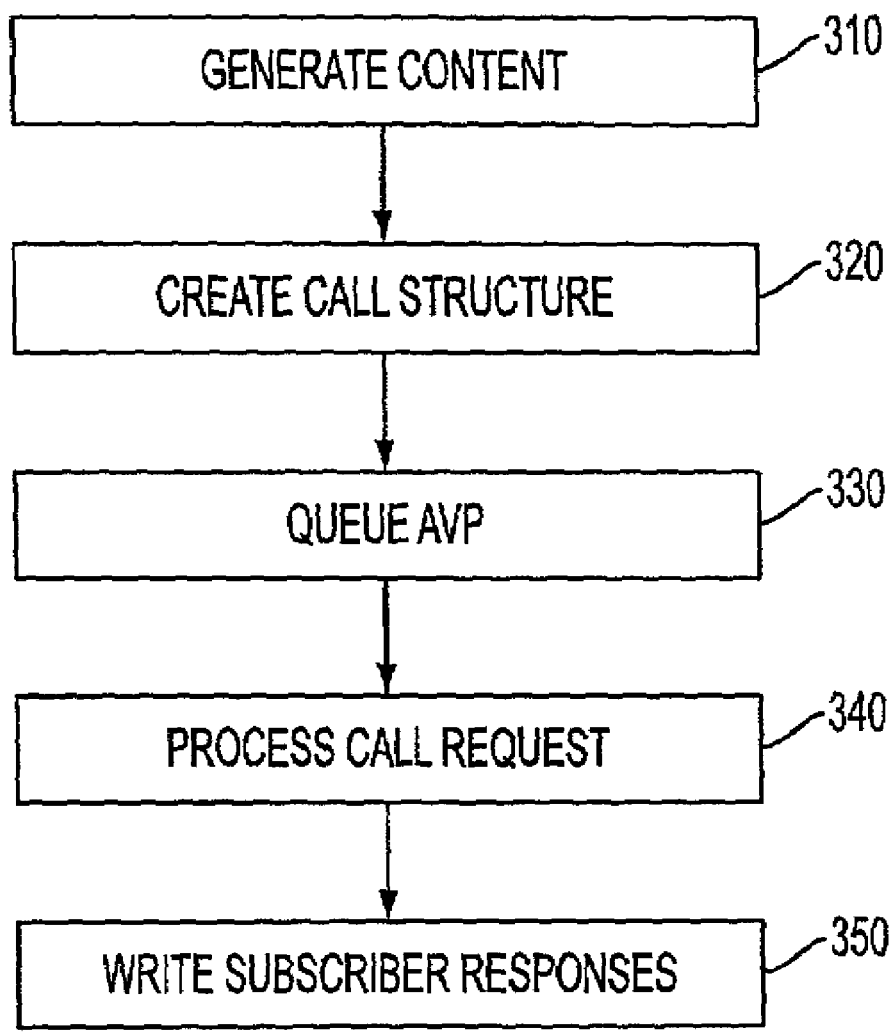
FIG. 1c is a flow chart indicating a method for interactive voice broadcasting according to an embodiment of the present invention.

Another aspect of the invention relates to a method for executing a voice service. FIG. 1c depicts one example of a flow chart for executing a voice service. In step 310, the content of a voice service is generated. In step 320, the call structure of an IVB is created via Active Voice Pages. In step 330, the AVPs are put in a call database for processing e.g., in a call queue. In step 340, the call request is processed and an interactive voice broadcast with the user is implemented. In step 350, user's responses are written back to the voice service system (e.g., the Active Voice Page). Each of these steps will be explained in more detail below.

According to one embodiment, content is created in step 310 as follows. A voice service execution begins by running scheduled reports, queries or by taking other action to determine whether the service should be sent. The subscribers for the service are then resolved. Datasets are generated for each group of subscribers that has unique personalization criteria.

Call structure may be created (step 320) as follows. An AVP contains data at various hierarchical content levels (nodes) that can be either static text or dynamic content. Static text can be generated e.g., by typing or by incorporating a text file. Dynamic content may be generated e.g., by inserting data from a data report using a grid and/or an XSL stylesheet. Moreover, content is not limited to text based information. Other media, such as, sound files, may be incorporated into the AVP. The call data (for example, at a particular level) may be the text that is converted to speech and played when the recipient encounters the node. According to one embodiment, all of the call content is organized using the voice-based markup language, TML, described above.

According to another embodiment, call content may include content from other voice pages, for example, "standard" active voice pages that are generated and inserted into a database or Web Server where the pages are periodically refreshed. According to one particular embodiment, the active voice page that is generated for a user contains links to other active voice pages. The links may be followed using a process similar to web page links.

The call structure may comprise either a static structure that is defined in the voice service interfaces e.g., by typing text into a text box and/or a dynamic structure generated by grid/XSL combinations. The dynamic structure is merged with static structure during the service execution. A single call structure is created for each group of users that have identical personalization properties across all projects because such a group will receive the same content.

After a call structure is generated, in step 330, it is sent to a call database e.g., call database 1811 shown in FIG. 3c, along with the addresses and style properties of the users. The style properties govern the behavior of a call server 18 in various aspects of the dialog with a user. Call server 18 queries call database 1811 for current call requests and places new call requests in its queue.

In step 340, a call request is processed. A call is implemented on call server 18 using one of several ports that are configured to handle telephone communication. When a port becomes available, the call request is removed from the queue and the call is made to the user. As the user navigates through an active voice page, e.g., by entering input using the key pad or by speaking responses, call/content is presented by converting text to speech in text-to-speech engine 1814. User input during the call may be stored for processing. According to another embodiment, user responses and other input may also be used to follow links to other active voice pages. For example, as explained above, "standard" active voice pages may be generated and inserted into a database or Web Server. Then, when a user's voice service is delivered, that voice service may contain links to information that may be accessed by a user. A user may access those standard active voice pages by entering input in response to OPTION, GETNUMBER, and/or GETSPEECH elements.

In step 350, user responses are stored by the system. According to one embodiment, user responses are stored in a response collection defined by the active voice page. A voice service may specify that a subscriber return information during an UVB so that another application may process the data. For instance, a user may be prompted to purchase a commodity and be asked to enter or speak the number of units for the transaction. During or after an IVB, the subscriber's responses are written to a location from which they can be retrieved for processing (e.g., by an external application).

Figure 2:
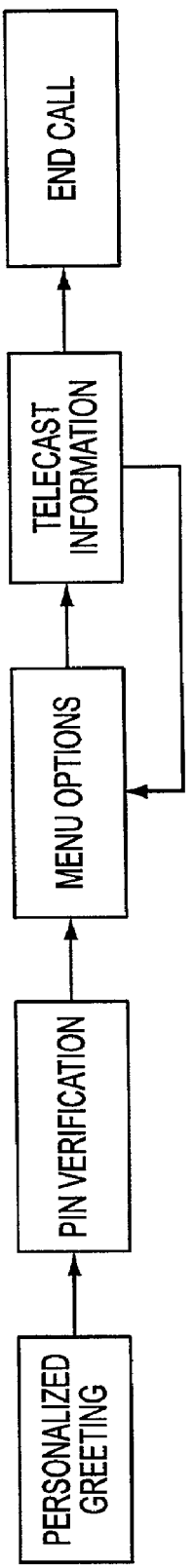
FIG. 2 is a flow chart indicating a sequence of an interactive voice broadcast according to one embodiment of the present invention.

FIG. 2 is an example of an IVB with interactive call flow. An IVB usually contains a greeting message that addresses the targeted user, identifies the name of the calling application, and states the purpose of the call and/or presents summary metrics. The voice service system can also implement a PIN verification protocol, if this layer of security is required. The main menu structure of an IVB can contain a number of options that lead to sub-menu structures. A menu can also contain prompts for the user to enter numerical information using a telephone touch pad dial. A node along the hierarchical menu structure may have options to return the user to a higher level.

FIG. 3 depicts an embodiment of a system according to one embodiment of the present invention. Preferably, the system comprises database system 12, a DSS server 14, voice service server 16, a call server 18, subscription interface 20, and other input/files 24.

Database system 12 and DSS server 14 comprise an OLAP system that generates user-specified reports from data maintained by database system 12. Database system 12 may comprise any data warehouse or data mart as is known in the art, including a relational database management system ("RDBMS"), a multidimensional database management system ("MDDBMS") or a hybrid system. DSS server 14 may comprise an OLAP server system for accessing and managing data stored in database system 12. DSS server 14 may comprise a ROLAP engine, MOLAP engine or a HOLAP engine according to different embodiments. Specifically, DSS server 14 may comprise a multithreaded server for performing analysis directly against database system 12. According to one embodiment, DSS server 14 comprises a ROLAP engine known as DSS ServerM offered by MicroStrategy.

Voice service server (VSS) 16, call server 18 and subscription interface 20 comprise a system through which subscribers request data and reports e.g., OLAP reports through a variety of ways and are verbally provided with their results through an IVB. During an IVB, subscribers receive their requested information and may make follow-up requests and receive responses in real-time as described above. Although the system is shown, and will be explained, as being comprised of separate components and modules, it should be understood that the components and modules may be combined or further separated. Various functions and features may be combined or separated Subscription interface 20 enables users or administrators of the system to monitor and update subscriptions to various services provided through VSS 16. Subscription interface 20 includes a world wide web (WWW) interface 201, a telephone interface 202, other interfaces as desired and a subscriber API 203. WWW interface 201 and telephone interface 202 enable system 100 to be accessed, for example, to subscribe to voice services or to modify existing voice services. Other interfaces may be used. Subscriber API 203 provides communication between subscription interface 20 and VSS 16 so that information entered through subscription interface 20 is passed through to VSS 16.

Subscription interface 20 is also used to create a subscriber list by adding one or more subscribers to a service. Users or system administrators having access to VSS 16 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface 20 permits a user to specify particular criteria (e.g., filters, metrics, etc.) by accessing database system 12 and providing the user with a list of available filters, metrics, etc. The user may then select the criteria desired to be used for the service. Metadata may be used to increase the efficiency of the system.

A SRL is a list of manually entered names of subscribers of a particular service. The list may be entered using subscription interface 20 or administrator console 161. SRL entries may be personalized such that for any service, a personalization filter (other than a default filter) may be specified. A SRL enables different personalizations to apply for a login alias as well. For example, a login alias may be created using personalization engine 1632. Personalization engine 1632 enables subscribers to set preferred formats, arrangements, etc. for receiving content. The login alias may be used to determine a subscriber's preferences and generate service content according to the subscriber's preferences when generating service content for a particular subscriber.

A DRL may be a report which returns lists of valid user names based on predetermined criteria that are applied to the contents of a database such as database system 12. Providing a DRL as a report enables the DRL to incorporate any filtering criteria desired, thereby allowing a list of subscribers to be derived by an application of a filter to the data in database system 12. In this manner, subscribers of a service may be altered simply by changing the filter criteria so that different user names are returned for the DRL. Similarly, subscription lists may be changed by manipulating the filter without requiring interaction with administrator console 161. Additionally, categorization of each subscriber may be performed in numerous ways. For example, subscribers may be grouped via agent filters. In one specific embodiment, a DRL is created using DSS Agent™ offered by MicroStrategy.

VSS 16 is shown in more detail in FIG. 3b. According to one embodiment, VSS 16 comprises administrator console 161, voice service API 162 and backend server 163. Administrator console 161 is the main interface of system 100 and is used to view and organize objects used for voice broadcasting. Administrator console 161 provides access to a hierarchy of additional interfaces through which a system administrator can utilize and maintain system 100. Administrator console 161 comprises system administrator module 1611, scheduling module 1612, exceptions module 1613, call settings module 1614, address handling module 1615, and service wizard 1616.

System administrator module 1611 comprises a number of interfaces that enable selection and control of the parameters of system 100. For example, system administrator module 1611 enables an administrator to specify and/or modify an email system, supporting servers and a repository server with which system 100 is to be used. System administrator 1611 also enables overall control of system 100. For example, system administrator module is also used to control the installation process and to start, stop or idle system 100. According to one embodiment, system administrator 1611 comprises one or more graphical user interfaces (GUIs).

Scheduling module 1612 comprises a number of interfaces that enable scheduling of voice services. Voice services may be scheduled according to any suitable methodology, such as according to scheduled times or when a predetermined condition is met. For example, the predetermined condition may be a scheduled event (time-based) including, day, date and/or time, or if certain conditions are met. In any event, when a predetermined condition is met for a given service, system 100 automatically initiates a call to the subscribers of that service. According to one embodiment, scheduling module 1612 comprises one or more GUIs.

Exceptions module 1613 comprises one or more interfaces that enable the system administrator to define one or more exceptions, triggers or other conditions. According to one embodiment, exceptions module 1613 comprises one or more GUIs.

Call settings module 1614 comprises one or more interfaces that enable the system administrator to select a set of style properties for a particular user or group of users. Each particular user may have different options for delivery of voice services depending on the hardware over which their voice services are to be delivered and depending on their own preferences. As an example of how the delivery of voice services depends on a user's hardware, the system may deliver voice services differently depending on whether the user's terminal device has voice mail or not. As an example of how the delivery of voice services depends on a user's preferences, a user may chose to have the pitch of the voice, the speed of the voice or the sex of the voice varied depending on their personal preferences. According to one embodiment, call settings module 1614 comprises one or more GUIs.

Address handling module 1615 comprises one or more interface that enable a system administrator to control the address (e.g., the telephone number) where voice services content is to be delivered. The may be set by the system administrator using address handling module 1615. According to one embodiment, address handling module 1615 comprises one or more GUIs.

Voice service wizard module 1616 comprises a collection of interfaces that enable a system administrator to create and/or modify voice services. According to one embodiment, service wizard module 1616 comprises a collection of interfaces that enable a system administrator to define a series of dialogs that contain messages and inputs and determine the call flow between these dialogs based on selections made by the user. The arrangement of the messages and prompts and the flow between them comprises the structure of a voice service. The substance of the messages and prompts is the content of a voice service. The structure and content are defined using service wizard module 1616.

Voice service API 162 (e.g., MicroStrategy Telecaster Server API) provides communication between administrator console 161 and backend server 163. Voice Service API 162 thus enables information entered through administrator console 161 to be accessed by backend server 163 (e.g., MicroStrategy Telecaster Server).

Backend server 163 utilizes the information input through administrator console 161 to initiate and construct voice services for delivery to a user. Backend server 163 comprises report formatter 1631, personalization engine 1632, scheduler 1633 and SQL engine 1634. According to one embodiment, backend server 163 comprises MicroStrategy Broadcast Server. Report formatter 1631, personalization engine 1632, and scheduler 1633 operate together, utilizing the parameters entered through administrator console 161, to initiate and assemble voice services for transmission through call server 18. Specifically, scheduler 1633 monitors the voice service schedules and initiates voice services at the appropriate time. Personalization engine 1632 and report formatter 1631 use information entered through service wizard 1616, exceptions module 1613, call settings module 1614, and address module 1615, and output provided by DSS server 14 to assemble and address personalized reports that can be sent to call server 18 for transmission. According to one embodiment, report formatter 1631 includes an XML based markup language engine to assemble the voice services. In a particular embodiment, report formatter includes a Telecaster Markup Language engine offered by MicroStrategy Inc. to assemble the call content and structure for call server 18.

SQL engine 1634 is used to make queries against a database when generating reports. More specifically, SQL engine 1634 converts requests for information into SQL statements to query a database.

Repository 164 may be a group of relational tables stored in a database. Repository 164 stores objects which are needed by system 100 to function correctly. More than one repository can exist, but preferably the system 100 is connected to only one repository at a time.

According to one embodiment, a call server 18 is used to accomplish transmission of the voice services over standard telephone lines. Call server 18 is shown in more detail in FIG. 3c. According to one embodiment, call server 18 comprises software components 181 and hardware components 182. Software components 181 comprise call database 1811, mark-up language parsing engine 1812, call builder 1813, text-to-speech engine 1814, response storage device 1815 and statistic accumulator 1816.

Call database 1811 comprises storage for voice services that have been assembled in VSS 16 and are awaiting transmission by call server 18. These voice services may include those awaiting an initial attempt at transmission and those that were unsuccessfully transmitted (e.g., because of a busy signal) and are awaiting re-transmission. According to one embodiment, call database 1811 comprises any type of relational database having the size sufficient to store an outgoing voice service queue depending on the application. Call database 1811 also comprises storage space for a log of calls that have been completed.

Voice services stored in call database 1811 are preferably stored in a mark-up language. Mark-up language parsing engine 1812 accepts these stored voice services and separates the voice services into parts. That is, the mark-up language version of these voice services comprises call content elements, call structure elements and mark-up language instructions. Mark-up language parsing engine 1812 extracts the content and structure from the mark-up language and passes them to call builder 1813.

Call builder 1813 is the module that initiates and conducts the telephone call to a user. More specifically, call builder dials and establishes a connection with a user and passes user input through to markup language parsing engine 1812. In one embodiment, call builder 1813 comprises "Call Builder" software available from Call Technologies Inc. Call builder 1813 may be used for device detection, line monitoring for user input, call session management, potentially transfer of call to another line, termination of a call, and other functions.

Text-to-speech engine 1814 works in conjunction with mark-up language parsing engine 1812 and call builder 1813 to provide verbal communication with a user. Specifically, after call builder 1813 establishes a connection with a user, text-to-speech engine 1814 dynamically converts the content from mark-up language parsing engine 1812 to speech in real time.

A voice recognition module may be used to provide voice recognition functionality for call server 181. Voice recognition functionality may be used to identify the user at the beginning of a call to help ensure that voice services are not presented to an unauthorized user or to identify if a human or machine answers the call. This module may be a part of call builder 1813. This module may also be used to recognize spoken input (say "one" instead of press "1"), enhanced command execution (user could say "transfer money from my checking to savings"), enhanced filtering (instead of typing stock symbols, a user would say "MSTR"), enhanced prompting, (saying numeral values).

User response module 1815 comprises a module that stores user responses and passes them back to intelligence server 16. Preferably, this is done within an AVP. During a telephone call, a user may be prompted to make choices in response to prompts by the system. Depending on the nature of the call, these responses may comprise, for example, instructions to buy or sell stock, to replenish inventory, or to buy or rebook an airline flight. User response module 1815 comprises a database to store these responses along with an identification of the call in which they were given. The identification of the call in which they were given is important to determining what should be done with these responses after the call is terminated. User responses may be passed back to intelligence server 16 after the call is complete. The responses may be processed during or after the call, by the system or by being passed to another application.

Statistics accumulator 1816 comprises a module that accumulates statistics regarding calls placed by call builder 1813. These statistics including, for example, the number of times a particular call has been attempted, the number of times a particular call has resulted in voice mail, the number of times a user responds to a call and other statistics, can be used to modify future call attempts to a particular user or the structure of a voice service provided to a particular user. For example, according to one embodiment, statistics accumulator 1816 accumulates the number of times a call has been unsuccessfully attempted by call builder 1813. This type of information is then used by call server 18 to determine whether or not the call should be attempted again, and whether or not a voice mail should be left.

Call server 18 also comprises certain hardware components 182. As shown in FIG. 1c, hardware components 182 comprise processor 1821 and computer telephone module 1822. According to one embodiment, processor 1821 comprises a Pentium II processor, available from Intel, Inc. Module 1822 provides voice synthesis functionality that is used in conjunction with Text to Speech engine 1814 to communicate the content of voice services to a user. Module 1822 preferably comprises voice boards available from Dialogic, Inc. Other processors and voice synthesizers meeting system requirements may be used.

The system and method of the present invention may form an integral part of an overall commercial transaction processing system.

According to one embodiment of the present invention, a system and method that enable closed-loop transaction processing are provided. The method begins with the deployment of an IVB by executing a service. As detailed above, this includes generating the content and combining this with personalization information to create an active voice page. Call server 18 places a call to the user. During the call, information is delivered to the user through a voice-enabled terminal device (e.g., a telephone or cellular phone).

During the IVB, a user may request a transaction, service, further information from the database or other request, e.g., based on options presented to the user. These will generically be referred to as transactions. The request may be, but is not necessarily, based on or related to information that was delivered to the user. According to one embodiment, the request comprises a user response to a set of options and/or input of information through a telephone keypad, voice input or other input mechanism. According to another embodiment, the request can be made by a user by speaking the request. Other types of requests are possible.

According to one embodiment, the user responses are written to a response collection, which along with information stored in the active voice page, can be used to cause a selected transaction to be executed. According to one embodiment, the active voice page comprises an XML-based document that includes embedded, generic requests, e.g., a request for a transaction, or a request for additional information (a database query). These embedded requests are linked with, for example OPTION Elements or GET-NUMBER Elements so that when a user enters information, the information is entered into the generic request and thus completes a specific transaction request. For example, in the example if a user exercises an option to buy a particular stock, that stock's ticker symbol is used to complete a generic "stock buy" that was embedded in the active voice page.

According to one embodiment, variables are used to manage user inputs during the IVB. A variable is a temporary variable that can hold different values during an IVB. When a user enters input, it is stored as a variable. The variable value is used to complete a transaction request as described above. According to one embodiment, the system maintains a running list of variables, or a response collection, during an IVB.

In order to complete the requested transaction, the user responses (and other information from the active voice page) may need to be converted to a particular format. The format will depend, for example, on the nature and type of transaction requested and the system or application that will execute the transaction. For example, a request to purchase goods through a web-site may require the information to be in HTML/HTTP format. A request for additional information may require and SQL statement. A telephone-based transaction may require another format.

Therefore, the transaction request is formatted. According to one embodiment, the transaction is formatted to be made against a web-based transaction system. According to another embodiment, the transaction request is formatted to be made against a database. According to another embodiment, the transaction is formatted to be made against a telephone-based transaction system. According to another embodiment, the transaction is formatted to be made via e-mail or EDI. Other embodiments are possible.

In one embodiment, the formatted transaction request comprises an embedded transaction request. The system described in connection with FIGS. 1-3 provides interactive voice services using TML, a markup language based on XML. Using TML active voice pages are constructed that contain the structure and content for a interactive voice broadcast including, inter alia, presenting the user with options and prompting the user for information. Moreover in connection with OPTION, GETNUMBER and GETSPEECH elements, active voice pages also can include embedded statements such as transaction requests. Therefore, the formatting for the transaction request can be accomplished ahead of time based on the particular types of transactions the user may select.

For example, in connection with an exemplary stock purchase, an active voice page can include an embedded transaction request to sell stock in the format necessary for a particular preferred brokerage. The embedded statement would include predefined variables for the name of the stock, the number of shares, the type of order (market or limit, etc.), and other variables. When the user chooses to exercise the option to buy or sell stock, the predefined variables are replaced with information entered by the user in response to OPTION, GETNUMBER or GETSPEECH elements. Thus, a properly formatted transaction request is completed.

In the system of FIGS. 1-3, TML parsing engine in call server 18 includes the functionality necessary to generate the properly formatted transaction request as described above. For example, in connection with the embodiment described above, the TML parsing engine shown in FIG. 3c reads the active voice pages. When the TML parsing engine reads an OPTION element that includes and embedded transaction request, it stores the transaction request, and defines the necessary variables and variable locations. When the user exercises that OPTION, the user's input is received by the TML parsing engine and placed at the memory locations to complete the transaction request This technique could be used, for example, to generate a formatted transaction request for web-site.

According to another embodiment, where the transaction request is made via a natural language, voice request, a formatted transaction request can be generated in a number of ways. According to one embodiment, speech recognition technology is used to translate the user's request into text and parse out the response information. The text is then used to complete an embedded transaction request as described above. According to another embodiment, speech recognition software is used to translate the request to text. The text is then converted to a formatted request based on a set of known preferences.

A connection is established with the transaction processing system. This can be accomplished during, or after the IVB. According to one embodiment, the transaction processing system comprises a remotely located telephone-based transaction site. For example, in the system shown in FIGS. 1-3, call server 18, through the TML parsing engine 1812, establishes a connection with a telephone-based transaction processing site.

According to another embodiment, the transaction processing system comprises a remotely based web-site. According to this embodiment, the formatted request includes a URL to locate the web-site and the system accesses the site through a web connection using the formatted request. Alternatively, the formatted request includes an e-mail address and the system uses any known email program to generate an e-mail request for the transaction.

After the connection is established, the transaction is processed by the transaction processing site and the user is notified of the status of the transaction. If the transaction is completed in real-time, the user may be immediately notified. If the transaction is executed after the IVB, the user may be called again by the system, sent an e-mail, or otherwise notified when the transaction has been completed.

According to one particular embodiment, the system comprises the interactive voice broadcasting system shown and described in FIGS. 1-3 and the transaction is accomplished in real-time. In this embodiment, confirmation of the transaction is returned to TML parsing engine 1812 shown in FIG. 3 and translated to speech in text-to-speech engine 1814 and presented to the user during the IVB. More specifically, and similar to the process described with respect to embedded formatted transaction requests, TML also enables embedding of a response statement. Thus, when the transaction is processed and confirmation of the transaction is returned to the system, an embedded confirmation statement is conveyed to the user through TML parsing engine 1812 after being converted to speech in text-to-speech engine 1814.

Figure 4:
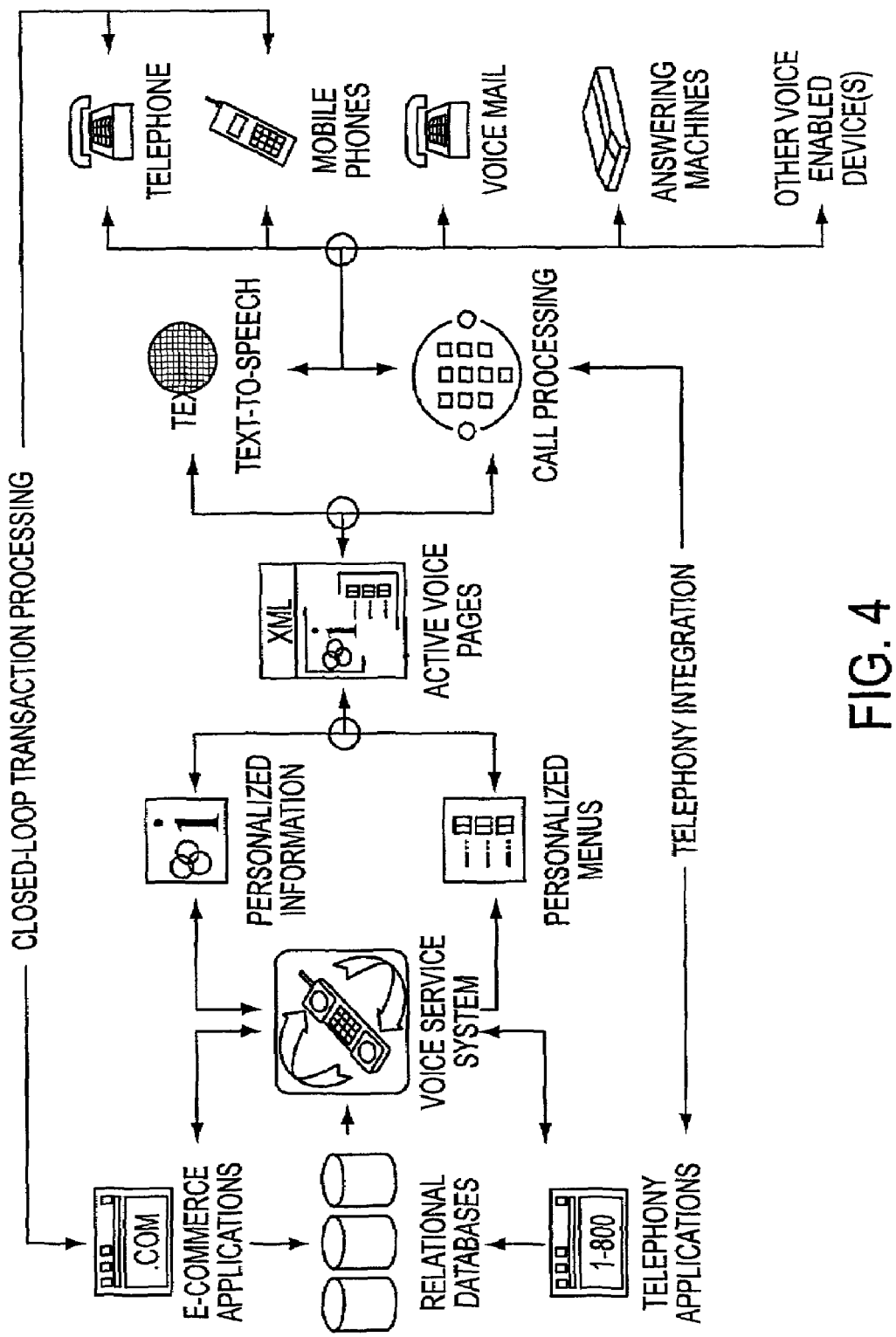
FIG. 4 is a schematic block diagram of a commercial transaction processing system according to an embodiment of the present invention.

FIG. 4 schematically depicts one example of how the system and method of the present invention would fit into such a commercial transaction processing system. Working from left to right in FIG. 4, the system begins and ends with information stored in relational databases. One of the primary purposes of information is in making decisions. Thus, the information in the databases is most useful if provided to someone who desires it in a timely fashion.

A voice service system is provided to enable access to the information in the databases. The voice service system utilizes personalization information and personalized menus to construct AVPs pages that enable the information to be delivered to a user verbally. Moreover, the AVPs pages, not only enable information to be presented to the user. But, they also enable the user to provide information back to the voice service system for additional processing.

According to the embodiment shown in FIG. 4, once the AVPs are constructed by voice service system, they are processed and the content is delivered to a user verbally in an IVB. Thus, call processing and text-to-speech technology are used to establish a telephone connection with a user and convert the active voice pages to speech for presentation to the user. As shown in FIG. 4, the IVB may be delivered to a user in many devices, including a telephone, a mobile phone, voice mail, an answering machine or any other voice-enabled device.

During the IVB, depending on the content that is being delivered, control may be passed to an e-commerce application for the user to complete a transaction based on the information presented. For example, if the user has requested information about sales on a particular brand of merchandise, the user may be connected with a particular retailer in order to complete a transaction to buy a particular good or service. Information about this transaction is then added to the databases and thus may be advantageously accessed by other users.

It may not be economical for some potential users of a voice broadcasting system to buy and/or maintain their own telephony hardware and software as embodied in call server 18. In such a case, a voice service bureau may be maintained at a remote location to service users voice service requests. A voice service bureau and a method of using a voice service bureau according to various embodiments of the present invention is described in conjunction with FIGS. 5-6.

In one embodiment, a voice service bureau may comprise one or more call servers and call databases that are centrally located and enable other voice service systems to generate a call request and pass the call request to the VSB to execute a call. In this way the other voice service systems do not need to invest in acquiring and maintaining call data bases, call servers, additional telephone lines and other equipment or software. Moreover, the VSB facilitates weeding out usage of illegal numbers and spamming by number checking implemented through its web server.

Figure 5:
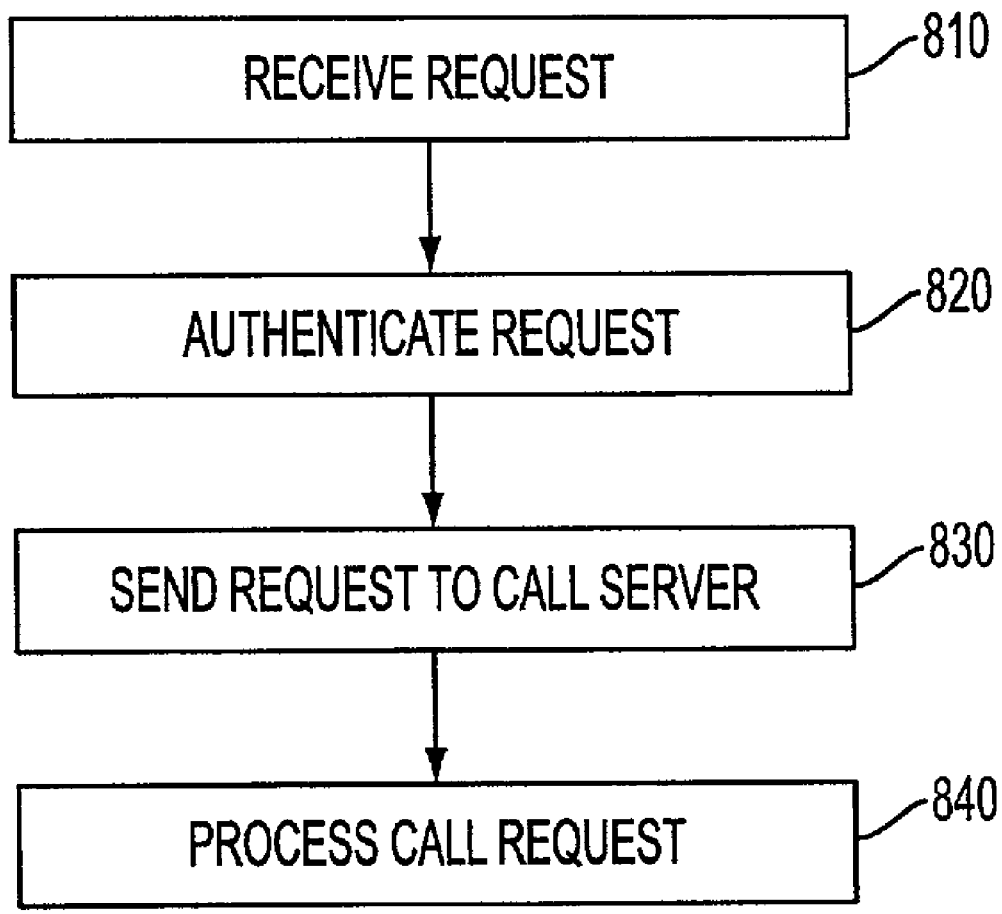
FIG. 5 is a flow chart of a method of using a voice service bureau according to an embodiment of the present invention.

A voice service bureau and a method of using a voice service bureau according to one embodiment are described in conjunction with FIGS. 5-6. FIG. 5 depicts a method of utilizing a voice service bureau according to one embodiment of the present invention. The method begins in step 810 with a request to place one or more telephone calls received through a computer network.

According to one embodiment, the voice service bureau is maintained at a location distant from the voice service system. Therefore, in order for a voice service to be processed by the voice service bureau, in step 810 the voice service is sent to the voice services bureau, preferably over some secure line of communication. According to one embodiment, the request is sent to the voice service bureau through the Internet using secure HTTPS. HTTPS provides a secure exchange of data between clients and the voice service bureau using asymmetric encryption keys based on secure server certificates. In another embodiment, SSL HTTP protocol is used to send a call request to the voice service bureau. Both of these protocols help ensure that a secure channel of communication is maintained between the voice service system and the voice service bureau. Other security techniques may be used.

When a request for a call or UVB is received, by the VSB, the request is authenticated by the voice service bureau in step 820. According to one embodiment, the authenticity of the request is determined in at least two ways. First, it is determined whether or not the request was submitted from a server having a valid, active server certificate. More specifically, requests may be typically received via a stream of HTTPS data. Each such request originating from a server with a valid server certificate will include an embedded code (i.e., server certificate) that indicates the request is authentic. In addition to the use of server certificates, each request may also be authenticated using an identification number and password. Therefore, if the request submitted does not include a valid server certificate and does not identify a valid I.D./password combination, the request will not be processed. The step of authenticating also comprises performing any necessary decryption. According to one embodiment, any errors that are encountered in the process of decrypting or authenticating the call request are logged an error system and may be sent back to the administrator of the sending system. Other methods of authenticating the request are possible.

Each properly authenticated request is sent to a call server (step 830) and processed (step 840). According to one embodiment, the voice service bureau comprises a number of call servers. According to one embodiment, the calls are sent to a call database, and processed as set forth herein in conjunction with the explanation of call server 18.

Figure 6A:
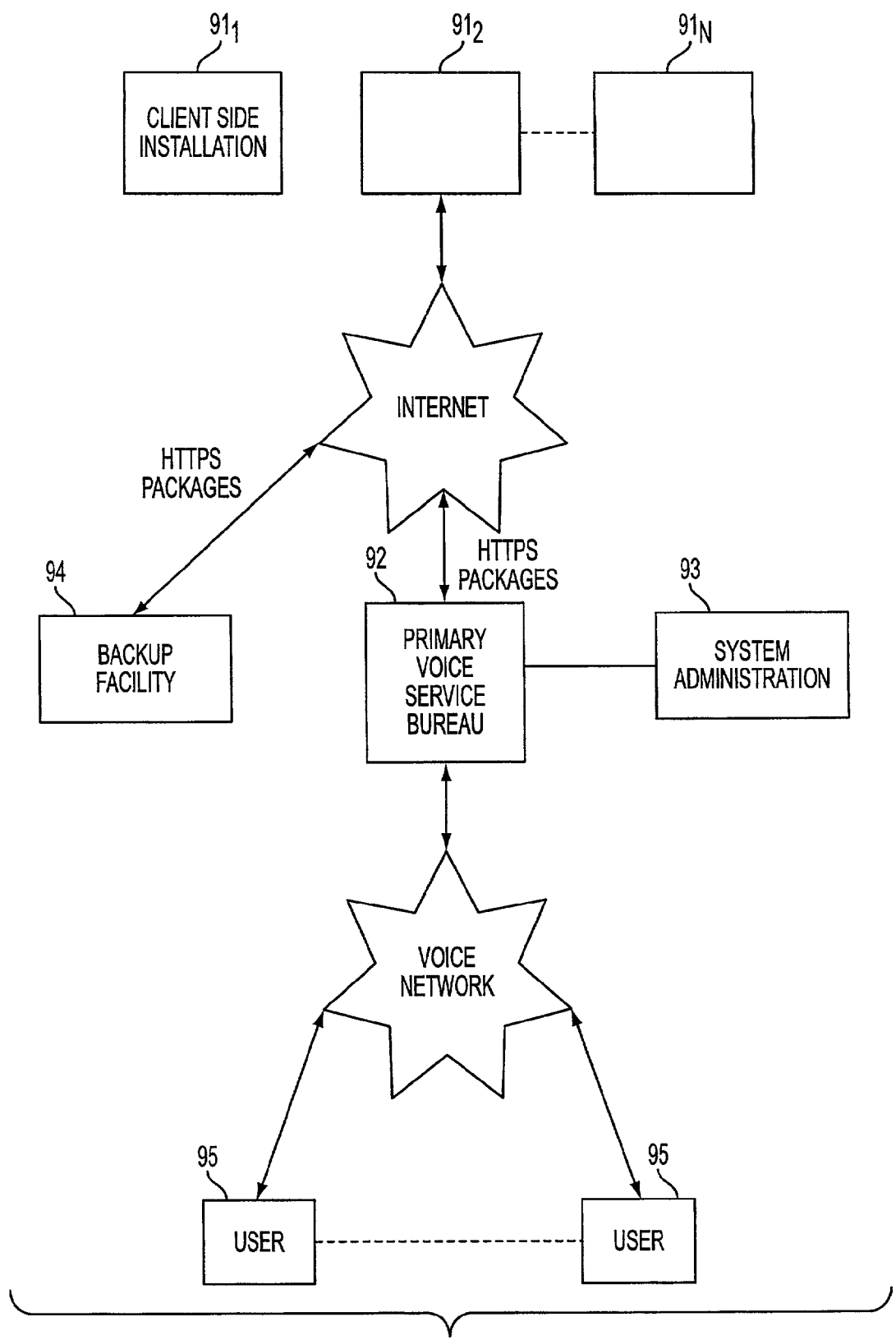
FIG. 6a is a schematic block diagram of a voice service system incorporating a voice service bureau according to one embodiment of the present invention.

One embodiment of a voice service bureau will now be explained in conjunction with FIGS. 6a-6c. FIG. 6a depicts a system comprising a plurality of client side installations 91, a primary voice bureau 92, a system administrator 93, a backup voice service bureau 94, and a plurality of users 95. Client side installations 91 communicate with voice service bureau 92 through a computer network. Voice service bureau 92 communicates with users 95 through a voice network. According to one embodiment, the computer network comprises the internet and client side installations 91 communicate with voice service bureau 92 using HTTPS as described above, and the voice network comprises a public telephone network.

According to one embodiment, client side installations 91 are substantially identical to the system shown in FIG. 4 except for the elimination of call server 18. In the system of FIG. 6a, the functionality of call server 18 is performed by VSB 92. As shown in this embodiment, VSB 92 can service multiple client side installations 91₁ to 91n. According to another embodiment, client-side installation functionality may be included within VSB 92. According to this embodiment VSB 92 constitutes a fully functional voice service that is accessible through email, telephone or other interfaces.

According to this embodiment, when voice services have been assembled by intelligence server 16, a request to have the voice services transmitted is sent via a secure network connection through the computer network shown to primary voice bureau 92 and backup voice service bureau 94 as described above. According to one embodiment, the request comprises a mark-up language string that contains the voice service structure and content and personal style properties and other information. As described above, voice bureau 92 authenticates the request, queues the voice services and sends IVBs to users 95 through the voice network.

Figure 6B:
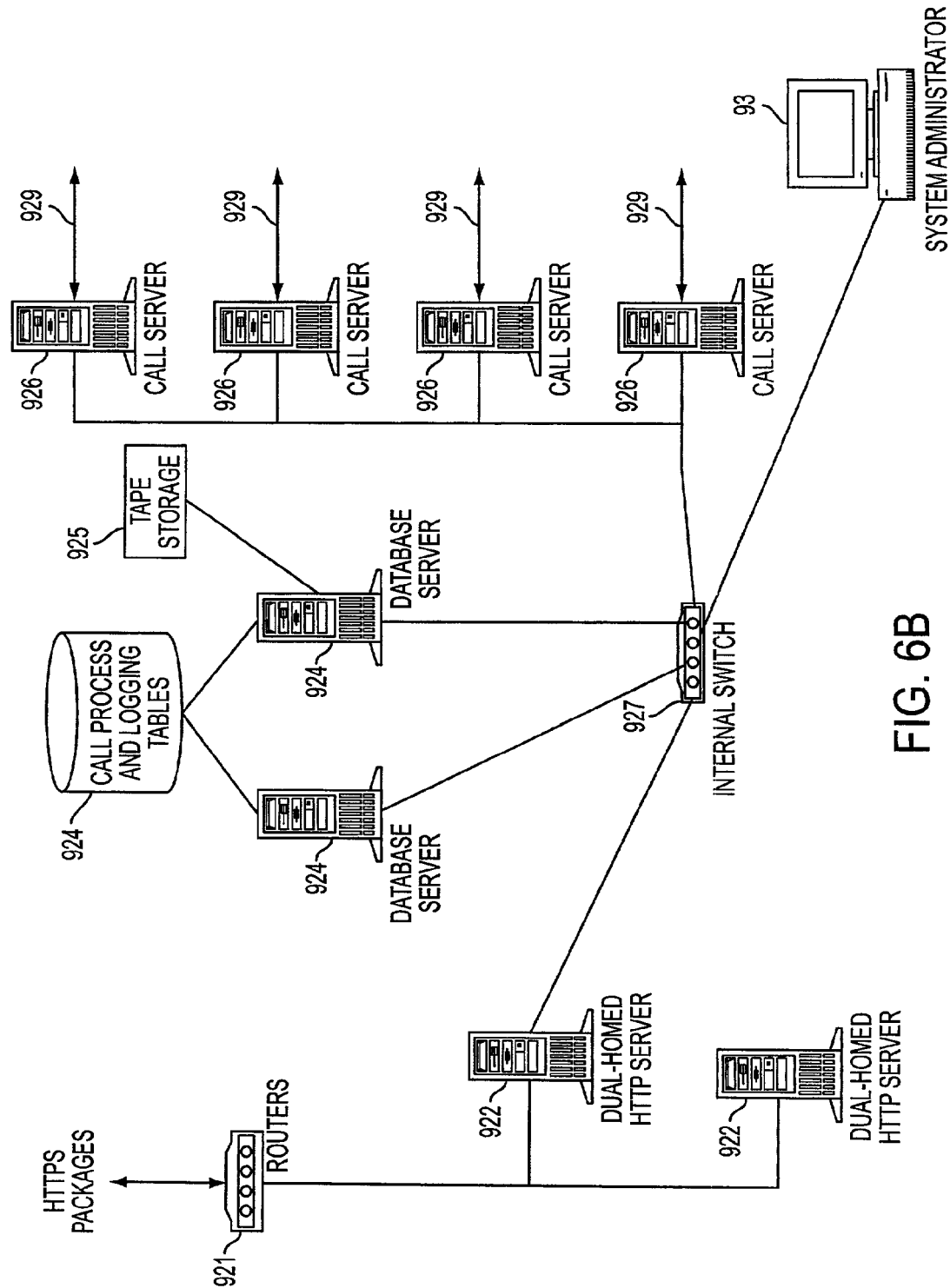
FIG. 6b is block diagram of a primary voice bureau according to one embodiment of the present invention.
Figure 6C:
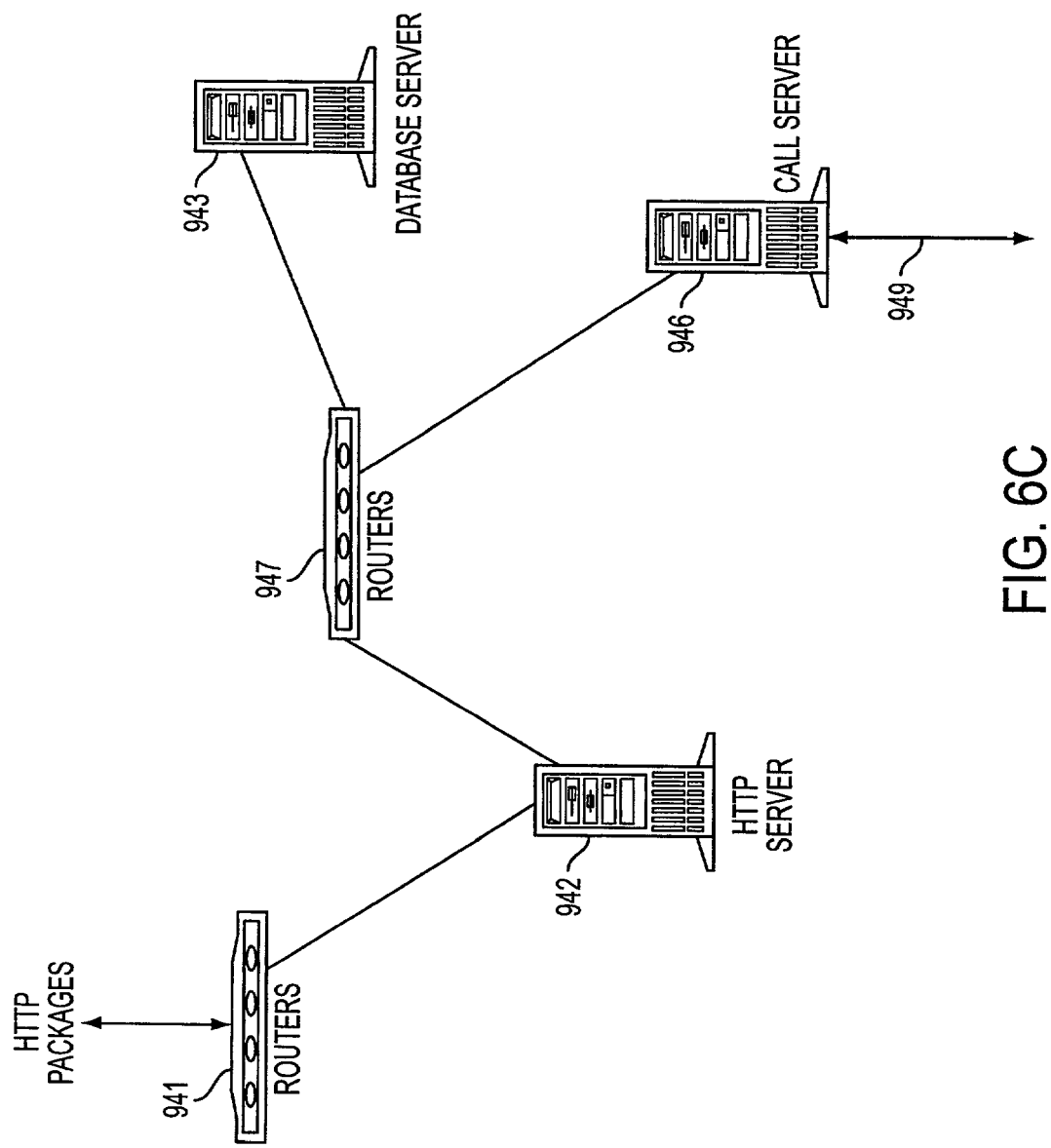
FIG. 6c is a block diagram of a backup voice bureau according to another embodiment of the present invention.

A block diagram of one embodiment of primary voice bureau 92 is shown in FIG. 6b. According to this embodiment, primary voice bureau comprises routers 921, dual-homed servers 922, database servers 923, call database 924, backup storage 925, call servers 926, internal switch 927, and system administrator 928. Routers 921 receive call requests via a computer network and pass them along to one of the two dual-homed servers 922. Router 921 monitors activity on servers 922 and forwards call requests to one of the two depending on availability.

Dual-homed servers 922 comprise servers configured to receive and send HTTPS email. As part of their receiving function, dual-homed servers 922 are configured to perform the authentication processing described above. According to one embodiment, dual-homed servers 922 determine whether the incoming request originated from a server with an active server certificate and also determine if the request contains a valid I.D./password combination. Once dual-homed servers 922 have authenticated the incoming request, they forward the request to be queued in call database 924. As part of their sending function, dual-homed servers 922 are configured to format and send HTTPS email. As discussed above, during an UVB a user may request that further information be accessed from a database or that some transaction be performed. According to one embodiment, these user requests are forwarded back to the originating system via HTTPS email by dual-homed servers 922. Dual-homed servers 922 are load balanced to facilitate optimal performance and handling of incoming call requests.

Database servers 923, call database 924, and backup storage 925 together comprise a call request queuing system. Primary voice bureau 92 is configured to handle a large number of call requests. It may not be possible to process call requests as they arrive. Therefore, call requests are queued in call database 924. According to one embodiment, call database 924 comprises a relational database that maintains a queue of all call requests that need to be processed as well as logs of calls that have been processed. According to another embodiment, primary VSB 92 may include a failover measure that enables another system server to become the call database if call database 924 should fail.

Database servers 923 are configured to control access to call database 924. According to one embodiment, database servers may be optimized to generate SQL statements to access entries in call database at high speed. Database servers 923 also control storage of call requests and call logs in call database 924.

Call servers 926 each are configured to format and send IVBs. According to one embodiment, each of call servers 926 is substantially identical to call server 18 shown in FIG. 3c. More specifically, each of call servers 926 receives requests for IVBs, parses the call content from the mark-language, establishes a connection with the user through phone lines 929, and receives user responses. According to one embodiment, call servers 926 comprise a clustered architecture that facilitates message recovery in the event of server failure.

Primary voice bureau 92 is controlled by system administrator 93 and internal switch 927. System administrator controls switch 927 and thus controls the flow of call requests to call database 924 from dual homed servers 922 and to call servers 926 from call database 924.

System administrator 93 is also configured to perform a number of other services for primary voice bureau 92. According to one embodiment, system administrator 93 also comprises a billing module, a statistics module, a service module and a security module. The billing modules tabulates the number of voice service requests that come from a particular user and considers the billing plan that the customer uses so that the user may be appropriately billed for the use of voice bureau 92. The statistics module determines and maintains statistics about the number of call requests that are processed by voice bureau 92 and statistics regarding call completion such as, e.g., success, failed due to busy signal and failed due to invalid number. These statistics may be used, for example, to evaluate hardware requirements and modify pricing schemes. The security module monitors activity on voice bureau 92 to determine whether or not any unauthorized user has accessed or attempted to access the system. The service module provides an interface through which primary voice bureau 92 may be monitored, for example, to determine the status of call requests. Other service modules are possible. Moreover, although these services are described as distinct modules, their functionality could be combined and provided in a single module.

Backup voice service bureau 94 receives a redundant request for voice services. Backup voice service bureau 94 processes the requests only when primary voice service bureau is offline or busy. One embodiment of backup voice service bureau 94 is shown in FIG. 6c. Backup voice bureau 94 comprises routers 941, HTTP server 942, database server 943, call server 946 and routers 947. Each of these components performs a function identical to the corresponding element in primary voice bureau 92. Router 947 replaces switch 927. Router 947 controls the forwarding of call requests to database server 943 for queuing in an internal database, and the forwarding of call requests to call server 946 from database server 943.

The systems and methods discussed above are directed to outbound broadcasting of voice services. Nevertheless, in certain situations, for example when the out bound UVB is missed, it is desirable to for a voice service system to enable inbound calling. According to another embodiment, a method and system for providing integrated inbound and outbound voice services is disclosed.

Figure 7:
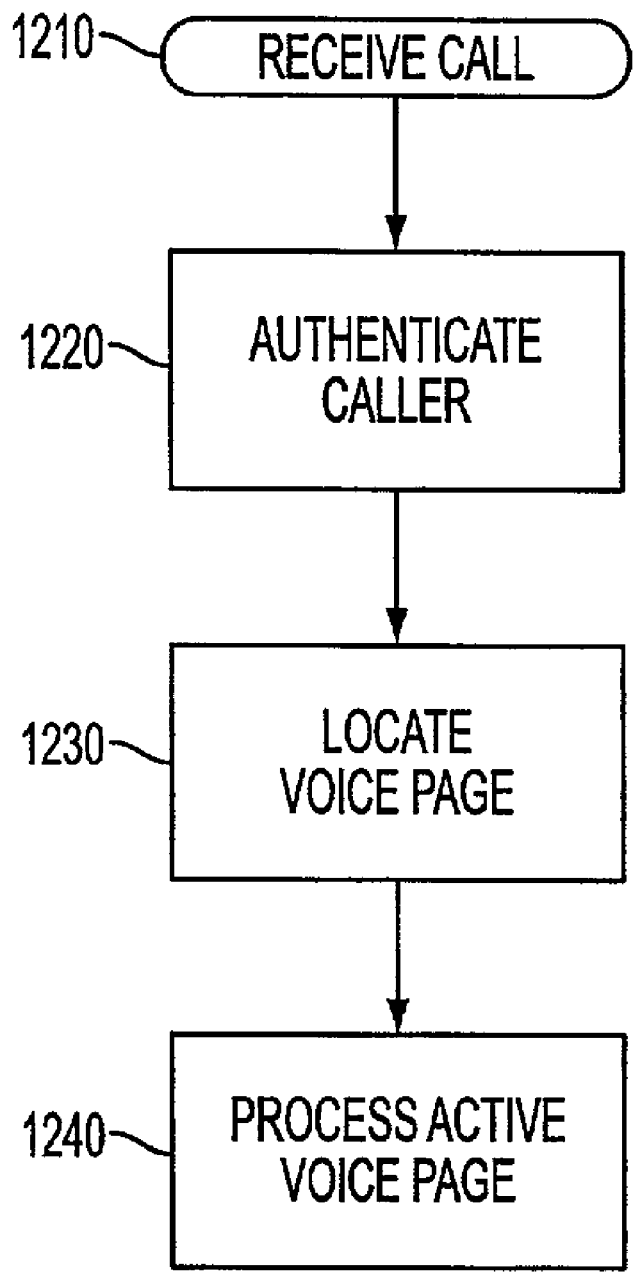
FIG. 7 is a flow chart illustrating a method for integrating inbound and outbound voice services.

A method for providing inbound access to voice services according to one embodiment of the present invention is shown in FIG. 7. According to FIG. 7, the method begins with receipt of a call requesting voice services in step 1210. To help ensure system integrity and to prevent unauthorized access, a call request is authenticated in step 1220. According to one embodiment, each incoming caller is automatically prompted to enter a login identifier and a PIN. According to another embodiment, an automatic number identification system is used, in addition to a login identifier and PIN system, to determine whether or not the user is calling from an authorized device. According to another embodiment, speaker recognition technology is utilized to identify a caller. According to this embodiment, voice prints for each user of the voice service system are stored as identifiers. When an inbound call is connected, pattern matching techniques are used verify the user's speech against the previously stored voice prints. Other security measures are possible.

In step 1230, a voice page is located. As explained above, an UVB of a voice service is driven by an active voice page. Accordingly, a user calling in to access voice services locates the desired active voice page. According to one embodiment, the user is automatically placed into an active voice page of a voice service that the user missed. That is, the system chooses an active voice page that it was unable to deliver. According to this embodiment, when a call is undeliverable (e.g., when an answering machine picks up), the active voice page for that call is placed in memory in a "voice site" table or as an active voice page on a web site and addressed using the user's identification. When the user calls in to retrieve the voice service, after the user logs in, the table or web site will be searched for an active voice page that corresponds to their identification. If such a page exists, it is executed by the call server.

Other possibilities exist for accessing active voice pages through inbound calling. According to another embodiment, the system maintains a log of all voice services sent and provides an inbound user an option to select one of their previous voice services. According to another embodiment, an inbound caller is automatically placed into an active voice page that presents the user with an option to select one of that user's most frequently used services. According to still another embodiment, the user is allowed to search for past active voice pages by date or content. For example, the user may be prompted to enter a date on or near which the desired voice page was executed. According to another embodiment, the user may use the telephone keys to enter a search term and search the content of any previously executed active voice page that they are authorized to access or that is not secure.

Once an active voice page is located, the user navigates through the active voice page in step 1240. As described above, a user navigates through an active voice by exercising options, responding to prompts and otherwise entering input to the system. An inbound calling system would thus have access to the full functionality of the voice service system described in conjunction with FIGS. 1-6.

Figure 8:
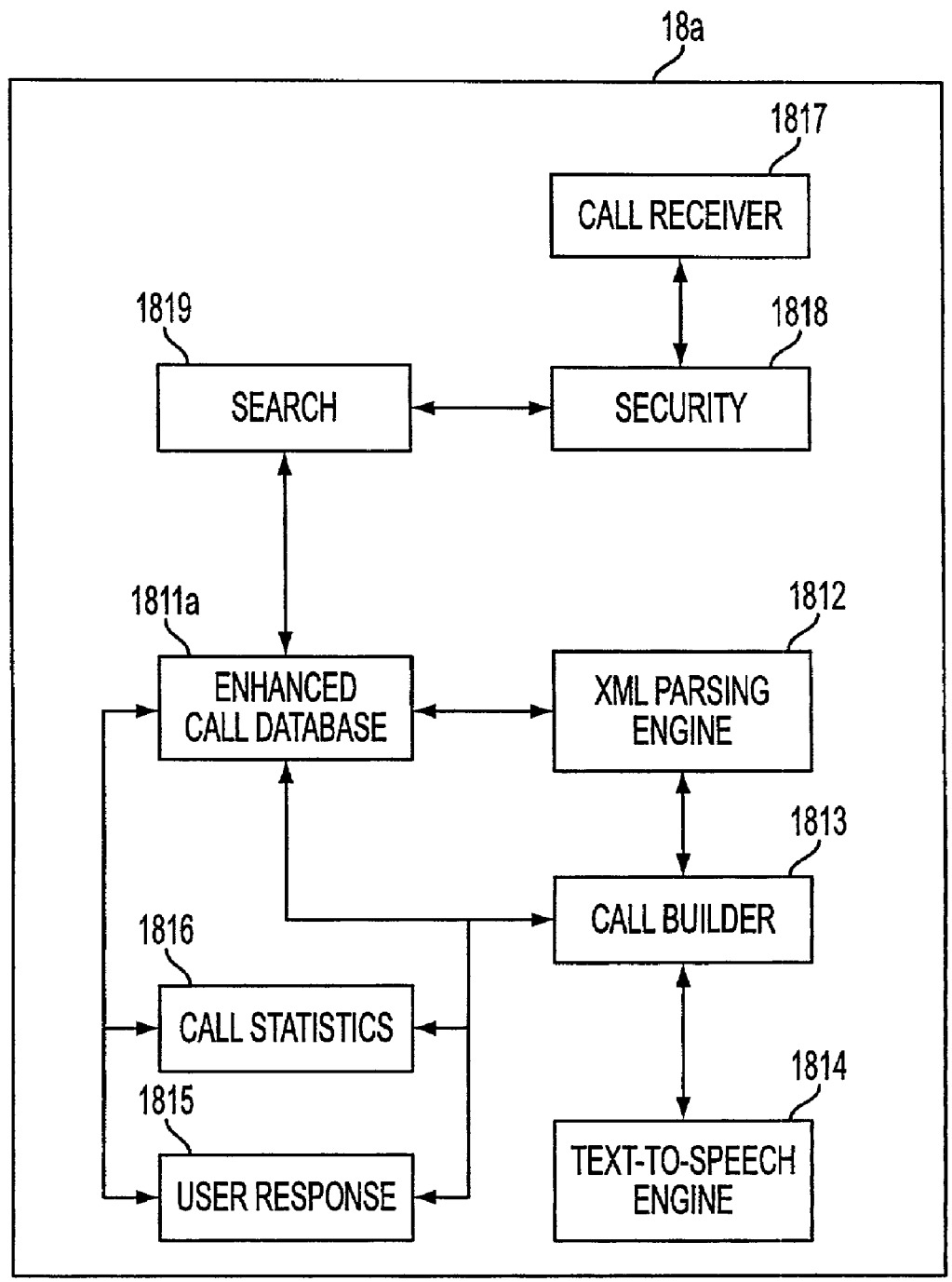
FIG. 8 is a block diagram of a call server configured to provide integrated inbound and outbound voice services.

FIG. 8 depicts a block diagram of a call server 18a that enables integrated inbound and outbound calling. In addition to the modules depicted in call server 18 of FIG. 3, call server 18a comprises call receiver module 1817, security module 1818 and search module 1819. Moreover, in the system for permitting inbound and outbound calling, call database 1811 has been replaced with an enhanced call database 1811a.

In order to receive inbound calls, call server 18a comprises call receiver module 1817. Although, call server 18 discussed above contains hardware permitting reception of calls as well as transmission of calls, it is not set up to receive calls. Call receiver module 1817 enables call server 18a to receive calls and routes the incoming calls to security module 1818. According to one embodiment, call receiver module comprises a software component designed to configure call server 18a to receive calls. Other embodiments are possible.

Received calls are forwarded to security module 1818 for authentication. According to one embodiment discussed above, incoming calls are authenticated using login I.D.'s and passwords. According to another embodiment, automatic number identification software is used to identify and authenticate callers. According to another embodiment, speech recognition and pattern matching techniques are used to identify a caller.

Authenticated calls may search for an active voice page using search module 1819. According to one embodiment, search module 1819 comprises a search engine designed specifically to search active voice pages. According to one embodiment discussed above, active voice pages utilize an XML-based language and search module 1819 comprises an XML-based search engine. According to another embodiment, search module 1819 comprises a SQL engine designed to make queries against a relational or other type of database.

The active voice pages that are being search are stored in enhanced call database 1811a. In addition to its facilities to queue and log calls, enhanced call database 1811 includes facilities to catalog active voice pages. According to one embodiment, enhanced call database comprises a relational or other type of database. According to this embodiment, enhanced call database is used to store and categorize active voice pages and corresponding parameters, such as expiration dates for active voice pages. Other storage facilities are possible.

Various features and functions of the present invention extend the capabilities of previously known information delivery systems. One such system is MicroStrategy's Broadcaster version 5.6. The features and functions of the present invention are usable in conjunction with Broadcaster and other information delivery systems or alone. Other products may be used with the various features and functions of the invention including, but not limited to, MicroStrategy's known product suite.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer-readable storage medium comprising code programmed in a markup language for facilitating voice-enabled communication between a voice service system and an individual, the markup language comprising:

a hierarchical set of functional elements that define the capabilities of the markup language, the set of elements comprising:

a dialog element that defines a unit of interaction between the voice service system and an individual;

an input element contained in the dialog element and operative to request input from an individual during execution of a voice service; and an n-best list filter element operative to request verification from a list of possible matches for an audibly-uttered user response;

whereby one or more of the elements are arranged to define a voice service; and wherein the n-best filter element comprises a namespace attribute that stores results from a grammar that are confirmed as not matching the utterance.

2. The markup language of claim 1 wherein the n-best list filter element operates to cause a processing system to generate a list of possible matches for a received audible utterance.

3. The markup language of claim 1, wherein the n-best filter element comprises an expression attribute that specifies a portion on an input element to be confirmed with the user.

4. The markup language of claim 1, wherein the n-best filter element specifies a loop to go through the list of possible matches for the utterance.

5. The markup language of claim 4, wherein the n-best filter element specifies an error element to announce when a match is not found.

6. A computer-readable storage medium storing an active voice page for use in an interactive voice output comprising:

at least one dialog element contained within the container element, the dialog element comprising content for delivery to an identified user during an interactive voice broadcast;

at least one input element contained within the at least one dialog element, the at least one input element defining input to be received from the identified user during the interactive voice broadcast; and at least one n-best list filter element operative to request verification from a list of possible matches for an audibly-uttered user response;

wherein the n-best filter element comprises a namespace attribute that stores results from a grammar that are confirmed as not matching the utterance.

7. The active voice page of claim 6 wherein the n-best list filter element operates to cause a processing system to generate a list of possible matches for a received audible utterance.

8. The active voice page of claim 6, wherein the n-best filter element comprises an expression attribute that specifies a portion on an input element to be confirmed with the user.

9. The active voice page of claim 6, wherein the n-best filter element specifies a loop to go through the list of possible matches for the utterance.

10. The active voice page of claim 9, wherein the n-best filter element specifies an error element to announce when a match is not found.

11. An interactive voice output system that dialogs with a user comprising:
- a XML-based page comprising:
- at least one dialog element contained within a container element, the dialog element comprising content for delivery to an identified user during an interactive voice broadcast;
- at least one input element contained within the at least one dialog element, the at least one input element defining input to be received from the identified user during the interactive voice broadcast; and
- at least one n-best list filter element operative to request verification from a list of possible matches for an audibly-uttered user response; and
- a call server that engages a user in dialog based on the dialog element, receives input from a user and prompts the user to verify possible matches for audibly-uttered user responses that are not understood based on the XML-based page contents;
- wherein the n-best filter element comprises a namespace attribute that stores results from a grammar that are confirmed as not matching the utterance.

12. The interactive voice output system of claim 11 wherein the n-best list filter element operates to cause a processing system to generate a list of possible matches for a received audible utterance.

13. The interactive voice output system of claim 11, wherein the n-best filter element comprises an expression attribute that specifies a portion on an input element to be confirmed with the user.

14. The interactive voice output system of claim 11, wherein the n-best filter element specifies a loop to go through the list of possible matches for the utterance.

15. The interactive voice output system of claim 14, wherein the n-best filter element specifies an error element to announce when a match is not found.

\* \* \* \* \*